(12) United States Patent
Medsker

(10) Patent No.: US 7,022,801 B2
(45) Date of Patent: Apr. 4, 2006

(54) POLYMERIC SURFACTANTS DERIVED FROM CYCLIC MONOMERS HAVING PENDANT FLUORINATED CARBON GROUPS

(75) Inventor: Robert E. Medsker, Hartville, OH (US)

(73) Assignee: Omnova Solutions Inc., Fairlawn, OH (US)

( * ) Notice: Subject to any disclaimer, the term of this patent is extended or adjusted under 35 U.S.C. 154(b) by 448 days.

(21) Appl. No.: 10/657,056

(22) Filed: Sep. 5, 2003

(65) Prior Publication Data

US 2004/0048957 A1 Mar. 11, 2004

Related U.S. Application Data

(60) Division of application No. 10/142,229, filed on May 9, 2002, which is a continuation-in-part of application No. 09/855,053, filed on May 14, 2001, now Pat. No. 6,660,828.

(51) Int. Cl.
 C08G 77/24 (2006.01)

(52) U.S. Cl. .............................. 528/27; 528/31; 528/42; 525/100; 525/104; 525/446; 525/453; 525/474

(58) Field of Classification Search ................ 528/31, 528/42, 27; 525/100, 104, 446, 453, 474
See application file for complete search history.

(56) References Cited

U.S. PATENT DOCUMENTS

| | | | |
|---|---|---|---|
| 2,995,571 A | 8/1961 | Harris, Jr. | |
| 3,096,344 A | 7/1963 | Case | |
| 3,100,722 A | 8/1963 | Hermann et al. | |
| 3,105,838 A | 10/1963 | Luskin | |
| 3,164,610 A | 1/1965 | Davis | |
| 3,210,298 A | 10/1965 | Weissemel et al. | |
| 3,240,754 A | 3/1966 | Plueddemann | |
| 3,338,867 A * | 8/1967 | Plueddemann ............... | 528/10 |
| 3,385,812 A | 5/1968 | Brachman | |
| 3,415,794 A | 12/1968 | Orth et al. | |
| 3,457,193 A | 7/1969 | Tinsley et al. | |
| 3,576,802 A | 4/1971 | Luders et al. | |
| 3,609,156 A | 9/1971 | Munakata et al. | |
| 3,636,132 A | 1/1972 | Saegusa et al. | |
| 3,640,971 A | 2/1972 | Katayama et al. | |
| 3,681,413 A | 8/1972 | Sweeney et al. | |
| 3,692,801 A | 9/1972 | Robinson, III et al. | |
| 3,779,942 A | 12/1973 | Bolles | |
| 3,787,294 A | 1/1974 | Kurosaki et al. | |
| 3,834,823 A | 9/1974 | Seregely et al. | |
| 3,859,263 A | 1/1975 | Bourat et al. | |
| 3,867,353 A | 2/1975 | Hsieh et al. | |
| 3,922,457 A | 11/1975 | Barnwell et al. | |
| 4,035,149 A | 7/1977 | Scott et al. | |
| 4,051,195 A | 9/1977 | McWhorter | |
| 4,059,451 A | 11/1977 | Oita et al. | |
| 4,079,084 A | 3/1978 | Houghton | |
| 4,098,654 A | 7/1978 | Helle et al. | |
| 4,107,055 A | 8/1978 | Sukornick et al. | |
| 4,118,541 A | 10/1978 | Power et al. | |
| 4,222,828 A | 9/1980 | Zuurdeeg | |
| 4,278,773 A | 7/1981 | Kleber et al. | |
| 4,302,374 A | 11/1981 | Helle et al. | |
| 4,388,396 A | 6/1983 | Nishibayashi et al. | |
| 4,521,571 A | 6/1985 | Ishido et al. | |
| 4,574,139 A | 3/1986 | Sato et al. | |
| 4,579,765 A | 4/1986 | Schachtner | |
| 4,603,074 A | 7/1986 | Pate et al. | |
| 4,686,275 A | 8/1987 | Bryant et al. | |
| 4,709,060 A | 11/1987 | Ohsaka et al. | |
| 4,746,576 A | 5/1988 | Ozu et al. | |

(Continued)

FOREIGN PATENT DOCUMENTS

| | | |
|---|---|---|
| EP | 348 350 | 12/1989 |
| EP | 430 887 | 6/1991 |
| JP | 63105029 | 5/1988 |
| WO | WO 96/18699 | 6/1996 |
| WO | WO 96/21657 | 7/1996 |
| WO | WO 96/23828 | 8/1996 |
| WO | WO 99/26992 | 6/1999 |
| WO | WO 99/45079 | 9/1999 |
| WO | WO 00/46270 | 8/2000 |
| WO | WO 01/48051 | 7/2001 |

OTHER PUBLICATIONS 10 pages of World Patent Index search results based on PVC and fluoro . . . coating.
4 pages of World Patent Index search results based on PVC and polyester coating.
40 pages of Chemical Abstract search results based on PVC and fluoro . . . coating.
25 pages of Chemical Abstract search results based on PVC and polyester.
CA entries and Derwent patent family printouts on JP 03275859; JP 04363370; JP 07004064; JP 07039812; JP 08283654; JP 6216941; and JP 63248827.
Letter to Southwest Texas Distributions, Inc. dated Mar. 5, 1998 to Greg Nernes from Barry Bastion, Product Manager, GenCorp.
Letter to Southwest Texas Distributions, Inc. dated Mar. 5, 1998 to Greg Nernes from Barry Bastion, Product Manager, GenCorp.
Invoice to Southwest Texas Distributions, Inc. dated Apr. 9, 1998 from GenCorp.

*Primary Examiner*—Margaret G. Moore
(74) *Attorney, Agent, or Firm*—Hudak, Shunk & Farine; David G. Burleson

(57) ABSTRACT

A fluorine containing polymer which acts as a wetting, flow or leveling agent, and has at least one polar group. The polymer has at least one pendant or ether side chain containing from about 1 to about 20 carbon atoms with at least 25% of the hydrogen atoms being replaced by fluorine atoms. The fluorinated polymers unexpectedly impart wetting, flow or leveling properties to a variety of coatings while producing little foam.

14 Claims, 2 Drawing Sheets

U.S. PATENT DOCUMENTS

| | | |
|---|---|---|
| 4,765,975 A | 8/1988 | Iovanni et al. |
| 4,857,396 A | 8/1989 | Otonari et al. |
| 4,898,849 A | 2/1990 | Kang |
| 4,898,981 A | 2/1990 | Falk et al. |
| 4,946,992 A | 8/1990 | Falk et al. |
| 4,988,123 A | 1/1991 | Lin et al. |
| 4,988,797 A | 1/1991 | Wardle et al. |
| 5,021,544 A | 6/1991 | Padget et al. |
| 5,043,221 A | 8/1991 | Koleske |
| 5,045,624 A | 9/1991 | Falk et al. |
| 5,068,397 A | 11/1991 | Falk et al. |
| 5,097,048 A | 3/1992 | Falk et al. |
| 5,149,564 A | 9/1992 | Kato et al. |
| 5,162,384 A | 11/1992 | Owens et al. |
| 5,166,230 A | 11/1992 | Stecker |
| 5,189,135 A | 2/1993 | Cozzi et al. |
| 5,206,066 A | 4/1993 | Horacek |
| 5,208,312 A * | 5/1993 | Boutevin et al. ............ 528/28 |
| 5,210,153 A | 5/1993 | Manser et al. |
| 5,214,121 A | 5/1993 | Mosch et al. |
| 5,218,031 A | 6/1993 | Nayder et al. |
| 5,230,954 A | 7/1993 | Sakamoto et al. |
| 5,247,044 A * | 9/1993 | Crivello et al. ............... 528/15 |
| 5,259,848 A | 11/1993 | Terry et al. |
| 5,300,394 A | 4/1994 | Miller et al. |
| 5,302,462 A | 4/1994 | Shah et al. |
| 5,324,764 A | 6/1994 | Fujita et al. |
| 5,361,164 A | 11/1994 | Steliga |
| 5,362,847 A | 11/1994 | Miller et al. |
| 5,385,655 A | 1/1995 | Brent et al. |
| 5,436,309 A * | 7/1995 | Boutevin et al. ............ 528/25 |
| 5,468,841 A | 11/1995 | Malik et al. |
| 5,519,151 A | 5/1996 | Petrov et al. |
| 5,543,200 A | 8/1996 | Hargis et al. |
| 5,547,550 A | 8/1996 | Kuntzburger et al. |
| 5,576,095 A | 11/1996 | Ueda et al. |
| 5,584,977 A | 12/1996 | Bachot et al. |
| 5,599,883 A | 2/1997 | Ohsugi et al. |
| 5,603,818 A | 2/1997 | Brent et al. |
| 5,632,958 A | 5/1997 | Kane et al. |
| 5,637,657 A | 6/1997 | Anton |
| 5,637,772 A | 6/1997 | Malik et al. |
| 5,649,828 A | 7/1997 | Kawashima |
| 5,650,483 A | 7/1997 | Malik et al. |
| 5,654,450 A | 8/1997 | Malik et al. |
| 5,663,289 A | 9/1997 | Archibald et al. |
| 5,668,250 A | 9/1997 | Malik et al. |
| 5,668,251 A | 9/1997 | Malik et al. |
| 5,674,951 A | 10/1997 | Hargis et al. |
| 5,681,890 A | 10/1997 | Tanaka et al. |
| 5,685,755 A | 11/1997 | Zabasajja et al. |
| 5,703,194 A | 12/1997 | Malik et al. |
| 5,714,266 A | 2/1998 | Harrison et al. |
| 5,728,669 A | 3/1998 | Tyerech |
| 5,731,095 A | 3/1998 | Milco et al. |
| 5,746,954 A | 5/1998 | Aikman, Jr. |
| 5,750,482 A | 5/1998 | Cummings |
| 5,753,316 A | 5/1998 | Brent et al. |
| 5,789,505 A | 8/1998 | Wilkinson et al. |
| 5,807,977 A | 9/1998 | Malik et al. |
| 5,824,464 A | 10/1998 | Scheil et al. |
| 5,849,944 A | 12/1998 | Allen et al. |
| 5,861,365 A | 1/1999 | Colurciello, Jr. et al. |
| 5,865,851 A | 2/1999 | Sidoti et al. |
| 5,908,473 A | 6/1999 | Weller et al. |
| 5,912,291 A | 6/1999 | Sterling et al. |
| 5,919,851 A | 7/1999 | Yamaguchi et al. |
| 5,942,572 A | 8/1999 | Chittofratl et al. |
| 5,952,422 A | 9/1999 | Chang et al. |
| 5,955,414 A | 9/1999 | Brown et al. |
| 5,965,659 A | 10/1999 | Kubo et al. |
| 5,976,349 A | 11/1999 | Kuntzburger et al. |
| 5,976,702 A | 11/1999 | Yoneda et al. |
| 5,981,614 A | 11/1999 | Adiletta |
| 5,993,907 A | 11/1999 | Aikman, Jr. |
| 5,998,574 A | 12/1999 | Fishback et al. |
| 6,010,539 A | 1/2000 | Del Pesco |
| 6,015,838 A | 1/2000 | Stern et al. |
| 6,015,914 A | 1/2000 | Sasaki et al. |
| 6,020,451 A | 2/2000 | Fishback et al. |
| 6,022,925 A | 2/2000 | Tomko et al. |
| 6,033,737 A | 3/2000 | Johnson et al. |
| 6,036,735 A | 3/2000 | Carter et al. |
| 6,037,483 A | 3/2000 | Malik et al. |
| 6,065,153 A | 5/2000 | Underwood et al. |
| 6,099,704 A | 8/2000 | Bacquet et al. |
| 6,111,043 A | 8/2000 | Corpart et al. |
| 6,114,045 A | 9/2000 | Juhue et al. |
| 6,124,388 A | 9/2000 | Takai et al. |
| 6,127,507 A | 10/2000 | Santerre |
| 6,127,517 A | 10/2000 | Koike et al. |
| 6,168,866 B1 | 1/2001 | Clark |
| 6,177,196 B1 | 1/2001 | Brothers et al. |
| 6,179,132 B1 | 1/2001 | Moya |
| 6,180,243 B1 | 1/2001 | Johnson et al. |
| 6,192,520 B1 | 2/2001 | Underwood et al. |
| 6,200,457 B1 | 3/2001 | Durand et al. |
| 6,200,732 B1 | 3/2001 | Tamura et al. |
| 6,225,367 B1 | 5/2001 | Chaouk et al. |
| 6,239,247 B1 | 5/2001 | Allewaert et al. |
| 6,255,267 B1 | 7/2001 | Nayar et al. |
| 6,255,384 B1 | 7/2001 | McCarthy et al. |
| 6,479,623 B1 | 11/2002 | Malik et al. |

* cited by examiner

POLYMERIC SURFACTANTS DERIVED FROM CYCLIC MONOMERS HAVING PENDANT FLUORINATED CARBON GROUPS

CROSS REFERENCE

This application is a divisional application of 10/142,229, filed May 9, 2002 and now allowed, which is a continuation-in-part of U.S. Ser. No. 09/855,053 filed May 14, 2001, now U.S. Pat. No. 6,660,828 A FLUORINATED SHORT CARBON ATOM SIDECHAIN AND POLAR GROUP CONTAINING POLYMER, AND FLOW, OR LEVELING, OR WETTING AGENTS THEREOF.

FIELD OF THE INVENTION

One or more low carbon atom fluorocarbons of usually 7 carbon atoms or less are contained on a polymer generally having polar groups. The fluorocarbons generally exist as side chains with at least 25% of the hydrogen atoms being replaced by fluorine atoms. The polymer of the present invention is found unexpectedly to be an effective wetting, or flow, or leveling agent while producing little foam.

BACKGROUND OF THE INVENTION

U.S. Pat. No. 3,859,253 to Bourat et al. relates to polyoxetanes comprising a plurality of repeating units wherein the chain oxygen atoms of each recurring unit is attached to a chain methylene group of an adjacent recurring unit with, in addition, cross-linking via the other free valencies when the polymer contains repeating units.

U.S. Pat. No. 5,068,397 to Falk et al. relates to tris-perfluoroalkyl terminated neopentyl alcohols of the formula $(R_f\text{-}E_n\text{-}X\text{—}CH_2)_3CCH_2OH$ prepared from halogenated neopentyl alcohols and thiols of the formula $R_f\text{-}E_n\text{-}SH$, amines of the formula $R_f\text{-}E_n\text{-}NH\text{—}R$, alcohols of the formula $R_f\text{-}E_n\text{—}OH$, and perfluoro-acids or amides. The alcohols react with isocyanates to prepare urethanes; with acids or derivatives to prepare esters or carbonates; with epoxides to form ethers. Further, they may be converted to halide intermediates. The products all contain the residue of at least one $R_f$-neopentyl alcohol containing three perfluoroalkyl hetero groups.

U.S. Pat. No. 5,674,951 to Hargis et al. relates to coating compositions which use a polyoxetane polymer having —$CH_2$—O—$CH_2$—$R_f$ side chains where $R_f$ is a highly fluorinated alkyl or polyether. The coating compositions use polyisocyanates to create isocyanate terminated polymers from the poly(oxetane) and from various polyols from alkylene oxides or polyester polyols. These can be reacted together to form block copolymer structures or can be linked together when the coating is crosslinked. A preferred method is to use blocked isocyanate groups. Another preferred embodiment is to use the composition as an abrasion resistant coating for glass run channels.

U.S. Pat. No. 5,807,977 to Malik et al. relates to fluorinated polymers and prepolymers derived from mono-substituted oxetane monomers having fluorinated alkoxymethylene side-chains and the method of making these compositions. The mono-substituted fluorinated oxetane monomers having fluorinated alkoxymethylene side-chains are prepared in high yield by the reaction of a fluorinated alkoxide with either 3-halomethyl-3-methyloxetane pre-monomers. It also relates to copolymers of oxetane and tetrahydrofuran.

U.S. Pat. No. 5,998,574 to Fishback et al. relates to a polyol composition comprising: (A) a polytetramethylene ether glycol, and (2) a difunctional active hydrogen compound-initiated polyoxyalkylene polyether polyol having a degree of unsaturation of not greater than 0.04 milliequivalents per gram of said polyether polyol.

U.S. Pat. No. 6,020,451 to Fishback et al. relates to a polyol composition comprising: (A) a polytetramethylene ether glycol, and (2) a difunctional active hydrogen compound-initiated polyoxyalkylene polyether polyol having a degree of unsaturation of not greater than 0.04 milliequivalents per gram of said polyether polyol.

U.S. Pat. No. 6,127,517 to Koike et al. relates to the polymerization of hexafluoropropene oxide (HFPO) in a polymerization initiator solution of the formula: $CsCF_2$—$R_f$—$CF_2OCs$ wheriein $R_f$ is a perfluoroalkylene group which may have an ether bond in an aprotic polar solvent provided that the initiator solution is first treated by adding a perfluoroolefin thereto at a sufficient temperature for the removal of protonic substances, cesium fluoride and hydrogen fluoride. This simple treatment restrains chain transfer reaction, and the process is successful in producing a difunctional HFPO polymer having a high degree of polymerization while suppressing formation of a monofunctional HFPO polymer.

U.S. Pat. No. 6,168,866 to Clark relates to a curable fluorine-containing coating composition comprising: (i) an amino resin; (ii) an addition fluoropolymer comprising a copolymer of a fluorinated monomer having a fluorocarbon group of at least 3 carbons, and a non-fluorinated monomer having a crosslinking group capable of reacting with said amino resin at elevated temperatures; and (iii) a hardening agent capable of crosslinking with said amino resin at elevated temperatures.

Heretofore, non-polymeric molecules containing fluorinated and polar groups were used as wetting, or flow, or leveling agents; however, many of these materials have been shown to bioaccumulate thereby greatly limiting their utility.

SUMMARY OF INVENTION

The partial or fully fluorinated short carbon atom side chain containing polymers of the present invention unexpectedly have good wetting, or flow, or leveling properties. The types of polymers are numerous and include polymers derived from cyclic ethers, poly(acrylates), poly (methacrylates), hydroxyl terminated poly(acrylates) or poly (methacrylates), polyolefins, polymers derived from vinyl substituted aromatic monomers such as styrene, polyesters, polyurethanes, polyamides, polyimides, polysiloxanes, and the like with polyoxetane being preferred. The polymers desirably have at least one group that is polar which can be an anionic group, a cationic group, or a nonionic group. The polymer can also be amphoteric containing both anionic and cationic groups.

Furthermore, the polymers of the present invention can be caused to react with another compound, or monomer or with another polymer to impart effective wetting, or flow, or leveling properties to a coating prepared therefrom. Alternatively, the polymers of the present invention can be used as an additive with other polymers, copolymers, compositions, etc. to provide improved wetting, or flow, or leveling properties. Compared to molecules used typically as wetting, or flow, or leveling agents, the materials set forth in the present invention have relatively little propensity to cause foaming or surface defects within a broad concentration range. This is often a desirable attribute of a wetting, flow, or leveling agent.

The invention further relates to nonfluorinated oxetane monomers; or oligomers, polymers, or copolymers thereof generally having pendant alkoxy groups. Such monomers can be polymerized in the presence of fluorinated oxetane monomers to produce statistical copolymers thereof. Moreover, block copolymers of the alkoxy oxetanes and the fluorinated oxetanes can be made.

DETAILED DESCRIPTION OF THE INVENTION

The fluorinated short carbon chain compounds of the present invention are generally located on polymers as side chains thereof. These polymers, which contain one or more polar groups are generally dispersible or soluble in water and various hydrocarbon solvents and unexpectedly function as wetting, or flow, or leveling agents providing good optical properties to a coating such as high gloss and good distinctness of image, and thus can be blended with a wide variety of solutions, waxes, polishes, coatings, blends and the like.

Polymers of the present invention contain fluorinated carbon groups generally represented by the formula $R_f$. The $R_f$ groups can be part of the monomer which is reacted to form the polymer or they can be reacted with an already formed polymer. Alternatively, a polymer containing a $R_f$ group such as a fluorinated polyoxetane can be reacted with a polymer or monomer to form a copolymer which thus contains a plurality of pendant short chained $R_f$ groups thereon. Examples of a non-$R_f$ containing copolymer portion are various cyclic ethers, various polyesters, various acrylic polymers, various polysiloxanes, various polyamides, various polyurethanes, and various polymers made from vinyl substituted aromatic monomers.

A wide variety of fluorine-containing polymers can be utilized as generally set forth by the following description:

The polymer can be comprised of repeat units (with repeat units being greater than or equal to 2) of a variety of monomers including cyclic ethers, acrylates, olefins and vinyl moieties. The most preferred monomers are cyclic ethers (including fluorinated cyclic ethers such as those based on hexafluoropropylene oxide) such as oxetanes, and oxiranes. Other preferred monomers include acrylates, vinyls including styrenics, silanes, and siloxanes, as well as polyester forming monomers, polyamide forming monomers, polyimide forming monomers, and polyurethane forming monomers. The polymer may be of the copolymer type comprised of, but not limited to, the aforementioned monomers. The copolymer may be of the statistical or block type. The average degree of polymerization should be at least 2 as to about 100 or 200, and preferably from 2 to about 10 or 20, or 30.

The polymer may contain more than one $R_f$ type group and the types of $R_f$, independently, can be the same or different and are fluorinated alkyl groups such as a linear alkyl group having a main chain of about 7 carbon atoms or less, desirably from about 1 to about 5 or 6 carbon atoms, and preferably 2, 3, or 4 carbon atoms. The $R_f$ alkyl group can be branched. When branched, the longest chain is composed of 7 carbon atoms or less with each branch containing a maximum total of 3 carbon atoms or less. $R_f$, whether linear or branched has at least one carbon atom bonded to at least one fluorine atom. The total amount of fluorine atoms in each $R_f$ group is generally at least 10% or 25%, desirably at least 50% or 75%, and preferably at least 80%, 85%, 90%, or 95%, or even 100% (perfluorinated) of the non-carbon atoms with any remaining non-carbon atoms or nonfluorine atoms being H, or I, or Cl or Br.

The pendant or side chain $R_f$ group can be present on all the monomers comprising the polymer or on a selected few with a preferable range of about 50 to 100% of monomers comprising the polymer containing a pendant or side chain $R_f$ group. A preferred polymer contains one $R_f$ group per repeat unit. The $R_f$ group can be bonded directly to the polymer, or desirably is covalently bonded through another linking moiety or group bonded to the polymer such as a hydrocarbyl, a sulfonyl, an ester, an alkyl sulfide, or the like. A desired moiety is alkyl ether such as

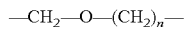  (Formula 1)

where n is from about 1 to about 6 with 1 or 2 being preferred.

The various polymers or copolymers of the present invention desirably have polar groups covalently bonded thereto in order to render them soluble in water or in a solvent. Examples of polar groups covalently bonded to the polymer include anionic groups such as —$CO_2^-$ (Carboxylate), —$SO_3^-$ (Sulfonate), —$OSO_3^-$ (Sulfate), —$OPO_3^-$ (Phosphate), and —$ONO_2^-$ (Nitrate). Cationic counterions groups associated with the just noted anionic polar groups include $Li^+$ (lithium), $Na^+$ (sodium), $K^+$ (potassium), $Cs^+$ (cesium) and ammonium salts of the general formula, $NH_{4-x}R_x^+$ where R is typically a hydrocarbyl radical (e.g. a hydrocarbon radical) having from 1 to 18 carbon atoms and X is 0 to 3, or a quaternary ammonium salt where x=4.

Cationic polar groups covalently bonded to the polymer include $NH_{4-x}R_x^+$ (Ammonium), or a quarternary ammonium and $PH_{4-x}R_x^+$ (Phosphonium) where X is as noted above. Anionic counterions groups connected to said cationic polar groups include $F^-$ (fluoride), $Cl^-$ (chloride), $Br^-$ (bromide), $I^-$ (iodide), and $BF_4^-$ (tetrafluoroborate).

Nonionic polar groups include various polyethers having from 1 to about 100 and preferably from about 2 to about 25 repeat units (n) include —O—$(CH_2CH_2O)_n$—H (poly(ethylene oxide)), —O—$(CH(CH_3)CH_2O)_n$—H (poly(propylene oxide)), various polyether copolymers, carbonyl, carboxyl, nitrile, thiol, or cyano but exclude hydroxyl groups.

Naturally, when a cationic polar group is utilized, it is utilized in conjunction with an anion to form a cation-anion salt, and conversely when an anion end group is utilized it is utilized in conjunction with a cation end group to form an anion-cation salt.

The type of polar group bonded covalently to to the polymer can also be of a mixed anionic/cationic type forming an amphoteric-type polymer. Examples include covalent bonded cationic amine groups and anionic surfactants such as set forth in McCutheon's Volume 1: Emulsifiers & Detergents, North American Edition, The Manufacturing Confectioner Publishing Co., Glen Rock, N.J., 1999, hereby fully incorporated by reference.

Preferably, the polar group(s) are covalently bonded to the end(s) of the polymer; however, the polar group(s) can be covalently bonded at any location along the polymer chain (backbone). The number of polar groups bonded covalently to the polymer can be 1 to about 10 and preferably about 2.

The polar groups can be added by (i) end groups introduced through polymerization (from initiators or chain transfer agents), (ii) modification of aforementioned end groups in (i), (iii) specific reactions on the polymer such as grafting (examples are photografting, radiation grafting and oxidation), (iv) addition reactions (such as that produced by condensation of a polar group-containing isocyanate with a hydroxyl group on the polymer), (v) substitution or metathesis (for example, alkyl halide displacement with $AgBF_4$), and (vi) preferably, esterification of a hydroxyl group with sulfuric acid. Such reactions are known to the art and to the literature.

Types of Polymers or Copolymers Containing Non-Backbone Pendant $R_f$ Groups A preferred class of polymers are those derived from cyclic ethers generally containing from 2 to 5 carbon atoms in the ring and optionally substituted alkyl groups thereon containing from 1 to about 20 carbon atoms. Examples of such cyclic ethers include oxirane (epoxy) functionality such as epichlorohydrin, ethylene oxide, butyl glycidylether, and perfluorooctyl propylene oxide as well as alkyl substituted oxiranes having from 1 to about 20 carbon atoms or mixtures thereof; monomers having a 4-membered cyclic ether group such as oxetane, 3,3-bis(chloromethyl)oxetane, 3,3-bis(bromomethyl)oxetane, and, 3,3-bromo methyl(methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. A preferred polymer is derived from fluorosubstituted short carbon chain oxetane monomers as will be more fully discussed hereinbelow.

Another class of preferred polymers include the various acrylic polymers such as for example, the various poly(alkyl acrylates) or the various poly(alkyl methacrylates) wherein the alkyl portion has from 1 to 18 carbon atoms with 1 to 4 carbon atoms being preferred and wherein the "meth" group can be substituted by a $C_2$ to $C_4$ alkyl. Still other suitable acrylic polymers include the various hydroxyl substituted poly(alkyl acrylates) and hydroxy substituted poly(alkyl methacrylates) wherein the alkyl group is as noted immediately above. Such polymers generally have from about 2 to about 100 repeat units and desirably from about 2 to about 10 or 20 or 30 repeat units. The preparation of such acrylic polymers is known to the literature and to the art. Example of suitable acrylate monomers include ethyl acrylate, propyl acrylate, butyl acrylate, hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethylhexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethylhexyl acrylate, ethyl acrylate, and the like. Hydroxyl alkyl acrylates and methacrylates include hydroxyethyl and hydroxy propylacrylates and methacrylates, and the like, and are also preferred. Examples of still other acrylates are set forth in U.S. Pat. No. 5,055,515, hereby fully incorporated by reference.

Still another class of polymers are those derived from vinyl substituted aromatics having a total of from about 8 to about 12 carbon atoms such as styrene, alpha-methyl styrene, vinyl pyridine, and the like, and copolymers thereof such as those made from conjugated dienes having from 4 to about 12 carbon atoms such as butadiene, isoprene, and the like. The $R_f$ group is generally located on the ring compound. Such polymers can generally have from about 2 to about 100 and desirably from about 2 to about 10 or 20 or 30 repeat units. The preparation of such polymers is known to those skilled in the art as well as to the literature.

The polymer can also be a polyester. Polyesters are generally made by the condensation reaction of one or more dicarboxylic acids, containing a total of from about 2 to about 12 carbon atoms and preferably from about 3 or 4 to about 10 carbon atoms and include aliphatic as well as aromatic acids, with glycols or polyols having a total of from about 2 to about 20 carbon atoms. Polyesters can also be made by the ring opening polymerization of cyclic esters having from 4 to about 15 carbon atoms such as caprolactone, and the like. While numerous types of polyesters exist, such as set forth herein below, preferred polyesters include poly(ethylene terephthalate), poly(butylene terephtalate), and the like. The preparation of polyesters is well known to the art and to the literature.

The polyamides constitutes another class of polymers which can be utilized. The polyamides are made from cyclic amides having a total of from about 4 to about 20 carbon atoms such as polyamide 4 (polybutyrolactam), polyamide 6 (polycaprolactam), polyamide 12 (polylauryl lactam), or polyamides made by the condensation reaction of a diamine monomer having a total of from about 4 to about 15 carbon atoms with a dicarboxylic acid having from about 4 to about 15 carbon atoms such as polyamide 6,6 (a condensation product of adipic acid and hexamethylenediamine), polyamide 6,10 (a condensation product of sebacic acid and hexamethylenediamine), polyamide 6,12, polyamide 12,12, and the like with polyamide 6,6, and polyamide 6,12, being preferred. Such polyamides often have from about 2 to about 100 and desirably from about 2 to about 10 or 20 or 30 repeat units. The preparation of such polyamides is well known to the art and to the literature. Examples of the above polyamides as well as others are set forth in U.S. Pat. No. 5,777,033, which is hereby fully incorporated by reference.

The polysiloxanes still constitute another class of polymers which can be utilized in the present invention. The polysiloxanes are generally made from dihydroxysilane which react with each other by dehydration and dehydrochlorination. The side groups of the monomers are generally an alkyl having from 1 to about 20 carbon atoms. The number of repeat groups of the polysiloxanes is generally from about 2 to about 100 and desirably from about 2 to about 10 or 20 or 30. The preparation of the polysiloxanes is well known to the art and to the literature. Examples of suitable polysiloxanes are set forth in U.S. Pat. No. 4,929,664, which is hereby fully incorporated by reference.

The preparation of polyurethanes generally proceed in a stepwise manner as by first reacting a hydroxyl terminated polyester or polyether with a polyisocyanate such as a diisocyanate and optionally, subsequently chain extending and/or crosslinking the same. The polyether monomers of the intermediate can generally have from 2 to about 6 carbon atoms whereas the polyester intermediates can be made from diols and dicarboxylic acids as noted herein above with regard to the preparation of the various polyesters. Suitable diisocyanates generally have the formula $R(NCO)_X$ where X equals 2, 3 or 4 with 2 being preferred. R can be an aliphatic, an aromatic, or combinations thereof having from about 4 to about 20 carbon atoms. Such polyurethanes generally have from about 2 to about 100 and desirably from 2 to about 10 or 20 or 30 repeat units. The preparation of polyurethanes are well known to the art and to the literature. Examples of suitable polyurethanes are set forth in U.S. Pat. No. 4,975,207, which is hereby fully incorporated by reference.

Polyfluorooxetanes

As noted above, desired fluorine containing polymers are those wherein the repeat units are obtained from cyclic ethers. Polymerization of such ethers generally proceeds by a cationic or an anionic mechanism. A desired fluorine containing polymer of the present invention is an oxetane polymer containing fluorinated side chains. The monomers as well as the polyoxetane oligomers, polymers, or copolymers can be prepared in a manner as set forth herein below, and also according to the teachings of U.S. Pat. Nos. 5,650,483; 5,668,250; 5,668,251; and 5,663,289, hereby fully incorporated by reference. The oxetane monomer desirably has the structure

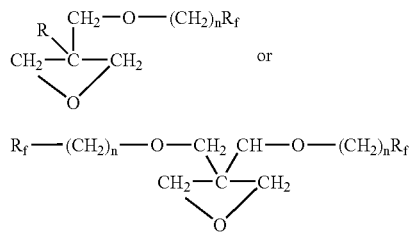

2A

2B which when polymerized will have repeat units:

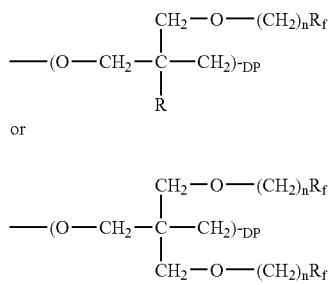

2AA or

2BB wherein as noted above, n is an integer from 1 to about 3 or to about 6 and $R_f$, independently, on each monomer is a linear or branched, unsaturated, or preferably saturated alkyl group of 1 to about 7, or about 10, or about 15, or about 20 carbon atoms with a minimum of 25, 50, 75, 80, 85, 90 or 95, or preferably perfluorinated i.e. 100 percent of the H atoms of said $R_f$ being replaced by F, and optionally up to all of the remaining H atoms being replaced by I, Cl or Br. When $R_f$ is desirably a short chain, and has from 1 to about 5 or 6 carbon atoms and preferably contains 2, 3, or 4 carbon atoms. $R_f$ can either contain a linear alkyl group or a branched alkyl group. When it is a branched group, the main chain contains from 1 to 7 carbon atoms and each branch chain can contain up to 3 carbon atoms as well. R is hydrogen, or an alkyl from 1 to 6 carbon atoms with methyl or ethyl being preferred.

Preferably, the $R_f$ group is present on the monomer used to prepare the polymer, but the $R_f$ group can be added after the polymer is formed. For example, a typical reaction scheme involves the condensation of a commercially available $R_f$ alcohol with a carboxylic acid group pendant or side chain on the polymer backbone.

The polymerization of the various monomers are usually conducted in the presence of an inert solvent, either hydrocarbon or a halogenated solvent containing from 1 to about 6 carbon atoms with specific examples including methylene chloride, carbon tetrachloride, trichloroethylene, chlorobenzene, dichloroethane, and the like. Polymerization is conducted in the presence of a Lewis catalyst such as complexes of boron trifloride, for example $BF_3$.etherate and $BF_3$.THF, $BF_3$.THPYRAN, phosphorus pentafluoride, antimony pentafluoride, zinc chloride, aluminum bromide, and the like with $BF_3$.THF being preferred. Suitable initiators are mono or polyhydroxy alcohols containing carbon-fluorine bonds or carbon-hydrogen bonds or combinations thereof and having from 2 to about 5 carbon atoms such as ethylene glycol, butane-1,4-diol, propylene glycol, isobutane-1,3-diol, pentane-1,5-diol, pentaerythritol, trimethylolpropane, and the like, or methanol, etc.

The above polymers derived from the noted oxetane monomers generally have the structure set forth in formulas 5A and 5B (MOX) if a monoalcohol initiator is utilized or have the structure as set forth in formulas 3A and 3B, if a diol initiator is utilized

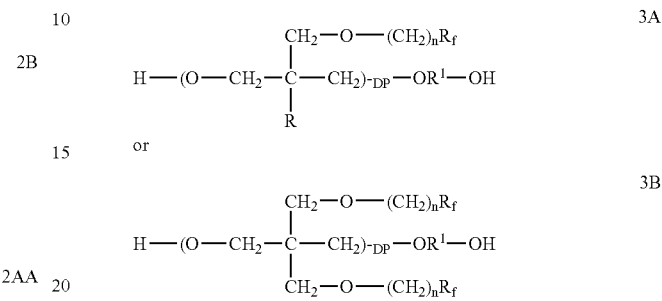

3A or

3B where n, $R_f$, and R are as described above. As the DP of the polymer increases, the probability increases that the polymer will initiate on both sides of the $R^1$ group of the alcohol initiator and thus the right side of Formulas 3A and 3B will be a mirror image of the left side except that the DP of each side may not be equal. $R^1$ is an alkyl having from 1 to about 18 carbon atoms and is generally derived from a diol used in preparing the polymer.

As noted above, polymers of formulas 3A, 3AA, 3B, and 3BB are obtained by cationic polymerization.

The average degree of polymerization (DP) of polyoxetane (polymer) of the fluorinated polyoxetanes is generally from about 1 to about 500, desirably from about 2 or 3 to about 50 or 100, and preferably from about 4 to about 10, 20, or 30.

While the following representative examples relate to the preparation of specific FOX (fluorooxetane) monomers, (i.e. mono 3-FOX, mono 7-FOX, and bis 3-FOX). Other mono or bis FOX monomers can be prepared in a similar manner as set forth in U.S. Pat. Nos. 5,650,483; 5,668,250; 5,668,251; and 5,663,289, herein fully incorporated by reference.

EXAMPLE M1

Preparation of 3-FOX Monomer 3-(2,2,2-Trifluoroethoxymethyl)-3-Methyloxetane

Synthesis of the 3-FOX oxetane monomer is performed as follows:

A dispersion of 50 weight percent (2.8 grams, 58.3 mmol) sodium hydride in mineral oil, was washed twice with hexanes and suspended in 35 milliliters of dimethyl formamide. Then, 5.2 grams (52 mmol) of trifluoroethanol was added and the mixture was stirred for 45 minutes. A solution of 10.0 grams (39 mmol) of 3-hydroxymethyl-3-methyloxetane p-toluenesulfonate in 15 milliliters of dimethyl formamide was added and the mixture was heated at 75° C.–85° C. for 20 hours, when $^1$H MNR analysis of an aliquot sample showed that the starting sulfonate had been consumed.

The mixture was poured into 100 milliliters of ice water and extracted with 2 volumes of methylene chloride. The combined organic extracts were washed twice with water, twice with 2 weight percent aqueous hydrochloric acid, brine, dried over magnesium sulfate, and evaporated to give 6.5 grams of 3-(2,2,2-trifluoroethoxymethyl)-3-methyloxetane as an oil containing less than 1 weight percent dimethyl formamide. The yield of this product was 90 percent. The oil was distilled at 30° C. and 0.2 millimeters mercury pressure to give 4.3 grams of analytically pure 3-FOX, corresponding to a 60 percent yield. The analyses of the product were as follows: IR (KBr) 2960–2880, 1360–1080, 990, 840 cm$^{-1}$; $^1$H NMR δ 1.33 (s, 3H), 3.65 (s, 2H), 3.86 (q, J=8.8 Hz, 2H), 4.35 (d, J=5.6 Hz, 2H), 4.51 (d, J=5.6 Hz, 2H); $^{13}$C NMR δ 20.72, 39.74, 68.38 (q, J=40 Hz), 77.63, 79.41, 124 (q, J=272 Hz). The calculated elemental analysis for $C_7H_{11}F_3O_2$ is: C=45.65; H=6.02; F=30.95. The experimental analysis found: C=45.28; H=5.83; F=30.59.

EXAMPLE M2
Preparation of 7-FOX Using PTC Process 3-(2,2,3,3,4,4,4-Heptafluorobutoxymethyl)-3-Methyloxetane A 2 L, 3 necked round bottom flask fitted with a reflux condenser, a mechanical stirrer, a digital thermometer and an addition funnel was charged with 0.3-bromomethyl-3-methyloxetane (351.5 g, 2.13 mol), heptafluorobutan-1-ol (426.7 g, 2.13 mol), tetrabutylammonium bromide (34.4 g) and water (85 mL). The mixture was stirred and heated to 75° C. Next, a solution of potassium hydroxide (158 g, 87% pure, 2.45 mol) in water (200 mL) was added and the mixture was stirred vigorously at 80°–85° C. for 4 hours. The progress of the reaction was monitored by GLC and when GLC analysis revealed that the starting materials were consumed, the heat was removed and the mixture was cooled to room temperature. The reaction mixture was diluted with water and the organic layer was separated and washed with water, dried and filtered to give 566 g (94%) of crude product. The crude product was transferred to a distillation flask fitted with a 6 inch column and distilled as follows:

Fraction #1, boiling between 20° C.–23° C./10 mm-Hg, was found to be a mixture of heptafluorobutanol and other low boiling impurities, was discarded;

Fraction #2, boiling between 23° C. and 75° C./1 mm-Hg, was found to be a mixture of heptafluorobutanol and 7-FOX, was also discarded; and Fraction #3, boiling at 75° C./1 mm-Hg was >99% pure 7-FOX representing an overall yield of 80.2%

NMR and GLC data revealed that 7-FOX produced by this method was identical to 7-FOX prepared using the sodium hydride/DMF process.

Example M3 relates to the preparation and properties of 3,3-bis(2,2,2-trifluoroethoyxmethyl)oxetane (B3-FOX).

EXAMPLE M3

Sodium hydride (50% dispersion in mineral oil, 18.4 g, 0.383 mol) was washed with hexanes (2×) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2×). The combined organic extracts were washed with brine, 2% aqueous HCl, water, dried (MgSO$_4$), and evaporated to give 17.5 g (100%) of 3,3-bis-(2,2,2-trifluoroethoxymethyl) oxetane as an oil containing DMF (<1%). The oil was purified by bulb-to-bulb distillation at 42° C.–48° C. (10.1 mm) to give 15.6 g (79%) of analytically pure B6-FOX, colorless oil: IR (KBr) 2960–2880, 1360–1080, 995, 840 cm$^{-1}$; $^1$H NMR δ 3.87 (s 4H), 3.87 (q, J=8.8 Hz, 4H), 4,46 (s, 4H); $^{13}$C NMR δ 43.69, 68.62 (q, J=35 Hz), 73.15, 75.59, 123.87 (q, J=275 Hz); $^{19}$F NMR δ–74.6 (s). Anal. Calcd, for $C_9H_{12}F_6O_3$; C, 38.31; H, 4.29; F, 40.40. Found: C, 38.30; H, 4.30; F, 40.19.

EXAMPLE M4

Anhydrous preparation of 9-FOX monomer

| Material | Scale | Weight (S × Ratio) g | MW | mmoles | Mole Ratio |
|---|---|---|---|---|---|
| nonafluorohexanol | 1000 | 1000.00 | 264.09 | 3786.59 | 1.00 |
| BrMMO | | 656.11 | 165.02 | 3975.91 | 1.05 |
| 18-crown-6 | | 25.00 | 322.37 | 77.55 | 0.020 |
| KOH (86%) | | 271.71 | 56.10 | 4165.25 | 1.10 |
| 5% ammonium chloride | | 615.70 | 18.01 | 34186.56 | 9.03 |
| Water | | 588.10 | 18.01 | 32654.08 | 8.62 |
| Theoretical Yield, (g) | 1311.1 | | | | |
| Expected Yield, low (g) | 983.3 | | | | |
| Expected Yield, high (g) | 1245.5 | | | | |
| Solids Loading, % | 67.1 | | | | |
| | ml | | | | |
| Volume after KOH addn. | 1,440.8 | | | | |
| Volume after quench | 2056.5 | | | | |
| Volume after phase split | 1185.5 | | | | |
| Volume after wash | 1773.6 | | | | |

A 3 liter 3-necked round-bottomed flask was equipped with a mechanical stirrer, nitrogen inlet and outlet, temperature probe, dean-stark trap, and reflux condenser. Nonafluorohexanol (1000 grams, 3.78 moles), BrMMO (656.11 grams, 3.97 moles), 18-crown-6 (25.00 grams) and 200 ml hexane were added, and the solution was allowed to heat to 79° C. Ground solid Potassium hydroxide (271.71 grams, 86%, 4.16 mmol) was added over 90 minutes, while removing water using the dean stark trap. The reaction was allowed to stir for 2 hours, while water was removed continuously. After 2 hours, 43.53 grams of water had been remove, or 64%, and the reaction was short on BrMMO, so 65 g (7% additional) and 24.7 grams potassium hydroxide (0.1 equivalents) was added. After an additional 20 minutes, 60.21 grams of water, or 88% had been removed, so the reaction was filtered to remove salts, and washed with water. The hexane monomer solution was distilled under vacuum, 27.5 in Hg, 60° C.–120° C. monomer-BrMMO-nonafluorohexanol azeotrope, 9-FOX monomer 125° C. 983.25 grams of 9-FOX monomer, 75% yield.

A copolymer of two or more FOX monomers can be synthesized to produce desirable products. Additionally, copolymers with non-fluorinated cyclic ethers can be prepared, preferably with oxetane and/or tetrahydrofuran (THF) monomers.

As noted, preparation of polymers or copolymers from the fluorinated oxetane monomers described herein can be made in accordance with U.S. Pat. Nos. 5,650,483; 5,668,250; 5,668,251; or 5,663,289; hereby fully incorporated by reference.

EXAMPLE P1
Homopolymerization of 3-FOX 3-(2,2,2-Trifluoroethoxymethyl)-3-methyloxetane A solution of 34.3 milligrams (0.38 mmol) of butane-1,4-diol and 109.7 milligrams (0.77 mmol) of boron trifluoride etherate in 4 grams of methylene chloride was stirred at ambient temperature for 15 minutes under nitrogen in a dry polymerization flask. The solution was cooled to 1.5° C. and a solution of 1.20 grams (6.52 mmol) of 3-(2,2,2-trifluoroethoxymethyl)-3-methyloxetane in 1.3 grams of methylene chloride was added. The resultant solution was stirred for 5 hours at 1–2° C. at which time $^1$H NMR analysis of an aliquot indicated that the starting oxetane had been consumed. The solution was warmed to ambient temperature and quenched with water. The organic layer was washed with brine, 2 weight percent aqueous hydrochloric acid, and evaporated to give 1.053 grams of poly-3-(2,2,2-trifluoroethoxymethyl)-3-methyloxetane as an oil, corresponding to a 88 percent yield. The polymer analyses were: DSC Tg −45° C., decomposition temperature was greater than 200° C.; GPC $M_n$=7376, $M_w$=7951, polydispersity 1.08, inherent viscosity 0.080 dL/g; Equivalent Weight by $^1$H NMR=6300; $^1$H NMR δ 0.95 (s, 3H), 3.26 (m, 4H), 3.52 (s, 2H) 3.84 (q. 2H); $^{13}$C NMR δ 17.57, 42.09, 69.30 (q, J=33 Hz), 74.42, 75.90, 125.18 (q, J=280 Hz).

EXAMPLE P2a-3-FOX AND P2b-5-FOX
Synthesis of poly(3-trifluoroethoxymethyl-3-methyloxetane), 2a and poly(3-pentafluoropropoxymethyl-3-methyloxetane)2b A three-necked, 125 mL jacketed vessel with heater/chiller bath, thermometer, stir bar, condenser, addition funnel and inert gas inlet and outlet is charged with dried neopentyl glycol (329.92 g, 3.17 mol), $BF_3$. THF (177.26 g, 1.27 mol) catalyst and $CH_2Cl_2$ (1.86 Kg, 21.84 mol) solvent. The neopentyl glycol was dried by dissolution in toluene and removing solvent under reduced pressure. The initiator and catalyst solution was allowed to stir for 30 minutes at room temperature under a positive pressure nitrogen purge. Monomer 2a (3.50 Kg, 19.01 mol) was then added to the catalyst/initiator solution at a rate ≈50 g/min using a pump while maintaining the reaction temperature at 35±10° C. The reaction was allowed to stir for 2 hours. Extra $CH_2Cl_2$ was added (2.8 Kg, 32.97 mol). Residual $BF_3$. THF was removed by washing with 2.5 wt % sodium bicarbonate and a water rinse at 40° C. Solvent was then removed under reduced pressure at 80° C. Polymer 2a was obtained as a clear, viscous liquid in 95%+yield. Degree of polymerization was determined using $^1$H NMR spectroscopic analysis and found to be 7. Polydispersity was determined using GPC and found to be 1.54. Polymer 2b was prepared similarly in 95%+% yield. For 2a: $^1$H NMR (CDCl$_3$): 0.86–0.92 CH$_3$, 3H), 3.20 (backbone-CH$_2$—, 4H), 3.43–3.44 (—CH$_2$O—, 2H), 3.81–3.93 (—OCH$_2$—, 2H). $^{13}$C NMR (CDCl$_3$): 17.1–17.3 (—CH$_3$), 41.0–41.4 (backbone-C—), 69.0 (—OCH$_2$—, q, $J_{19_F13_C}$=43 Hz), 75.3–75.5 (ring-CH$_2$—), 76.0 (—CH$_2$O—), 124.1 (—CF$_3$, q of t, $J_{19_F13_C}$=350 Hz, $J_{1_H13_C}$=6.3 Hz). For 2b: $^1$H NMR (CDCl$_3$) 0.86–0.92 CH$_3$H), 3.20 (backbone-CH$_2$—, 4H), 3.43–3.44 (—CH$_2$O—, 2H), 3.81–3.93 (—OCH$_2$—, 2H). $^{13}$C NMR (CDCl$_3$): 17.0–17.3 (—CH$_3$), 41.0–41.4 (-backbone-C—), 68.2 (—OCH$_2$—, d of t, $J_{19_F13_C}$=6.3 and 31 Hz), 75.5 (—CH$_2$O—), 73.8–74.1 (backbone-CH$_2$—), 113.2 (—CF$_2$—, t of q, $J_{19_F13_C}$=50.2 and 352 Hz), 118.8 (—CF$_3$, q of t, $J_{19_F13_C}$=50.2 and 314 Hz).

EXAMPLE P3

Synthesis of Poly-9-FOX diol, DP 4

| Compound | Scale | Weight (S × Ratio) G | MW | Moles | Mole Ratio | δ | ml |
|---|---|---|---|---|---|---|---|
| 9-FOX | 500.0 | 500.000 | 348.21 | 1.44 | 20.00 | 1.150 | 434.8 |
| Methylene Chloride | | 265.000 | 84.93 | 3.12 | 43.46 | 1.330 | 199.2 |
| Neopentyl Glycol | | 37.388 | 104.15 | 0.36 | 5.00 | 1.017 | 36.8 |
| BF$_3$THF | | 10.044 | 139.90 | 0.07 | 1.00 | 1.268 | 7.9 |
| Methylene Chloride | | 400.000 | 84.93 | 4.71 | 65.60 | 1.330 | 300.8 |
| 5% sodium bicarbonate | | 250.00 | 84.01 | 0.149 | 2.07 | 1.000 | 250.0 |
| Water | | 425.000 | 18.01 | 23.60 | 328.68 | 1.000 | 425.0 |
| Desired Dp | 4 | | | | | | |
| Theoretical Yield (g) | 542.56 | | | | | | |
| Expected Yield, Low (g) | 488.31 | | | | | | |
| Expected Yield, High (g) | 515.44 | | | | | | |
| Solids Loading, % | 66.78% | | | | | | |
| Max wt % BF3THF (incorporated as THF) | 1.85% | | | | | | |
| | | ml | | | | | |
| Initial Volume | | 678.71 | | | | | |
| Volume after quench, ml | | 1404.47 | | | | | |
| Volume after wash, ml | | 1404.47 | | | | | |

A 2 liter 3-necked reaction flask equipped with a magnetic stirrer, Monomer addition funnel, nitrogen inlet and outlet, temperature probe and reflux condenser was allowed to equilibrate at 25° C. The reactor was charged with 265 grams of methylene chloride, neopentyl glycol (37.39 g, 360 mmol), and boron trifluoride tetrahydrofuran complex (10.04 gl, 71.76 mmol). The reaction mixture was allowed to stir for 30 minutes. 9-fox monomer (500 grams, 1,436 mmol) was added over 1 hour. The temperature reached 31.2 with no induction period. The temperature reached a maximum of 37° C. The reaction was allowed to stir for 2 hours. Additional methylene chloride was added (400 grams) and the solution was then washed with 250 ml 5% sodium bicarbonate and 425 ml water to remove the boron trifluoride tetrahydrofuran complex. The solution was then dried with magnesium sulfate, and the solvent was removed. PolyFOX N Dp 4.2 (513.1 grams) was isolated.

While a polyoxetane homopolymer is preferred, optionally a copolymer derived from one or more different monomers can be used. The polyoxetane copolymer can be made from comonomers such as cyclic ethers having total of from 2 to about 5 carbon atoms in the ring, for example an epoxy (oxirane) functionality such as epichlorohydrin, propylene oxide, ethylene oxide, butyl glycidylether, and perfluorooctyl propylene oxide as well as alkyl substituted oxiranes having from 1 to about 20 carbon atoms or mixtures thereof; monomers having a 4-membered cyclic ether group such as 3,3-bis(chloromethyl)oxetane, 3,3-bis(bromomethyl)oxetane, and, 3,3-bromo methyl(methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The number of alkyl substituted carbon atoms substituted on any ring carbon atom is from 1 to about 20. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers. A preferred copolymer is made from tetrahydrofuran.

EXAMPLE CP (FOX-THF)

An example of preparing a poly-FOX-THF copolymer is as follows:

A 10 L jacketed reaction vessel with a condenser, thermocouple probe, and a mechanical stirrer was charged with anhydrous methylene chloride (2.8 L), and 1,4-butanediol (101.5 g, 1.13 moles). $BF_3THF$ (47.96 g, 0.343 moles) was then added, and the mixture was stirred for 10 minutes. A solution of 3-FOX, 3-(2,2,2-trifluoroethoxyl-methyl)-3-methyloxetane, made in accordance with U.S. Pat. Nos. 5,650,483; 5,668,250; 5,663,289; or 5,668,251, (3,896 g. 21.17 moles) in anhydrous methylene chloride (1.5 L) was then pumped into the vessel over 5 hours. The reaction temperature was maintained between 38 and 42° C. throughout the addition. The mixture was then stirred at reflux for an additional 2 hours, after which $^1$H NMR indicated >98% conversion. The reaction was quenched with 10% aqueous sodium bicarbonate (1 L), and the organic phase was washed with 3% aq. HCl (4 L) and with water (4 L). The organic phase was dried over sodium sulfate, filtered, and stripped of solvent under reduced pressure to give 3,646 g (91.2%) of title glycol, a clear oil. NMR: The average degree of polymerization (DP) was determined by end group anaylsis. The hydroxl functional end groups were reacted with trifluoroacetic anhydride at room temperature and the derivative compound characterized by $^1$H-NMR spectroscopy. The degree of polymerization was calculated by the ratio of the area of the methyl resonance and the area of terminal methylene. The DP was 15.2 which translates to an equivalent weight of 2804. The THF content of this glycol, as determined by $^1$H NMR, was 2.5% wt THF (6.2% mole THF). This example was included to teach how to polymerize partially fluorinated oxetane polymers.

Copolymer Formation

The above-noted fluorinated oxetane oligomers, polymers, or copolymers can subsequently be reacted with another polymer and/or curing agent to form a copolymer or a cured polymer or a cured copolymer. Examples of suitable monomers forming a copolymer include the above noted monomers such as the various cyclic ethers, the various acrylic monomers, the various vinyl substituted aromatic monomers, the various polyester forming monomers, the various polyurethane forming monomers, or the various polyamide forming monomers, or the various siloxane monomers, all of which are hereby fully incorporated by reference. The various curing or crosslinking agents are known to the literature and to the art and include the various amino resins as set forth herein below. These copolymer forming monomers and/or curing agents are reacted with the wetting, or flow, or leveling agents subsequent to formation thereof.

Poly(Fluorooxetane-Ester) Copolymers

As noted above, copolymers of the polyoxetane with another monomer or polymer can be made. Preparation of various polyoxetane-ester copolymers and desirable block copolymers are set forth in U.S. application Ser. No. 09/035,595, filed Mar. 5, 1998; Ser. No. 09/244,711, filed Feb. 4, 1999; Ser. No. 09/384,464, filed Aug. 27, 1999; Ser. No. 09/698,554, filed Oct. 27, 2000, and Ser. No. 10/091,754 filed Mar. 6, 2002, which are hereby fully incorporated by reference. A desired copolymer is that of an oxetane and an ester. The polyester can be preformed and reacted with the polyoxetane or formed in situ by reacting ester forming monomers with the polyoxetane. However, it is highly desirable to prereact, endcap, the hydroxyl terminated fluorinated polyoxetane polymer, or copolymer, (polyoxetane block) with a polycarboxylic acid or anhydride thereof for ease of incorporation of the fluorinated moiety into a polyester via an ester linkage. This route increases the rate of incorporation, and generally the percentage of fluorinated polyoxetane that is incorporated into the polyester or other polymer. Subsequent thereto, the polyester block can be formed. Such block copolymers can then be cured utilizing amino resins.

A preferred route to form the ester linkage is to react the hydroxyl terminated partially fluorinated polyoxetane with at least 2 moles of a carboxylic acid from a polycarboxylic acid having from 3 to 10 or 30 carbon atoms such as malonic acid, or succinic acid, or glutaric acid, or adipic acid, or pimelic acid, or maleic acid, or fumaric acid, or cyclohexane dioic acid, and the like, an anhydride, thereof, per equivalent of hydroxyl groups from any polyol component under conditions effective to form an ester condensation product from the hydroxyl group of the polyoxetane and the carboxylic acid group of the polycarboxylic acid or its anhydride. More desirably, the equivalents of carboxylic acid groups are at least 2.05 or 2.1 equivalents. The reaction temperature is generally from about 110 to about 275° C. and desirably from about 215° C. to about 250° C. In a preferred embodiment, the amount of non-fluorinated polyol is small or zero to force the carboxylic acid groups to react with the hydroxyl group of the partially fluorinated polyoxetane. Desirably, the equivalents of hydroxyls from non-fluorinated polyols are less than 0.5, more desirably less than 0.2 and preferably less than 0.1 per equivalent of hydroxyls from the partially fluorinated polyoxetane until after at least 70, 80, 90, or 95 mole percent of the hydroxyl groups of the polyoxetane are converted to half esters with the polycarboxylic acid. It is also acknowledged that the percentage of the polymer with said oxetane repeating units and the oxetane repeating units themselves may not be uniformly distributed through the bulk of the polyester. Said oxetane repeating units are usually disproportionately present at the surface of the coating due to the low surface tension of those repeat units. The amount of surface fluorine groups can be determined by XPS (x-ray photoelectron spectroscopy).

The polyester resins are made by a condensation polymerization reaction in the presence of heat and usually a catalyst with polycarboxylic acids or anhydrides thereof and polyols. Alternatively, internal or cyclic esters can be utilized containing a total of from about 4 to about 15 carbon atoms such as caprolactone. Reaction temperatures generally range from about 110° C. to about 275° C., and desirably from about 215° C. to about 250° C. with suitable catalysts being such compound as dibutyl tin oxide and the like. Reaction temperatures of the cyclic esters are generally lower, such as from about 10° C. or 20° C. to about 30° C. or 50° C. or 100° C. Preferred polycarboxylic acids are the dicarboxylic acids and their anhydrides. Fatty monobasic oils or fatty acids, monohydroxy alcohols and anhydrides can be present. The polyester may contain active hydrogen atoms, e.g., carboxylic acid groups and/or hydroxyl groups for reaction with the amino resin or can contain unsaturation for crosslinking by another mechanism such as copolymerization with ethylenically unsaturated monomers. Examples of some acids to use to form the alkyd resin or reactive polyester are adipic acid, cyclohexane dioic acid, azelaic acid, sebacic acid, terephthalic acid, isophthalic acid, phthalic anhydride, and so forth. Generally the aliphatic carboxylic acids have from about 3 to about 10 carbon atoms. Other carboxylic acids such as carbonic acid or phosgene may be used in lieu of carboxylic acids under appropriate conditions. The aromatic carboxylic acids generally have from about 8 or 10 to about 25 or 30 carbon atoms. The polyhydric alcohols (polyols) generally have from about 2 to about 20 carbon atoms and from about 2 to about 5 hydroxyl groups. Polymeric polyols such as formed from the polymerization of cyclic alkylene oxides may be used as a portion or all of the polyhydric alcohol. Polymeric polyols generally have number average molecular weights from 100 to 5,000 or 10,000. Examples of some polyhydric alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Mixtures of the polyols and polycarboxylic acids can be used. An example of a suitable reactive polyester is the condensation product of trimethylol propane, 2,2-dimethyl-1,3-propanediol, 1,4-cyclohexanedimethanol, isophthalic acid or phthalic anhydride, and adipic acid, hereinafter "VR-248 resin". Mixtures of these reactive polyesters (alkyd resins) can be used. Alkyd resins are well known as shown by the "Encyclopedia of Polymer Science and Technology," Vol. 1, 1964, John Wiley & Sons, Inc., pages 663–734; "Alkyd Resins," Martens, Reinhold Publishing Corporation, New York, 1961 and "Alkyd Resin Technology," Patton, Interscience Publishers, a division of John Wiley and Sons, New York, 1962. Some unsaturated polycarboxylic acids and unsaturated polyols may be used in the condensation reaction.

The polyester segments of the polyester may also be polymerized from cyclic ethers typically containing 2 or 3 or 4 carbon atoms in the ring and an anhydride (e.g. an unsaturated anhydride) using double metal complex cyanide catalysts. These polyesters can be used with a carboxylic half ester functionalized polyoxetane because of the occurrence of ester interchange reactions whereby polyester polymers cleave to form carboxylic acid and hydroxyl end groups and then couple with other polyester fragments via an ester linkage. Generally any cyclic oxide can be utilized such as 1,2-epoxides, oxetanes, and the like, with the cyclic ether having a total of up to 18 carbons atoms, as for example 2 carbon atoms in the ring and up to 16 carbon atoms in the side chains. Such cyclic oxide monomers can also contain one or more aliphatic double bonds. Generally five-member unsaturated cyclic anhydrides are preferred, especially those having a molecular weight between 98 and 400. Mixed anhydrides can be used. Anhydrides include phthalic, itaconic, nadic etc. Halogenated anhydrides can also be used. Such polyesters are known to the art and described in U.S. Pat. No. 3,538,043 which is hereby incorporated by reference.

The number average molecular weight of the polyester polymer or block, whether preformed, or formed in situ, is desirably from about 100 to about 5,000 or 20,000. It is understood that in all these reactions, the possibility exists that some of the polyester molecules will not include any polyoxetane. The polyester compositions of the present invention can be formed by reacting the ester forming monomers in the presence of a derivative of the above noted fluorinated polyoxetane polymer, or copolymer which contains an ester linkage derived from the reaction of a polycarboxylic acid or anhydride with the fluorooxetane. Alternatively, a preformed polyester can be formed which is then reacted with the fluorinated polyoxetane polymer, or copolymer containing the noted ester linkage. In other words, the polyester can be formed or derived or polymerized in the presence of the polyfluorooxetane derivative or it can be initially polymerized and subsequently reacted as through a hydroxyl end group with a polyoxetane having the ester linkage thereon.

The amount of fluorinated polyoxetanes in said polyester is desirably from about 0.05 or 0.1 or 0.2 to about 10, 15 or 50 weight percent based on the weight of the polyester including the polyoxetane portion. The polyester can be diluted with other components (including non-fluorinated polyesters) while preparing a coating or other polymer composition. The repeating units from a polyester are desirably from about 50 to about 99.8 weight percent of the polyester and polyoxetane and more desirably from about 85 or 90 to about 99 weight percent.

Additionally other conventional additives may be formulated into the polyester-polyoxetane composition for particular applications. Examples include viscosity modifiers, antioxidants, antiozonants, processing aids, pigments, fillers, ultraviolet light absorbers, adhesion promoters, emulsifiers, dispersants, solvents, crosslinking agents, etc.

Since the poly(fluorooxetane-ester) copolymers described hereinabove generally contain a hydroxyl end group or can be formulated to readily contain such an end group, they can be utilized with such a polar group thereon. Alternatively, they can be reacted with various compounds to produce an anionic, cationic, nonionic, or amphoteric end groups in a manner as set forth hereinabove, and hereby fully incorporated by reference. Such poly(fluorooxetane-ester) copolymers containing one or more polar groups thereon, and often two polar groups, can be utilized as wetting agents, or flow agents, or leveling agents for various uses as set forth herein below. The ester portion of the poly(flurooxetane-ester) copolymers will generally act as a compatibilizing agent for the flurooxetane portion of the copolymer and improve solubility as well as incorporation into various other polymers. Such copolymers can act as a non-fugitive wetting, or flow, or leveling agent.

Various polyfluorooxetane-polyester copolymers were made in the following manner.

EXAMPLE CP-I

Two different hydroxyl terminated fluorinated polyoxetane-THF copolymers were made in a manner as set forth in Example CP to prepare four different polyester materials. The first polyoxetane had 6 mole % repeating units from tetrahydrofuran (THF) with the rest of the polymer being initiator fragment and repeating units from 3-FOX where n=1, $R_f$ is $CF_3$, and R is $CH_3$. The number average molecular weight of the first polyoxetane was 3400. The second polyoxetane had 26 mole % of its repeating units from tetrahydrofuran with the residual being the initiator fragment and repeating units from 3-FOX. 3-FOX is also known as 3-(2,2,2-trifluoroethoxylmethyl)-3-methyloxetane.

EXAMPLE CP-II

FOX-Polyester Copolymers

The first and second fluorinated oxetane polymers of Example CP-1 were reacted with at least a 2 equivalent excess (generally 2.05–2.10 excess) of adipic acid in a reactor at 455° F. for 3.5 hours to form a polyoxetane having the half ester of adipic acid as end groups. This half ester linkage will serve to chemical bond the polyoxetane to a subsequently in-situ formed polyester. In other words, this polyoxetane has a preformed ester linkage. NMR analysis was used to confirm that substantially all the hydroxyl groups were converted to the ester groups. The average degree of polymerization of the first oxetane polymer was reduced from 18 to 14 during the reaction with adipic acid. The average degree of polymerizations of the second oxetane polymer remained at 18 throughout the reaction. The reactants were then cooled to 300° F.

The adipic acid functionalized polyoxetane was then reacted with additional diacids and diols to form polyester (VR-248) blocks. The diacids were used in amounts of 24.2 parts by weight of adipic acid and 24.5 parts by weight of isophthalic acid. The diols were used in amounts of 20.5 parts by weight cyclohexanedimethanol, 14.8 parts by weight neopentyl glycol, and 16.0 parts by weight trimethylol propane. The relative amounts of the adipate ester of the oxetane polymer and the polyester forming components was adjusted to result in polyesters with either 2 or 4 weight percent of partially fluorinated oxetane repeating units. The reactants were reacted in the same pot used to react the adipic acid but the reaction temperature was lowered to 420° F. The reaction time was continued until the calculated amount of water was generated. The finished batch sizes were from 20 to 30 gallons.

EXAMPLE CP-III

FOX-Caprolactone Copolymers

This example relates to the reaction of caprolactone monomers in the presence of a fluorinated polyoxetane to generally form a block fluorinated polyoxetane-ester copolymer. The copolymer can contain a hydroxyl end group. However, inasmuch as the copolymer contains a lactone group, the same can be modified in a manner set forth hereinabove to contain other polar groups, for example an anion, or a cation, or both, or a nonionic, thereby rendering the copolymer more water soluble.

| PREPARATION OF A OXETANE CAPROLACTONE (ESTER) COPOLYMERS | | | | | | | |
|---|---|---|---|---|---|---|---|
| Compound | Scale | Ratio | MW | Moles | Mole Ratio | d (g/mL) | mL |
| 3-FOX | 100.0 | 1.0 | 184.15 | 0.54 | 50.34 | 1.150 | 87.0 |
| Caprolactone | | 0.54 | 114.14 | 0.47 | 43.86 | 0.886 | 60.9 |
| Methylene Chloride | | 0.53 | 84.93 | 0.62 | 57.85 | 1.330 | 39.8 |
| Neopentyl glycol | | 0.02812 | 104.15 | 0.03 | 2.50 | 1.017 | 2.8 |
| BF$_3$THF | | 0.015092 | 139.90 | 0.01 | 1.00 | 1.268 | 1.2 |
| Methylene Chloride | | 0.8 | 84.93 | 0.94 | 87.32 | 1.330 | 60.2 |
| Water | | 0.43 | 18.01 | 2.39 | 221.32 | 1.000 | 43.0 |
| Water | | 0.85 | 18.01 | 4.72 | 437.50 | 1.000 | 85.0 |
| Theoretical Yield (g) | 156.81 | | | | | | |
| Expected Yield, Low (g) | 141.13 | | | | | | |
| Expected Yield, High (g) | 148.97 | | | | | | |
| Solids Loading, % | 47.32 mL | | | | | | |
| Initial Volume | 191.71 | | | | | | |
| Volume after quench, ml | 294.86 | | | | | | |
| Volume after wash, mL | 336.86 | | | | | | |

To a 250 mL 3-necked round bottomed flask was added neopentyl glycol (2.81 grams, 0.03 moles), 53 mL methylene chloride, and BF$_3$THF (1.51 g, 0.01 moles). 3-FOX monomer (100 g, 0.54 moles) was added dropwise over 40 minutes. After two hours, proton-NMR analysis indicated polymerization of the 3-FOX monomer was complete with a degree of polymerization of 19.14. Caprolactone monomer (54 grams, 0.47 moles) was added dropwise over 25 minutes. The reaction mixture was then allowed to stir for 120 hours at 25° C. 80 grams of methylene chloride was then added, and the copolymer solution was washed with water until a neutral pH was obtained. Final yield was 141.15 grams, the FOX-caprolactone degree of polymerization was 15.85, and the hydroxyl equivalent weight was 2717.4.

As noted above, the various fluorinated polar group containing polymers of the present invention act as a flow, or a leveling, or a wetting agent. Desirably they are incorporated or tied up, in other words bound to another polymer as in the form of a copolymer or the like to prevent the fluorinated polymer from being fugitive, able to leach out, or otherwise be released from a composition such as a coating composition or any other composition wherein a plurality of compounds are contained. Other than being in the form of a copolymer, they can be cured after effectively serving as a flow, or leveling, or wetting agent and formed into a final product such as a coating, a laminate wherein the fluorinated polymer is contained on a substrate, or other article. The following thus relates to a curing poly(fluorooxetane-ester) copolymers which can contain a polar group thereon.

Cured Poly(Fluorooxetane-Ester) Copolymers

As noted above, the polyoxetane-ester copolymer can be cured utilizing amino resins. Amino resins generally include alkylated benzoguanamine-formaldehyde, alkylated urea-formaldehyde, or preferably alkylated melamine-formaldehyde resin where the alkyl group contains from 1 to 6 carbon atoms. Mixtures of these resins can be used. These amino resins are well known and include those set forth in "Aminoplastics," Vale et al, Iliffe Books Ltd., London, 1964; "Amino Resins," Blair, Reinhold Publishing Corporation, New York, 1959, "Modern Plastics Encyclopedia 1980–1981," pages 15, 16 and 25 and "Encyclopedia of Polymer Science And Technology," John Wiley & Sons, Inc., Vol. 2, 1965, pages 1 to 94.

These materials are desirably cured at temperatures of at least 150° F., 200° F., 250° F. or 400° F. or more (66° C., 93° C., 121° C., or 204° C.) for effective times in the presence of a minor amount by weight of an acidic catalyst such as boric acid, phosphoric acid, acid sulfates, hydrochlorides, phthalic anhydride or acid, oxalic acid or its ammonium salts, sodium or barium ethyl sulfates, aliphatic or aromatic sulfonic acids such as p-toluene sulfonic acid (preferred), methane sulfonic acid and the like. It is important that properties such as stain resistance imparted by the polyester and amino resin containing repeat units derived from an oxetane monomer having pendant fluorinated groups be optimized by controlling things such as glass transition temperature, crosslink density and the presence of molecules that may act as plasticizers or other molecules that may transport or attract staining molecules in the coating. Prior to curing flattening agents or other additives can be added to the mixture of the reactive polyester and amino resin.

The amount of the various components in the coating will be generally specified in relationship to 100 parts by weight of the polyester-oxetane resin and the amino resin crosslinking agent. The weight ratio of polyester-oxetane resin (neat) to amino resin (neat) can vary widely but desirably is from about 10:90 to 90:10 and more desirably from about 20:80 to 80:20; or 70:30 to 30:70, or 60:40 to 40:60. Generally, it is more desirable to match the moles of reactive groups on the polyester-oxetane to within 10% to 20% to the number of moles of reactive groups on the amino resin. The number of moles of reactive groups can be determined by dividing the weight of the component by the equivalent weight for the component. The term "neat" after polyester-oxetane and amino resin does not exclude using polyesters and amino resins that are received dissolved in solvents or dispersed in water but rather specifies that the amount used is to be recalculated based on the weight without the solvent. For the purposes of this disclosure no distinction will be made whether the amino resin crosslinks the polyester resin or vice versa.

The amount of carriers and/or solvent(s) in the coating composition can vary widely depending on the coating viscosity desired for application purposes, and solubility of the components in the solvent. The solvent(s) can be any conventional solvent for polyester-amino resin systems. These carriers and/or solvents include but are not limited to water, alkyl alcohols of 1 to 10 carbon atoms, ketones of from 3 to 15 carbon atoms e.g. methyl ethyl ketone or methyl isobutyl ketone, alkylene glycols and/or alkylene glycol alkyl ethers having from 3 to 20 carbon atoms, acetates and their derivatives, ethylene carbonate, etc. Illustrative U.S. patents of the carrier and/or solvent systems available include U.S. Pat. Nos. 4,603,074; 4,478,907; 4,888,381 and 5,374,691 hereby incorporated by reference for their teachings both of carriers and/or solvent systems and of polyesters and amino resins. While most acetate type solvents can be used, e.g. n-butyl acetate, a preferred solvent is n-propyl acetate. The amount of solvent(s) can desirably vary from about 20 parts by weight to about 400 parts by weight per 100 parts by weight of total polyester resin and amino resin.

The amount of catalyst is an amount that effectively catalyzes the mutual crosslinking of the polyester and amino resins under the crosslinking conditions chosen (usually elevated temperatures). As the crosslinking temperature increases above 150° F., 200° F., 250° F. or 400° F. (66° C., 93° C., 121° C. or 204° C.) the amount of catalyst can be reduced. Effective amounts of catalyst can vary from about 0.1, 0.5 or 1 to about 6 or 8 parts by weight and preferably from about 2 or 3 to about 6 parts by weight per 100 parts by weight total of said polyester and amino resins.

The poly(oxetane-THF-ester) of Example CP II was cured in a manner as follows.

EXAMPLE CP-IV

The four polyesters (2 or 4 wt. % oxetane and 6 or 26 mole percent of the polyoxetane being repeating units from THF of Example CP-II) were formulated into solvent based coating compositions as shown in Table 1. The Resimene 747 resin is an amino resin curative (alkylmelamine-formaldehyde) for polyester resins. The PTSA is paratoluene sulfonic acid catalyst (40 wt. % active in isopropanol). The coating compositions varied in the amount of polyoxetane in the polyester, the amount of tetrahydrofuran repeating units in the polyoxetane, and the weight ratio of Resimene to polyester. The coating compositions were applied to plasticized polyvinyl chloride substrate in a conventional manner without any intermediate tie coat. The coatings were cured by heating to approximately 240° F. (116° C.) for about one minute.

TABLE I

| Components | Sample 1 | Sample 2 | Sample 3 | Sample 4 | Sample 5 |
| --- | --- | --- | --- | --- | --- |
| n-propyl acetate | 8.3 | 8.3 | 8.3 | 8.3 | 8.5 |
| THF | 0.925 | 10.9 | 10.9 | 10.9 | 10.9 |

TABLE I-continued

| Components | Sample 1 | Sample 2 | Sample 3 | Sample 4 | Sample 5 |
|---|---|---|---|---|---|
| Polyester having 2 wt. % of 1st oxetane (6 mol % THF) | 18.95 | 0 | 0 | 0 | 16.8 |
| Polyester having 4 wt. % of 1st oxetane (6 mol % THF) | 0 | 0 | 0 | 18.95 | 0 |
| Polyester having 2 wt. % 2nd oxetane (26 mol % THF) | 0 | 18.95 | 0 | 0 | 0 |
| Polyester having 4 wt. % 2nd oxetane (26 mol % THF) | 0 | 0 | 18.95 | 0 | 0 |
| Resimene 747 | 18.55 | 18.55 | 18.55 | 18.55 | 20.15 |
| PTSA | 3.3125 | 3.3125 | 3.3125 | 3.3125 | 3.6 |
| n-propyl acetate | 8.5 | 8.5 | 8.5 | 8.75 | 8.75 |
| THF | 10.9 | 10.9 | 10.9 | 11.0 | 11.0 |
| Polyester having 2 wt. % 1st oxetane (6 mol % THF) | 0 | 0 | 0 | 0 | 0 |
| Polyester having 4 wt. % 1st oxetane (6 mol % THF) | 0 | 0 | 16.8 | 14.6 | 0 |
| Polyester having 2 wt. % 2nd oxetane (26 mol % THF) | 16.8 | 0 | 0 | 0 | 0 |
| Polyester having 4 wt. % 2nd oxetane (26 mol % THF) | 0 | 16.8 | 0 | 0 | 14.6 |
| Resimene 747 | 20.15 | 20.15 | 20.15 | 21.75 | 21.75 |
| PTSA | 3.6 | 3.6 | 3.6 | 3.9 | 3.9 |

The units in the table above are grams.

It should be noted that the recipe set forth in Table 1 results in high amounts of fluorine on the surface of the coating and the high amounts of fluorine are associated with low surface energy, good abrasion resistance, and easy cleaning. Good results were also obtained with respect to wetting, or flow, or leveling. Similar or identical recipes have resulted in 15–18 atomic percent fluorine on the surface as determined by XPS. This is generally a 30–50 percent increase over similar recipes using similar amounts of partially fluorinated polyoxetane but without pre-reaction of the polyoxetane into the polyester, e.g. the following control.

All example coatings CP-IV-2 through CP-IV-7 were prepared in the same fashion:

The components of the coating are allowed to mix for approximately two minutes. Typically, the coating is applied with a RDS 10 wire-bound rod to a white vinyl substrate. A majority of the solvent is removed quickly using a heat lamp (~150° F.). The coating is cured by heating to 250° F. for three minutes. Poly(3-FOX-ester) is (Poly-3-FOX modified polyester) as described above.

EXAMPLE CP-IV-2

Effect of Poly-3-FOX Diol Addition on Wetting, Flow and Leveling on Polyester/Melamine Coatings of Various Solids Levels

| Sample | VR-248 Resin | Resimene 747 | PTSA | i-Propyl Acetate | Poly-3-FOX diol[†] | % Resin Solids |
|---|---|---|---|---|---|---|
| A | 5.00 | 1.72 | 0.16 | 4.74 | — | 45.0 |
| B | 5.00 | 1.72 | 0.16 | 3.44 | — | 50.0 |
| C | 5.00 | 1.72 | 0.16 | 1.48 | — | 60.0 |
| D | 5.00 | 1.72 | 0.16 | 0.09 | — | 70.0 |
| E | 5.00 | 1.72 | 0.16 | 4.74 | 0.015 | 45.0 |
| F | 5.00 | 1.72 | 0.16 | 3.44 | 0.015 | 50.0 |
| G | 5.00 | 1.72 | 0.16 | 1.48 | 0.015 | 60.0 |
| H | 5.00 | 1.72 | 0.16 | 0.09 | 0.015 | 70.0 |

Composition given in grams.
[†]Average DP = 18.5; $R_f$ = $CH_2CF_3$.

| Sample | Coating Appearance | 60° Gloss |
|---|---|---|
| A | Good | 66.9 ± 1.2 |
| B | Good coating but many bubbles in bulk of coating | 33.2 ± 2.5 |
| C | Complete dewetting of coating from substrate | — |
| D | Complete dewetting of coating from substrate | — |
| E | Good | 86.6 ± 1.7 |
| F | Good | 92.0 ± 0.6 |
| G | Good | 97.8 ± 0.8 |
| H | Good but small pinholes present on surface | 94.2 ± 1.4 |

Addition of Poly-3-FOX dial able to wet, flow and level at a variety of wt % solids.

EXAMPLE CP-IV-3

Effect of Poly-3-FOX Diol Additive Amount on Wetting, Flow and Leveling on Polyester/Melamine Coatings at 70 wt % Solids.

| Sample | VR-248 Resin | Resimene 747 | PTSA | n-Propyl acetate | Poly-3-FOX diol[a] |
|---|---|---|---|---|---|
| A | 2.83 | 3.34 | 0.19 | 0.20 | — |
| B | 2.83 | 3.34 | 0.19 | 0.20 | 0.0068 |
| C | 2.83 | 3.34 | 0.19 | 0.20 | 0.0229 |
| D | 2.83 | 3.34 | 0.19 | 0.20 | 0.0532 |

Composition given in grams.
[a]Average DP = 18; $R_f$ = $CH_2CF_3$.

| Sample | Coating appearance |
|---|---|
| A | Complete dewetting of coating from substrate |
| B | Good coating |
| C | Good coating |
| D | Good coating |

Even small levels of Poly-3-FOX diol provide for good wetting, flow and leveling.

EXAMPLE CP-IV-4
Effect of Average Degree of Polymerization of Poly-3-FOX Additives on Wetting, Flow and Leveling of a Polyester/Melamine Coating at 70 wt % Solids.

| Sample | VR-248 Resin | Resimene 747 | PTSA | n-Propyl acetate | Poly-3-FOX diol |
|---|---|---|---|---|---|
| A | 2.83 | 3.34 | 0.19 | 0.20 | — |
| B | 2.83 | 3.34 | 0.19 | 0.20 | 0.0075[a] |
| C | 2.83 | 3.34 | 0.19 | 0.20 | 0.0068[b] |
| D | 2.83 | 3.34 | 0.19 | 0.20 | 0.0078[c] |

Composition given in grams.
[a] Average DP = 6.7.
[b] Average DP = 18.
[c] Average DP = 23.

| Sample | Coating appearance | Gloss 20° | Gloss 60° |
|---|---|---|---|
| A | Complete dewetting of coating from substrate | — | — |
| B | Complete dewetting of coating from substrate | — | — |
| C | Good coating | 47.3 ± 1.3 | 86.6 ± 14 |
| D | Good coating | 55.7 ± 3.9 | 97.3 ± 0.4 |

EXAMPLE CP-IV-5
Effect of $R_f$ Length of Polyfox Additive on Wetting, Flow and Leveling Properties of Polyester/Melamine Coating at 70 wt % Solids.

| Sample | VR-248 Resin | Resimene 747 | PTSA | n-Propyl acetate | PolyFOX diol |
|---|---|---|---|---|---|
| A | 2.83 | 3.34 | 0.19 | 0.20 | — |
| B | 2.83 | 3.34 | 0.19 | 0.20 | 0.015[a] |
| C | 2.83 | 3.34 | 0.19 | 0.20 | 0.015[b] |
| D | 2.83 | 3.34 | 0.19 | 0.20 | 0.016[c] |

Composition given in grams.
[a] Poly-3-FOX; average DP = 35; $R_f$ = $CH_2CF_3$.
[b] Poly-5-FOX; average DP = 5.4; $R_f$ = $CH_2CF_2CF_3$.
[c] Poly-7-FOX; average DP = 9.8; $R_f$ = $CH_2CF_2CF_2CF_3$.

| Sample | Coating appearance | 60° Gloss |
|---|---|---|
| A | Complete dewetting of coating from substrate | — |
| B | Good coating | 102.2 ± 1.3 |
| C | Good coating | 101.4 ± 0.9 |
| D | Good coating | 100.9 ± 1.7 |

Short $R_f$ chain materials effective wetting, flow and leveling agents.

EXAMPLE CP-IV-6A
Comparison of Poly-3-FOX Diol Additives and Commercially Available Fluorosurfactant Wetting, Flow and Leveling Agents in Polyester/Melamine Coatings at 70 wt %.

| Sample | VR-248 Resin | Resimene 747 | PTSA | n-Propyl acetate | Additive | Amount |
|---|---|---|---|---|---|---|
| A | 2.83 | 3.34 | 0.19 | 0.20 | — | — |
| B | 2.83 | 3.34 | 0.19 | 0.20 | Poly-3-FOX diol[a] | 0.015 |
| C | 2.83 | 3.34 | 0.19 | 0.20 | ZONYL FSO[b] | 0.015 |
| D | 2.83 | 3.34 | 0.19 | 0.20 | ZONYL FS-300[c] | 0.015 |
| E | 2.83 | 3.37 | 0.19 | 0.20 | Fluoroad FC-430[d] | 0.015 |

Composition given in grams.
[a] Average DP = 18, $R_f$ = $CH_2CF_3$.
[b] From DuPont; $F(CF_2)_{-8}CH_2CH_2O(CH_2CH_2O)_xH$.
[c] From DuPont; $F(CF_2)_{-8}CH_2CH_2O(CH_2CH_2O)_zH$.
[d] From 3M; Fluoroaliphatic polymeric esters.

| Sample | Coating appearance | Gloss 20° | Gloss 60° |
|---|---|---|---|
| A | Complete dewetting of coating from substrate | — | — |
| B | Good coating | 69.4 ± 2.2 | 101.0 ± 1.1 |
| C | Complete dewetting of coating from substrate | — | — |
| D | Complete dewetting of coating from substrate | — | — |
| E | Partial dewetting of coating from substrate | — | — |

PolyFOX materials more effective wetting, flow and leveling agents in this particular system compared to commercially available fluorosurfactants sold as wetting, flow and leveling agents.

Another comparison of Poly-3-FOX diol-copolymer as a flow, wetting, or leveling agent is set forth herein below. The coating is a solvent based nitrocellulose on leneta charts

EXAMPLE CP-IV-6B

| Compound | Coating Comments |
|---|---|
| 3M Nonionic fluorosurfactants | |
| FC-430 (1000 ppm) | inferior leveling, small bubbles |
| FC-430 (2500 ppm) | defects in coating |
| FC-430 (5000 ppm) | small bubbles |
| FC-430 (7500 ppm) | nice coating |
| DuPont nonionic fluorosurfactant | |
| ZONYL FSO (1000 ppm) | coating contraction, insufficient wetting |
| ZONYL FSO (2500 ppm) | coating contraction, insufficient wetting |
| ZONYL FSO (5000 ppm) | nice coating |
| ZONYL FSO (7500 ppm) | nice coating, glossy |
| Poly-3-Fox-Co-THF | |
| Poly Fox T - 40% (1000 ppm) | insufficient wetting |
| Poly Fox T - 40% (2500 ppm) | Excellent coating |
| Poly Fox T - 40% (5000 ppm) | Excellent coating |
| Poly Fox T - 40% (7500 ppm) | Excellent coating |

As apparent from the above, a block copolymer of the present invention gave good results and low cratering as compared to the 3M or DuPont material.

EXAMPLE CP-IV-7

Effect of Poly-3-FOX Modified Polyester on Wetting, Flow and Leveling of a Polyester/Melamine Coating at Various Solids Levels

| Sample | Polyester of CP IV - Table 1 - line 3 | VR-248 Resin | Resimene 747 | PTSA | n-Propyl acetate | Wt % Solids |
|---|---|---|---|---|---|---|
| A |  | 2.83 | 3.34 | 0.19 | 0.20 | 70.0 |
| B | 2.83 | — | 3.34 | 0.19 | 6.41 | 40.0 |
| C | 2.83 | — | 3.34 | 0.19 | 0.20 | 70.0 |

Composition given in grams.

| Sample | Coating appearance |
|---|---|
| A | Complete dewetting of coating from substrate |
| B | Good coating |
| C | Good coating |

A PolyFOX modified polymer is effective also as an in-situ wetting, flow and leveling agent that is then made non-fugitive by crosslinking or reacting into the coating.

As apparent from Examples CP-IV-2 through CP-IV-7, Poly-3-FOX diol per se is a good flow, wetting and leveling agent for a polyester-melamine-formaldehyde system.

EXAMPLE CP-V

Another example of a fluorinated polymer of the present invention is a fluorinated methacrylate. A specific example of such a polymer is trifluoroethyl methacrylate-butyl acrylate copolymer (75/25 mole %) obtained by free radical copolymerization of trifluoroethyl methacrylate (Aldrich Chemical Co.) and butyl acrylate (Aldrich Chemical Co.) in toluene at 60–65° C. using AIBN as initiator. This copolymer has a cyano polar group thereon, incorporated from an initiator fragment.

The various ingredients in Table II were allowed to mix for approximately two minutes. Typically, the coating is applied with a RDS 10 wire-bound rod to a white vinyl substrate. A majority of the solvent is removed quickly using a heat lamp (~150° F.). The coating is cured by heating to 250° F. for three minutes.

TABLE II

| Sample[†] | VR-248 Resin (g) | Resimene 747 (g) | p-Toluene Sulfonate (g) | n-Propyl Acetate (g) | TFEMA/BA Copolymer[‡] (g) |
|---|---|---|---|---|---|
| A | 2.83 | 3.34 | 0.19 | 0.20 | — |
| B | 2.83 | 3.34 | 0.19 | 0.20 | 0.0337 (0.1 wt %) |
| C | 2.83 | 3.34 | 0.19 | 0.20 | 0.0843 0.25 wt % |
| D | 2.83 | 3.34 | 0.19 | 0.20 | 0.1693 (0.50 wt %) |
| E | 2.83 | 3.34 | 0.19 | 0.20 | 0.3403 (1.0 wt %) |

[†]All formulations are 70 wt % solids.
[‡]Trifluoroethyl methacrylate/butyl acrylate copolymer.
$M_n \approx 5{,}000$ g/mol.

TABLE II-continued

| Sample | Coating Appearance |
|---|---|
| A | Complete dewetting |
| B | Partial dewetting; large amounts of orange peel |
| C | Partial dewetting; large amounts of orange peel |
| D | Partial dewetting; large amounts of orange peel |
| E | Good coating |

Generally, when a fluorinated polyacrylic is utilized, the amount thereof to achieve a suitable wetting, flow, or leveling effect is generally from about 0.05 wt % to about 5 wt % and desirably from about 0.75 wt % to about 3 wt % based upon the total weight of the fluorinated acrylate polymer or copolymer, the amino curing resin, and the polyester resin.

Monohydroxylfluorooxetanes

Instead of an oxetane polymer having two hydroxyl end groups as in formulas 3A and 3B, a fluorine containing polymer having only one terminal hydroxyl group can be utilized. Such polymers are made by utilizing a mono alcohol initiator. A more detailed description of the preparation of the monofluorooxetanes is set forth in U.S. Ser. No. 09/473,518, filed Dec. 28, 1999 and Ser. No. 09/727,637, filed Dec. 1, 2000, which are hereby fully incorporated by reference.

Generally, any type of monoalcohol can be utilized to produce the monohydroxyl polyfluorooxetane (MOX) polymer, or copolymer composition of the present invention. Suitable monoalcohols generally include organic alcohols having from 1 to about 40 and preferably from about 1 to about 18 carbon atoms; polymeric alcohols; or tetrafluoroethylene based telomer alcohols. Examples of specific types of monohydric organic alcohols include the various aliphatic, aromatic, etc. alcohols such as alkyl alcohols, for example methyl alcohol, ethyl alcohol, propyl alcohol, etc., or the olefinic alcohols, for example allyl alcohol, etc. or the alicyclic alcohols, for example, cyclohexanol, etc. or the heterocyclic alcohols, for example furfuryl alcohol, etc. Various aromatic alcohols include benzyl alcohol, and the like. Moreover, halogenated organic alcohols and especially fluoroalcohols having from 2 to 18 carbon atoms are desired such as trifluoroethanol, heptafluorobutanol, heptadecylfluorooctanol, and the like. Especially preferred monohydric alcohols include benzyl alcohol, trifluoroethanol, heptafluorobutanol, pentafluoropropanol, pentafluorobutanol, nonafluorohexanol, and other various perfluoroalkylethanols such as pentafluorobutanol, and allyl alcohol.

The polymeric alcohols are generally made from alkylene oxides having from 2 to 6 carbon atoms with 2 or 3 carbon atoms, that is ethylene oxide, propylene oxide, or tetrahydrofuran, or copolymers thereof being preferred. The number of repeat units of the polymeric alcohols can generally range from about 2 to about 50, desirably from about 3 to about 30 with from about 5 to 20 repeat units being preferred.

Another group of monoalcohols are the various tetrafluoroethylene based telomer fluoroalcohols such as those commercially available from Dupont as Zonyl, from Clarion as Fluowet, from Elf-Atochem as Foralkyl 6HN, and the like. Such fluoroalcohols have the general formula $CF_3CF_2(CF_2CF_2)_xCH_2CH_2OH$ where x is generally an integer of from 1 to about 19 and preferably from about 8 to about 12. While some of the fluoroalcohols are crystalline or solid at room temperature all are melted at temperatures of about 40° C.

While a monohydric alcohol can be utilized as an initiator in combination with a solvent, it is a preferred embodiment of the present invention to utilize a monohydric alcohol which serves as both an initiator as well as a solvent for the fluorooxetane monomers and the like. In other words, it is preferred that a solvent not be utilized other than a monoalcohol which can also function as a solvent in that it solubilizes the below noted oxetane monomers. Such co-initiator-solvent alcohols are desired inasmuch as they produce linear low molecular weight polyfluorooxetane oligomers, polymers, or copolymers and most preferably oligomeric dimers, trimers, and tetramers having low cyclic content. Such co-initiator-solvents include generally any of the above noted monoalcohols which solubilize the oxetane monomers with preferred alcohols including trifluoroethanol, benzyl alcohol, allyl alcohol, heptafluorbutanol, pentafluoropropanol, pentafluorobutanol, nonafluorohexanol, various perfluoroalkylethanols, and the like. The use of such co-initiator-solvent monoalcohols generally produces linear oligomers having less than about 10%, desirably less than about 8%, and preferably less than about 5%, or 3%, or 2%, or less than about 1% by weight of cyclic oligomers based upon the total weight of generally the oligomers, and also any polymers, or copolymers if the same are also produced. Similarly, if a polymer is produced, desirably the amount of cyclic oligomer produced is low, i.e. the same values as set forth immediately above, based upon the total weight of the polymers, and any oligomers, or copolymers produced. In the same manner, if copolymers are produced, the amount of cyclic oligomers is low based upon the total weight of the copolymer, and any oligomer or polymer which also may be inherently produced.

Although solvents are preferably not utilized in order to produce oligomers, polymers or copolymers having low cyclic oligomer content, it is to be understood that low amounts of non-initiator solvents might be utilized such as generally less than 25% or 15% and preferably less than 10%, 5%, 3% or nil by weight based upon the total weight of the small amount of non-initiator solvent utilized and the monoalcohol.

As noted above, the oxetane monomer used to form the polyfluorooxetane has the structure

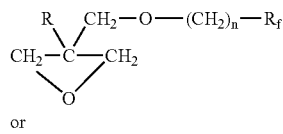

or

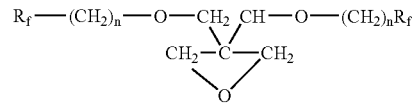

where R, $R_f$, and n are as set forth herein above.

The preparation of such fluorinated oxetane monomers was set forth herein above.

Generally any suitable cationic catalyst can be utilized to polymerize the fluorooxetane monomers such as various Lewis acids and complexes thereof. Examples of such Lewis acid catalysts include $Sn(IV)Cl_4$, antimony pentafluoride, phosphorous pentafluoride, and the like, with a complex of borontrifluoride and tetrahydrofuran being preferred.

According to a preferred embodiment of the present invention, a monoalcohol as hereinabove described is utilized as both an initiator and solvent, i.e., no solvent or a very small amount of a solvent such as dichloroethane is utilized. This preferred route will yield a polyfluorooxetane oligomer such as a homooligomer having an average DP of from about 2 to about 20, desirably from about 2 to about 10, and preferably from about 2 to about 4 with very little cyclic oligomer content as noted above. Such low molecular weight oligomers, e.g. dimers or trimers, are preferred inasmuch as when they are blended or reacted with a coating formulation, they tend to migrate faster to the surface of the blend or coating and give lower surface tensions and thus result in lower coefficient of friction as compared to polyfluorooxetanes having a higher average degree of polymerization. While not preferred, polyfluorooxetane polymers or of up to about 50, 100, or 150 can be utilized. Alternatively, but not preferably, copolymers can also be made.

While not preferred, the polymerization can be carried out in the presence of a Lewis acid catalyst and a Bronsted acid catalyst, as well as a non-initiator or solvent for the fluorooxetane monomer. Examples of suitable non-initiator or non-monoalcohol solvents include trifluorotoluene, dichloroethane, dimethylformamide, as well as dichloromethane. The amount of the alcohol initiator and catalyst for either the above preferred or non-preferred embodiment will generally vary inversely with the desired molecular weight of the polymer. That is, the polymerization is initiated by each alcohol and catalyst molecule generally on a quantitative basis for a given amount of flucrooxetane monomer, hence, the molecular weight of the polyfluorooxetane oligomer or polymer or copolymer will be determined by the amount of alcohol utilized. When this route is utilized, the average degree of polymerization (DP) is also from about 2 to about 20, desirably from about 2 to about 10, and preferably from about 2 to about 4, however, the degree of polymerization can also be up to 50, up to about 100, or even up to about 150.

The reaction rate for forming the polyfluorooxetane oligomer, polymer, or copolymer, utilizing a monoalcohol and a Lewis acid catalyst will vary with temperature. Accordingly, the reaction time is generally from 2 hours to 40 hours, and desirably is from about 4 to about 24 hours. The polymerization temperatures are generally from about 0° C. up to about 100° C., and desirably from about 18° C. to about 50° C. Lower reaction temperatures result in very slow reaction rates, whereas higher reaction temperatures will generally result in the formation of cyclic structures containing from 3 to 4 oxetane units. As noted, monomer conversion to polymer is essentially quantitative. The monohydroxyl polyfluorooxetane oligomers, polymers or copolymers produced are washed with water to obtain a neutral pH and the water removed as by decanting. Subsequently, any suitable desiccant can be utilized such as calcium chloride, phosphorus pentoxide, calcium carbonate, magnesium sulfate, molecular sieves, to dry the oligomers or polymers.

The monofunctional polyfluorooxetane oligomers or polymers generally have repeat units as set forth in formulas 3A and 3B above, and the polymer formula is as follows:

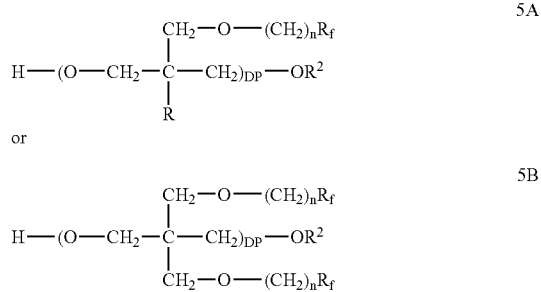

where n, R, $R_f$ and DP are described herein above and wherein $R^2$ is the organic group of the reactive monoalcohol. That is, $R^2$ is derived from an alcohol as noted above such as an organic alcohol having from 1 to about 40 and preferably from 1 to about 18 carbon atoms, or a polymeric alcohol, etc. If more than one type of monoalcohol is utilized to prepare the polyfluorooxetane oligomers or polymers, naturally the $R^1$ of one or more different polymers, copolymers, or oligomers will be different.

The fluorooxetane monomers, as noted above but not preferred, can be copolymerized with a variety of comonomers having epoxy (oxirane) functionality such as epichlorohydrin, propylene oxide, ethylene oxide, butyl glycidylether, and perfluorooctyl propylene oxide as well as alkyl substituted oxiranes having from 1 to about 20 or from about 7 to about 12 carbon atoms or mixtures thereof; monomers having a 4-membered cyclic ether group such as trimethylene oxide, 3,3-bis(chloromethyl)oxetane, 3,3-bis(bromomethyl)oxetane, and, 3,3-bromomethyl(methyl)oxetane; monomers having a 5 membered cyclic ether group such as tetrahydrofuran, tetrahydropyran, and 2-methyltetrahydrofuran; and the like. Still other suitable monomers include 1,4-dioxane, 1,3-dioxane and 1,3-dioxalane as well as trioxane and caprolactone. The copolymerization reaction is carried out generally under the same conditions as is the polymerization of the fluorooxetane monomers set forth hereinabove. The amount of the comonomer is from about 0.1% to about 99% by weight, desirably from about 1.5% to about 50% by weight, and preferably from about 2% to about 10% by weight based upon the total weight of the one or more comonomers and the fluorooxetane monomers.

EXPERIMENTAL

Example MOX 1

Preparation of Monohydric Polyfluorooxetane using Benzyl Alcohol Initiator and Dichloromethane Solvent Only glass reactors and condensers were used in this procedure. All glassware and chemicals were dried prior to use. A 10 liter round bottomed flask equipped with a condenser, addition funnel, and rubber septum was charged with 1,763.4 grams of dichoromethane solvent. The catalyst, boron trifluoride-tetrahydrofuran (67.15 grams), and the initiator benzyl alcohol, 129.7 grams, (mono-functional alcohol) were added to the reaction flask. 3-FOX (3,314.7 grams) were added to an addition funnel. 3-FOX monomer can be made in a manner as set forth in U.S. Pat. Nos. 5,650,483; 5,668,250; 5,668,251; or 5,663,289. Approximately one-third of the mixture was added to the round-bottomed flask and allowed to stir for approximately 15 to 30 minutes until the reaction was initiated. The temperature was maintained at a temperature of about 20 to 23° C. The remaining monomer mixture was added dropwise over a four-hour period. The reaction mixture was allowed to stir four hours until the conversion reached 97 to 99.8 percent as measured by $H^1$-NMR. The reaction mixture was washed with water to a neutral pH, the water was decanted and the product was dried over magnesium sulfate. The remaining solvents were removed at reduced pressure. The weight of the cyclic oligomers formed based upon the total weight of the copolymer was approximately 15% by weight.

Example MOX 2

Preparation of Monohydric Polyfluorooxetane using Trifluoroethanol Initiator and Dichloromethane Solvent Dichloromethane solvent (26.6 g) was introducted into a dry flask under a dry nitrogen purge. $BF_3$-THF (7.57 g) catalyst was then slowly syringed into the flask and the mixture stirred. While stirring, trifluoroethanol (initiator) (13.6 g) was slowly syringed into the reactor. The mixture temperature was then brought to 35° C. and allowed to react for approximately 30 minutes. Fifty grams (50 g) of 3-FOX monomer were then slowly added to the reactor with good stirring and the temperature of mixture monitored. A sample to determine monomer conversion by $^1$H-NMR spectroscopy was taken shortly after a reaction exotherm is observed. Monomer addition continues at a rate to maintain a reaction temperature between 38 and 40° C. After the monomer addition was complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase is again tested for pH and discarded.

This process was repeated until the pH of the aqueous phase was at least 5. The organic phase was then subjected to rotating evaporation until all the dichloromethane is gone as measured by NMR. Characterization by proton NMR spectroscopy showed the polyol to have an average degree of polymerization (DP) of 7.6 and a tetrahydrofuran (THF) comonomer content of 14.3 mole %. The weight of the cyclic oligomers formed based upon the total weight of the copolymer was approximately 15% by weight.

Example MOX 3

Preparation of Monohydric Polyfluorooxetane using Allyl Alcohol Initiator and Dichloromethane Solvent Dichloromethane solvent (26.6 g) was introduced into a dry flask under a dry nitrogen purge. $BF_3$-THF (2.53 g) was then slowly syringed into the flask and the mixture stirred. While stirring, allyl alcohol (initiator) (2.62 g) was slowly syringed into the reactor. The mixture temperature was then brought to 35° C. and allowed to react for approximately 30 minutes. Fifty grams (50 g) of 3-FOX monomers were then slowly added to the reactor with good stirring and the temperature of mixture monitored. A sample to determine monomer conversion by $^1$H-NMR spectroscopy was taken shortly after a reaction exotherm is observed. Monomer addition continues at a rate to maintain a reaction temperature between 38 and 40° C. After the monomer addition is complete, the reaction temperature was maintained in the range stated above for about 2 hours, until quantitative conversion (>99.5 mole %) of the monomer was achieved.

The polyether was isolated by diluting the mixture to a total of 1 mL of dichloromethane per gram of 3-FOX monomer. The reactor contents are then transferred to a suitably sized separatory funnel and the solution quenched with 0.43 mL of water per gram of 3-FOX and vigorously shaken. After separation of the phases has occurred, the aqueous layer was removed, tested for pH and discarded. Water (0.85 mL/g 3-FOX) was again added to the funnel and shaken vigorously together with the organic layer. The phases were allowed to separate, the aqueous phase was again tested for pH and discarded. This process was repeated until the pH of the aqueous phase was at least 5. The organic phase was then subjected to rotating evaporation until all the dichloromethane was gone as measured by NMR. Characterization by proton NMR spectroscopy showed the polyol to have an average degree of polymerization (DP) of 8.3 and a tetrahydrofuran (THF) comonomer content of 4.5 mole %. The weight of the cyclic oligomers formed based upon the total weight of the copolymer was approximately 15% by weight.

Examples 4, 5, and 6 relate to the preparation of monohydric polyfluorooxetane copolymers using the same monoalcohol initiator as a co-initiator solvent and thus no non-monoalcohol solvent was utilized.

Example MOX 4

Synthesizing Low MW 3-MOX Oligomer using Trifluoroethanol as Co-initiator-Solvent

| | FW | Moles | Mole Ratio | g | d g/mL | mL | g actual |
|---|---|---|---|---|---|---|---|
| 3-FOX Monomer | 184.15 | 0.272 | 5.01 | 50.00 | 1.15 | 43.48 | 58.38 |
| $CF_3CH_2OH$ | 100.04 | 0.136 | 2.5 | 13.6 | 1.373 | 9.91 | 9.91 |
| $BF_3THF$ | 139.91 | 0.054 | 1.0 | 7.6 | 1.268 | 5.99 | 7.6 |
| $CF_3CH_2OH$ (Schent) | 100.04 | 0.375 | 6.9 | 69.0 | 1.15 | 60 | 69 |

Apparent DP = 3.6 (FOX)
by end group analysis
Actually a mixture of linear dimer, trimer: tetramer
A small amount of cyclics
13.8 mol % THF, Theoretical = 14.6 mol %

Total $\frac{\text{3-FOX} \quad (CF_3CH_2OH)}{\text{Monomer: initiator}} \longrightarrow 1.61:1$ By using trifluoroethanol as the initiator and solvent, very low MW linear oligomers may be formed in high yields without the production of significant amounts of cyclic oligomer. That is, the amount of cyclic oligomer formed was less than 1% by weight based upon the total polyfluorooxetane formed.

With regard to the preparation of Examples MOX 4, 5 and 6, all glassware and reagents were dry prior to use. Water content of the reagents to be less than 500 ppm and confirmed by Karl Fisher analysis. The trifluoroethanol for initiation and BF3/THF were introduced into the dry flask under a dry nitrogen purge and allowed to stir for 30 mins. at room temperature. The reaction flask was then heated to 40° C. and the remaining trifluoroethanol and 3-FOX solution were pumped into the reactor using the pump rate to keep the temperature below 54° C. After the monomer addition was complete, the reaction temperature was maintained at 40° C. overnight. The polymer was isolated by diluting the mixture with solvent and washing it with 5% sodium bicarbonate solution and water until neutral. Dilution was to 1 g polymer to 1 mL of solvent. The makeup solvent was dichloromethane. The organic phase was then separated from the aqueous phase and subjected to rotating evaporation until all of the solvents had been removed. Characterization by proton NMR spectroscopy showed the polyol to have an average degree of polymerization (DP) of 3.6 by end group analysis.

Example MOX 5

Synthesizing Low MW 3-MOX Oligomer using Trifluoroethanol as Co-Initiator-Solvents

| Substance | Ratio | MW | Eq | mmoles | d g/mL | mL | A Used |
|---|---|---|---|---|---|---|---|
| 3-FOX Monomer | 0.741 | 184.15 | 2.0 | 271.52 | 1.15 | | 50.019 |
| Trifluoroethanol, co-initiator solvent | | 100.04 | 5.07 | 689.72 | 1.185 | 58.2 | 69.011 |
| Trifluoroethanol, co-initiator solvent | 0.0232 | 100.04 | 1.00 | 136.00 | 1.00 | 13.6 | 13.611 |
| $BF_3THF$, catalyst | 0.0125 | 139.9 | 0.40 | 54.40 | 1.1 | 6.9 | 7.664 |

The oligomer was prepared and purified in a manner as set forth in Example 4.
The average degree of polymerization was about 2 and the amount of cyclic oligomer was less than 1% by weight based upon the total weight of polyfluorooxetane.

Example MOX 6

Synthesizing Low MW 5-MOX Oligomer using Trifluoroethanol as Co-Initiator-Solvents

| Substance | Ratio | MW | Eq | mmoles | d g/mL | mL | B used |
|---|---|---|---|---|---|---|---|
| 5-FOX Monomer | 0.741 | 234.15 | 1.8 | 213.54 | 1.15 | | 50.030 |
| Trifluoroethanol, co-initiator solvent | | 100.04 | 5.96 | 689.72 | 1.185 | 58.2 | 69.360 |
| Trifluoroethanol, co-initiator solvent | 0.0232 | 100.04 | 1.00 | 115.77 | 1.00 | 11.6 | 11.625 |
| BF$_3$THF, catalyst | 0.0125 | 139.9 | 0.40 | 46.31 | 1.1 | 5.9 | 6.504 |

The oligomer was prepared and purified in a manner as set forth in Example 4.
The average degree of polymerization was about 2 and the amount of cyclic oligomer was less than 1% by weight based upon the total weight of polyfluorooxetane. 5-FOX is (1,1,1,2,2-pentafluoropropanoxy)methyl oxetane.

As apparent from Examples MOX 4 through 6, the amount of cyclic oligomer formed, when utilizing a monoalcohol as both an initiator and a solvent without any other solvent, was negligible, generally less than 1% by weight, whereas when a different solvent was utilized as set forth in examples 1 through 3, the amount of cyclic oligomer was about 15% by weight.

Example MOX 7

Synthesizing Monofunctional 9-MOX Oligomer using Trifluoroethanol as a Co-Initiator

| Substance | Quantity (g) | MW | Eq | mmoles | density | ml |
|---|---|---|---|---|---|---|
| 9-fox Monomer | 45.00 | 348.21 | 4.0 | 129.23 | 1.4 | 39.13 |
| Trifluoroethanol, solvent | 62.10 | 100.04 | 14.41 | 620.75 | 1.185 | 52.41 |
| Trifluoroethanol, intiator | 4.31 | 100.04 | 1.00 | 43.08 | 1.19 | 3.64 |
| BF$_3$.THF, catalyst | 2.41 | 139.9 | 0.40 | 17.23 | 1.268 | 1.9 |
| Methylene chloride wash solvent | 22.50 | 84.93 | 8.20 | 264.92 | 1.35 | 16.67 |
| Quench (5% NaHCO3) | 29.45 | 84.01 | 1.02 | 17.52 | 1.00 | 29.45 |
| Wash (water) | 29.45 | 18.01 | 65.74 | 1,635.00 | 1.00 | 29.45 |
| Theroretical yield, g | 50.55 | | | | | |
| Expected yield, Low | 42.97 | | | | | |
| Expected yield, High | 48.02 | | | | | |
| solids loading, % | 53.27 | | | | | |
| Max. wt % BF3THF (incorporated as thf) | 2.35 | | | | | |
| | ml | | | | | |
| Initial Volume | 97.08 | | | | | |
| Volume after Quench | 143.20 | | | | | |
| Volume after Wash | 90.79 | | | | | |

A 250 mL jacketed reaction flask was equipped with a condenser, temperature probe, magnetic stirrer, and addition funnel. Trifluoroethanol initiator was added (4.31 grams, 43.08 mMoles), and BF$_3$THF (2.41 grams, 17.23 mMoles). The reaction was allowed to stir for 30 minutes. 9-fox Monomer (45 grams, 129.23 mMoles) and trifluoroethanol solvent (62.10 grams, 620.75 moles) were added over 16 minutes. A maximum temperature of 34° C. was reached. The reaction was allowed to stir at room temperature overnight. Methylene chloride (22.5 g) and sodium bicarbonate (25.45 g 5%, 17.52 moles) were added to quench the reaction. The color changed from orange brown to yellow. The organic layer was washed again with water. The organic solution was dried with magnesium sulfate, and the solvent was removed to give 40.84 grams polymer with a dp of 3.7 by NMR.

Example MOX 8

| | PolyFox Mono-ol Dp 2 procedure | | | | |
|---|---|---|---|---|---|
| Substance | Scale (g) | Ratio | Quantity (g) | MW | Eq | mmoles |
| Trifluoroethanol, intiator | | 0.0232 | 10.68 | 100.04 | 1.00 | 106.70 |
| BF$_3$.THF, catalyst | | 0.0125 | 14.93 | 139.9 | 1.00 | 106.70 |
| 5-fox Monomer | 50 | 0.741 | 50.00 | 234.15 | 2.0 | 213.54 |
| Methylene Chloride | | | 50.00 | | | |
| Trifluoroethanol, solvent | | | 69.00 | 100.04 | 0.00 | |
| Quench (5% NaHCO3) *3 | | | 100.00 | | | |
| methylene chloride, dilute | | | 50.00 | | | |

Polymer Procedure

1. Oven dry reactors. Cool under N$_2$ purge.
2. Use dry monomer, initiator, and solvents. To be less than 140 ppm H$_2$O a piece or less than 500 ppm overall. No residual alcohol. Use Karl Fischer analysis to determine. Can also dry with 4A molecular sieves.
3. Prepare initiator/catalyst complex in the dry 500 ml jacketed flask with paddle stirrer and thermometer by stirring for 30 minutes at 25° C.
4. Prepare monomer or monomer/solvent solution in another flask or WM jar.
5. Flush micropump with appropriate solvent and set pump rate = 2.4 gr/minute.
6. Add monomer/solvent solution.
7. Let polymer solution stir overnight at room temperature.

Workup:

1. Dilute polymer solution with 50 ml methylene chloride.
2. Wash polymer solution and neutralize BF3 with 100 ml 5% NaHCO3 till pH is neutral
3. Stir and let settle to phase separate each time.
4. Dry polymer solution over Na2SO4 for 20 minutes.
5. Vacuum filter and rinse with methylene chloride.
6. Rotovap off methylene chloride at 35° C. and then heat to 70° C. to remove trifluoroethanol.
7. 
Analysis: Mass, NMR, GPC
Mass = 59.32 gr
NMR 400 MHz in CDCl3 and excess TFAA, dp = 2.4

Poly(Fluorooxetane-Ether) Block Copolymers

Block copolymers of polyfluorooxetanes and polyethers can be prepared according to two different routes. In one route, a polyether serves as an initiator which is reacted with fluorooxetane monomers; or alternatively, fluorooxetane oligomers, polymers, or copolymers serve as an initiator which is reacted with alkylene oxide monomers, in the presence of a catalyst to form polyfluorooxetane blocks which are bonded or connected to the polyether, or alternatively to form polyether blocks which are connected to the fluorooxetane oligomer, polymer, or copolymer. The produced block copolymer is free of isocyanate groups or compounds. The other route relates to reacting an existing polyfluorooxetane polymer with a diisocyanate and subsequently reacting the free isocyanate group with an existing polyether block; or to reacting an existing polyether with a diisocyanate and subsequently reacting the free isocyanate group with an existing polyfluorooxetane block.

The polyether which serves as an initiator can be made in a manner known to the literature as well as to the art. One common source are alkylene oxide monomers containing from 2 to about 6 carbon atoms and preferably from 2 to about 4 carbon atoms. The polyether can generally have at least one end group with two end groups being preferred such as a hydroxyl group. Suitable polyether initiators include hydroxyl terminated polyethylene glycol, polypropylene glycol, polybutylene glycol, polyisobutylene glycol, and the like as well as monohydroxyl compounds thereof such as polyethylene glycol methyl ether, polytetrahydrofuran, and the like. The number average molecular weight of such polyethers is generally from about 250 to about 10,000, desirably from about 300 to about 5,000 and preferably from about 350 to about 2,500 and can thus be an oligomer, polymer or copolymer.

The fluorooxetane monomers are those as set forth hereinabove, which is hereby fully incorporated by reference and is shown in formulas 2A and 2B where n and R are as set forth with respect to formulas 2A and 2B, and R$_f$ has the indicated percent of fluorine atoms. Different R$_f$ groups, i.e. mixed, can exist within the same polymer, that is, independently, have a different number of carbon atoms and such mixed R$_f$ groups generally have from about 8 to about 16 carbon atoms. The polyfluorooxetane will generally have the following repeat groups:

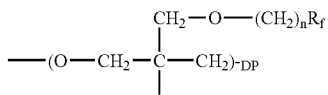

2AA or

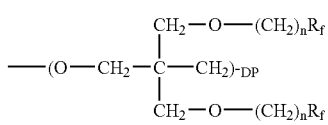

2BB where the degree of polymerization (DP) is from 2 to about 50 or about 100, desirably from about 2 or about 3 to about 30, and preferably from about 4 to about 20 or about 25. Accordingly, the polyfluorooxetane block can either be an oligomer, or a polymer. Moreover, if more than one different monomer is utilized as set forth herein below, it can be a block copolymer.

Polymerization of the one or more fluorooxetane monomers which is initiated by the one or more polyether functional groups such as a hydroxyl is desirably carried out via solution polymerization and thus is polymerized in the presence of a solvent. Suitable solvents are generally polar and/or halogenated hydrocarbons having a total from 1 to about 6 carbon atoms such as methylene chloride, carbon tetrachloride, chloroform, trichloroethylene, chlorobenzene, ethyl bromide, dichloroethane, and the like, with methylene chloride being preferred. The amount of such solvents is generally from about 50 to about 100 and desirably from about 50 to about 65 parts by weight for every 100 parts by weight of the polyether initiator and the total weight of the one or more fluorooxetane monomers.

The one or more fluorooxetane monomers which are polymerized onto the polyether initiator having 1 or more functional groups such as a hydroxyl readily polymerize in the presence of the Lewis acid catalyst (i.e. compounds capable of accepting a pair of electrons). Such suitable Lewis acids include complexes of boron trifluoride, for example BF$_3$etherate, BF$_3$-THF, antimony pentafluoride, zinc chloride, aluminum bromide, and the like with BF$_3$-THF being preferred. When BF$_3$-THF is utilized, the THF will be polymerized and hence a fluorooxetane-THF copolymer will be produced. Generally the amount of THF within the copolymer is from about 0.05 to about 10 or about 12 or about 30 or about 50 percent by weight and desirably from about 0.1 to about 5 percent by weight based upon the total weight of the copolymer.

Polymerization is carried out at temperatures of from about 15° C. to 1 or 2 degrees below the boiling point of the solvent, desirably from about 25° C. to about 45° C., and preferably from about 35° C. to about 40° C. Polymerization times can vary with regard to the temperature and other factors and generally range from about ½ to about 5 hours. Once the various fluorooxetane monomers have been polymerized onto the polyether, the end product which is a block copolymer can be washed with water to remove the solvent.

If the polyether initiator has one functional end group such as a hydroxyl, a AB block copolymer will be formed wherein the B block is derived from the fluorooxetane monomers and the A block is derived from the monohydroxyl polyether. Alternatively, if the polyether has two functional end groups, a BAB block copolymer will be formed. In either situation, the B block will have a hydroxyl end group.

Alternatively, a polyfluorooxetane oligomer, polymer, or copolymer, having 1 (MOX) or 2 (FOX) hydroxyl end groups, see Formulas 5A, 5B and 3A, 3B respectfully, can serve as the initiator for reaction with one or more ether forming monomers such as an alkylene oxide having from 2 to about 6 carbon atoms and preferably from 2 to about 4 carbon atoms. The polyfluorooxetane oligomers, polymers, or copolymers are set forth hereinabove and for purposes of brevity, the description of the same is hereby fully incorporated by reference with the DP of the MOX being the same as the DP of the FOX. As noted, the copolymer can be formed from tetrahydrofuran monomers.

Polymerization conditions of the polyether forming monomers are generally similar to that set forth with regard to polymerization of fluorooxetane monomers. Thus, the catalyst utilized are generally the same such as Lewis acids including $BF_3$-THF, and the like. Polymerization is generally carried out at temperatures from about minus 25° C. to about 5° C. and preferably from about minus 5° C. to about 5° C.

Upon completion of polymerization, a block copolymer of a polyfluorooxetane oligomer, polymer, or copolymer with at least one block copolymer of a polyether will be formed wherein the polyether generally has an hydroxyl end group. If the polyfluorooxetane initiator only has one hydroxyl end group (MOX), then a BA block copolymer will be formed wherein the B block is derived from the polyfluorooxetane initiator and the A block is derived from the polyether monomers. If the polyfluorooxetane initiator has two hydroxyl end groups, then an ABA block copolymer will be formed.

An advantage of the above block copolymers is that they are free of any undesirable isocyanate moieties which create a viscous solution, can chain extend the various block copolymers, and tend to be insoluble in water. Generally, the block copolymers have less than about 5% by weight, desirably less than 3% by weight, and preferably less than 1% by weight or most preferably nil, that is no percent by weight, of an isocyanate containing compound therein for every 100 parts by weight of the formed polyether-polyfluorooxetane block copolymer.

The polyether-polyfluorooxetane block copolymers have very low surface tensions and are generally utilized as flow, or leveling, or wetting additives for various solutions including polymer systems such as solvent systems and preferably for aqueous systems, dispersions, or emulsions. Examples of suitable polymers which are generally soluble in solvents are known to the literature as well as to the art and generally include various polyesters, various polyacrylates, various polyurethanes, various alkyds, various epoxies, or fluorine containing polymers, and the like. Examples of suitable water soluble, dispersible, or emulsifiable, polymers are known to the literature as well as to the art and include various polyacetates, various polyacrylates, various polyacrylic acids, various polyesters, various polyethers, various polyurethanes, various fluorine containing polymers, and the like. The amount of the polyfluorooxetane-polyether block copolymer additive is generally from about 0.001 or about 0.1 to about 1.0 or about 2.0 or about 5 parts by weight and desirably from about 0.25 to about 0.5 parts by weight for every 100 parts by weight of the solvent soluble polymers. With regard to water soluble polymers, the amount of the polyfluorooxetane-polyether block copolymer additive is generally from 0.005 to about 0.5 or about 1.0 or about 3.0 or about 5.0 and desirable from about 0.01 to about 0.025 parts by weight for every 100 parts by weight of the water soluble, dispersible, or emulsifiable polymers.

The invention will be better understood by reference to the following examples which serve to illustrate but not to limit the present invention.

| A. Synthesis of Poly-3-FOX-THF-Polyethylene oxide (B-A-B) | | | | | | |
|---|---|---|---|---|---|---|
| Compound | Weight G | MW | Moles | Mole Ratio | Density | ml |
| 3-FOX | 50.000 | 184.15 | 0.27 | 49.98 | 1.150 | 43.5 |
| Methylene Chloride | 55.282 | 84.93 | 0.65 | 119.82 | 1.330 | 41.6 |
| polyethylene glycol | 54.305 | 4000.00 | 0.01 | 2.50 | 1.017 | 53.4 |
| BF$_3$THF | 0.760 | 139.90 | 0.01 | 1.00 | 1.268 | 0.6 |
| Methylene Chloride | 83.444 | 84.93 | 0.98 | 180.86 | 1.330 | 62.7 |
| Water | 21.500 | 18.01 | 1.19 | 219.75 | 1.000 | 21.5 |
| Water | 42.500 | 18.01 | 2.36 | 434.39 | 1.000 | 42.5 |
| Theoretical Yield (g) | 104.70 | | | | | |
| Expected Yield, Low (g) | 94.23 | | | | | |
| Expected Yield, High (9) | 99.46 | | | | | |
| Solids Loading Reaction, % | 65.52 | | | | | |
| Solids Loading Wash, % | 43.10 | | | | | |
| | ml | | | | | |
| Initial Volume | 139.04 | | | | | |
| Volume after quench, ml | 223.28 | | | | | |
| Volume after wash, ml | 244.28 | | | | | |

A 250 ml 3-necked jacketed reaction flask equipped with a magnetic stirrer, 125 ml pressure equalizing addition funnel, nitrogen inlet. and outlet, temperature probe and reflux condenser was allowed to equilibrate at 30° C. The reactor was charged with 55.28 grams of methylene chloride, 54.31 grams of polyethylene glycol 4000 mw (27.15 mmol OH), and 0.76 grams of boron trifluoride tetrahydrofuran complex (5.43 mmol). The reaction mixture was allowed to stir for 30 minutes. 5 3-FOX monomer (50.00 grams, 271.5 mmol) was added over 90 minutes. The temperature reached 31° C. after a 55 minute induction period. The temperature reached a maximum of 40° C. The reaction was allowed to stir for 10 hours. The methylene chloride solution was then washed with 42 ml water three times to remove the boron trifluoride tetrahydrofuran complex. The solution was then dried with magnesium sulfate, and the solvent was removed. Poly-3-FOX-THF-polyethylene oxide triblock copolymer (88.25 grams) was isolated. The 3-FOX DP was 14.5 in comparison to a theoretical DP of 20.

Argon inlet and outlet, temperature probe and reflux condenser was allowed to equilibrate at 33° C. The reactor was charged with 26.5 grams of methylene chloride, 21.5 grams of polyethylene glycol monomethyl ether 2000 mw (10.75 mmol OH), and 0.76 grams of boron trifluoride tetrahydrofuran complex (5.43 mmol). The reaction mixture was allowed to stir for 30 minutes. 3-FOX monomer (50.0 grams, 271.5 mmol) was added over 50 minutes. The temperature reached 38.5° C. after a 30 minute induction period. The temperature reached a maximum of 42.8° C. The reaction was allowed to stir for 10 hours. The methylene chloride solution was then washed with 42 ml water three times to remove the boron trifluoride tetrahydrofuran complex. The solution was then dried with magnesium sulfate, and the solvent was removed. Poly-3-FOX-THF-polyethylene oxide diblock copolymer (59.05 grams) was

| B. Synthesis of Poly-3-FOX-THF-Polyethylene oxide (B-A) | | | | | | |
|---|---|---|---|---|---|---|
| Compound | Weight G | MW | Moles | Mole Ratio | Density | ml |
| 3-FOX | 50.000 | 184.15 | 0.27 | 49.98 | 1.150 | 43.5 |
| Methylene Chloride | 38.298 | 84.93 | 0.45 | 83.01 | 1.330 | 28.8 |
| polyethylene glycol methyl ether | 21.500 | 2000.00 | 0.01 | 1.98 | 1.017 | 21.1 |
| BF$_3$THF | 0.760 | 139.90 | 0.01 | 1.00 | 1.268 | 0.6 |
| Methylene Chloride | 57.808 | 84.93 | 0.68 | 125.29 | 1.330 | 43.5 |
| Water | 21.500 | 18.01 | 1.19 | 219.75 | 1.000 | 21.5 |
| Water | 42.500 | 18.01 | 2.36 | 434.39 | 1.000 | 42.5 |
| Theoretical Yield (g) | 71.89 | | | | | |
| Expected Yield, Low (g) | 64.70 | | | | | |
| Expected Yield, High (g) | 68.30 | | | | | |
| Solids Loading Reaction, % | 65.36 | | | | | |
| Solids Loading Wash, % | 42.92 ml | | | | | |
| Initial Volume | 94.01 | | | | | |
| Volume after quench, ml | 158.98 | | | | | |
| Volume after wash, ml | 179.98 | | | | | |

A 250 ml 3-necked jacketed reaction flask equipped with a magnetic stirrer, 125 ml pressure equalizing addition funnel, isolated. The 3-FOX DP was 21.04 in comparison-to a theoretical DP of 20.0.

| C. Synthesis of Poly-3-FOX-THF-Poiyethylene oxide (B-A) | | | | | | |
|---|---|---|---|---|---|---|
| Compound | Weight G | MW | Moles | Mole Ratio | Density | ml |
| 3-FOX | 50.000 | 184.15 | 0.27 | 15.10 | 1.150 | 43.5 |
| Methylene Chloride | 74.200 | 84.93 | 0.87 | 48.60 | 1.330 | 55.8 |
| polyethylene glycol methyl ether | 90.000 | 2000.00 | 0.05 | 2.50 | 1.017 | 88.5 |
| BF$_3$THF | 2.515 | 139.90 | 0.0180 | 1.00 | 1.268 | 2.0 |
| Methylene Chloride | 119.000 | 84.93 | 1.40 | 77.94 | 1.330 | 89.5 |
| 5% sodium bicarbonate | 21.500 | 84.01 | 0.0128 | 0.71 | 1.000 | 21.51 |
| Water | 42.500 | 18.01 | 2.36 | 131.27 | 1.000 | 42.5 |
| Theoretical Yield (g) | 141.30 | | | | | |
| Expected Yield, Low (g) | 127.17 | | | | | |
| Expected Yield, High (g) | 134.23 | | | | | |
| Solids Loading Reaction, % | 65.76 | | | | | |
| Solids Loading Wash, % | 42.45 ml | | | | | |
| Initial Volume | 189.75 | | | | | |
| Volume after quench, ml | 300.72 | | | | | |
| Volume after wash, ml | 321.72 | | | | | |

A 250 ml 3-necked jacketed reaction flask equipped with a magnetic stirrer, 125 ml pressure equalizing addition funnel, argon inlet and outlet, temperature probe and reflux condenser was allowed to equilibrate at 33° C. The reactor was charged with 74.89 grams of methylene chloride, 90 grams of polyethylene glycol monomethyl ether 2000 mw (45 mmol OH), and 2.51 grams of boron trifluoride tetrahydrofuran complex (17.94 mmol). The reaction mixture was allowed to stir for 30 minutes. 3-FOX monomer of (50.0 grams, 271.5 mmol) was added over 45 minutes. The temperature reached 36.1° C. after a 25 minute induction period. The temperature reached a maximum of 37° C. The reaction was allowed to stir for 10 hours. The methylene chloride solution was then washed with 42 ml water three times to remove the boron trifluoride tetrahydrofuran complex. The solution was then dried with magnesium sulfate, and the solvent was removed. Poly-3-FOX-THF-polyethylene oxide diblock copolymer (113.69 grams) was isolated. The 3-FOX DP was 10.5 in comparison to a theoretical DP of 6.

A 4 liter 3-necked jacketed reaction flask equipped with a mechanical stirrer, monomer addition pump, nitrogen inlet and outlet, temperature probe and reflux condenser was allowed to equilibrate at 35° C. The reactor was charged with 781.33 grams of methylene chloride, 475.16 grams of polyethylene glycol monomethyl ether 350 mw (1.36 mol OH), and 75.97 grams of boron trifluoride tetrahydrofuran complex (0.543 mol). The reaction mixture was allowed to stir for 30 minutes. 3-FOX monomer (1000 grams, 5.43 mol) was added over 2 hours 30 minutes. The temperature reached 35.6° C. after a 25 minute induction period. The temperature reached a maximum of 42° C. The reaction was allowed to stir for 2 hours. Additional methylene chloride was added (1180 grams) and the solution was then washed with 750 ml 5% sodium bicarbonate two times and 272 ml water to remove the boron trifluoride tetrahydrofuran complex. The solution was then dried with magnesium sulfate, and the solvent was removed. Poly-3-FOX-THF-polyethylene oxide diblock copolymer, DP 3.9 (1490 grams) was isolated.

| D. Synthesis of Poly-3-FOX-THF-Polyethylene Oxide (B-A) | | | | | | |
|---|---|---|---|---|---|---|
| Compound | Weight G | MW | Moles | Mole Ratio | Density | ml |
| 3-FOX | 1000.000 | 184.15 | 5.43 | 10.00 | 1.150 | 869.6 |
| Methylene Chloride | 781.833 | 84.93 | 9.21 | 16.95 | 1.330 | 587.8 |
| Carbowax (TM) PEO 350 Monol | 475.156 | 350.00 | 1.36 | 2.50 | 1.017 | 467.2 |
| BF$_3$THF | 75.970 | 139.90 | 0.5430 | 1.00 | 1.268 | 59.9 |
| Methylene Chloride | 1961.957 | 84.93 | 23.10 | 42.54 | 1.330 | 1475.2 |
| 5% Sodium Bicarbonate | 540.000 | 84.01 | 0.32 | 0.59 | 1.000 | 540.0 |
| Wash (water) | 272.110 | 18.01 | 15.11 | 27.82 | 1.000 | 272.1 |
| Theoretical Yield (g) | 1514.31 | | | | | |
| Expected Yield, Low (g) | 1362.88 | | | | | |
| Expected Yield, High (g) | 1438.59 | | | | | |
| Solids Loading Reaction, % | 66.49 | | | | | |
| Solids Loading Wash, % | 36.12 | | | | | |
| | ml | | | | | |
| Initial Volume | 1984.54 | | | | | |
| Volume after quench, ml | 3999.69 | | | | | |
| Volume after wash, ml | 3731.80 | | | | | |

| E. Synthesis of Poly-3-FOX-THF-Polypropylene Oxide (B-A-B) | | | | | | |
|---|---|---|---|---|---|---|
| Compound | Weight G | MW | Moles | Mole Ratio | Density | ml |
| 3-FOX | 535.000 | 184.15 | 2.91 | 30.00 | 1.150 | 465.2 |
| Methylene Chloride | 541.601 | 84.93 | 6.38 | 65.84 | 1.330 | 407.2 |
| PPG voranol 220-056 | 486.890 | 2011.10 | 0.24 | 2.50 | 1.017 | 478.8 |
| BF$_3$THF | 13.550 | 139.90 | 0.0969 | 1.00 | 1.268 | 10.7 |
| Methylene Chloride | 817.512 | 84.93 | 9.63 | 99.38 | 1.330 | 614.7 |
| 5% Sodium Bicarbonate | 830.000 | 84.01 | 0.49 | 5.10 | 1.000 | 830.0 |
| Wash (water) | 819.995 | 18.01 | 45.53 | 470.09 | 1.000 | 820.0 |
| Theoretical Yield (g) | 1028.87 | | | | | |
| Expected Yield, Low (g) | 925.99 | | | | | |
| Expected Yield, High (g) | 977.43 | | | | | |
| Solids Loading Reaction, % | 65.66 | | | | | |
| Solids Loading Wash, % | 43.24 | | | | | |
| | ml | | | | | |
| Initial Volume | 1361.87 | | | | | |
| Volume after quench, ml | 3210.90 | | | | | |
| Volume after wash, ml | 2586.23 | | | | | |

A 4 liter 3-necked jacketed reaction flask equipped with a mechanical stirrer, monomer addition pump, nitrogen inlet and outlet, temperature probe and reflux condenser was allowed to equilibrate at 25° C. The reactor was charged with 541.60 grams of methylene chloride, 486.89 grams of voranol polypropylene glycol 220–056 (Purchased from Dow, 0.24 mol OH), and 13.55 grams of boron trifluoride tetrahydrofuran complex (0.0979 mol). The reaction mixture was allowed to stir for 30 minutes. 3-FOX monomer (535 grams, 2.91 mol) was added over 1 hour 47 minutes. The temperature reached 25.6° C. after a 10 minute induction period. The temperature reached a maximum of 32° C. The reaction was allowed to stir for 10 hours. Additional methylene chloride was added (817.52 grams), and the solution was then washed with 820 ml 5% sodium bicarbonate two times and 535 ml water to remove the boron trifluoride tetrahydrofuran complex. The solution was then dried with magnesium sulfate, and the solvent was removed. Poly-3-FOX-THF-Polypropylene Oxide triblock copolymer, DP 13.8 (981.8 grams) was isolated. GPC: Mn=3080, Mw=5040 (Polystyrene standards, AO # 14527). Hydroxyl Number determination: mean OH number 32.90 Mn 3410.33

A 4 liter 3-necked jacketed reaction flask equipped with a mechanical stirrer, monomer addition pump, nitrogen inlet and outlet, temperature probe and reflux condenser was allowed to equilibrate at 25° C. The reactor was charged with 537.8 grams of methylene chloride, 314.8 grams of voranol polypropylene glycol 220–056 (purchased from Dow, 0.156 mol OH), and 17.73 grams of boron trifluoride tetrahydrofuran complex (0.1267 mol). The reaction mixture was allowed to stir for 30 minutes. 3-FOX monomer (700 grams, 3.80 mol) was added over 1 hours 10 minutes. The temperature reached 29° C. after a 7 minute induction period. The temperature reached a maximum of 32° C. The reaction was allowed to stir for 10 hours. Additional methylene chloride was added (811.90 grams), and the solution was then washed with 820 ml 5% sodium bicarbonate two times and 750 ml water to remove the boron trifluoride tetrahydrofuran complex. The solution was then dried with magnesium sulfate, and the solvent was removed. Poly-3-FOX-THF-Polypropylene Oxide triblock copolymer, DP 22.1 (1012.3 grams) was isolated. GPC: Mn=4340, Mw=7680 (polystyrene standards, AO # 14527). Hydroxyl Number determination: OH # 22.38, Mn=5013.

F. Synthesis of Poly-3-FOX-THF-Polypropylene Oxide (B-A-B)

| Compound | Weight G | MW | Moles | Mole Ratio | | ml |
|---|---|---|---|---|---|---|
| 3-FOX | 700.000 | 184.15 | 3.80 | 30.00 | 1.150 | 608.7 |
| Methylene Chloride | 537.881 | 84.93 | 6.33 | 49.98 | 1.330 | 404.4 |
| PPG voranol 220-056 | 314.870 | 2011.10 | 0.16 | 1.24 | 1.017 | 309.6 |
| BF₃THF | 17.729 | 139.90 | 0.1267 | 1.00 | 1.268 | 14.0 |
| Methylene Chloride | 811.896 | 84.93 | 9.56 | 75.44 | 1.330 | 610.0 |
| 5% Sodium Bicarbonate | 700.000 | 84.01 | 0.42 | 3.29 | 1.000 | 700.0 |
| Wash (water) | 700.000 | 18.01 | 38.87 | 306.70 | 1.000 | 700.0 |
| Theoretical Yield (g) | 1024.01 | | | | | |
| Expected Yield, Low (g) | 921.61 | | | | | |
| Expected Yield, High (g) | 972.81 | | | | | |
| Solids Loading Reaction, % | 65.75 | | | | | |
| Solids Loading Wash, % | 43.34 | | | | | |
| | ml | | | | | |
| Initial Volume | 1336.71 | | | | | |
| Volume after quench, ml | 3051.51 | | | | | |
| Volume after wash, ml | 2441.07 | | | | | |

G. Synthesis of Poly-3-FOX-THF-Polybutylene Oxide (B-A-B)

| Compound | Weight G | MW | Moles | Mole Ratio | Density | ml |
|---|---|---|---|---|---|---|
| 3-FOX | 100.000 | 184.15 | 0.54 | 15.00 | 1.150 | 87.0 |
| Methylene Chloride | 100.700 | 84.93 | 1.19 | 32.75 | 1.330 | 75.7 |
| B100-1000 | 90.506 | 1000.00 | 0.09 | 2.50 | 1.017 | 89.0 |
| BF₃THF | 5.065 | 139.90 | 0.04 | 1.00 | 1.268 | 4.0 |
| Methylene Chloride | 172.400 | 84.93 | 2.03 | 56.07 | 1.330 | 129.6 |
| Water | 43.000 | 18.01 | 2.39 | 65.95 | 1.000 | 43.0 |
| Water | 85.000 | 18.01 | 4.72 | 130.37 | 1.000 | 85.0 |
| Theoretical Yield (g) | 193.12 | | | | | |
| Expected Yield, Low (g) | 173.80 | | | | | |
| Expected Yield, High (g) | 183.46 | | | | | |
| Solids Loading Reaction, % | 66.01 | | | | | |

G. Synthesis of Poly-3-FOX-THF-Polybutylene Oxide (B-A-B)

| Compound | Weight G | MW | Moles | Mole Ratio | Density | ml |
|---|---|---|---|---|---|---|
| Solids Loading Wash, % | 41.73 | | | | | |
| | ml | | | | | |
| Initial Volume | 255.66 | | | | | |
| Volume after quench, ml | 428.28 | | | | | |
| Volume after wash, ml | 470.28 | | | | | |

A 1 liter 3-necked jacketed reaction flask equipped with a magnetic stirrer, addition funnel, nitrogen inlet and outlet, temperature probe and reflux condenser was allowed to equilibrate at 25° C. The reactor was charged with 100.7 grams of methylene chloride, 90.51 grams of B100–1000 polybutylene glycol (Dow, 0.09 mol OH), and 5.07 grams of boron trifluoride tetrahydrofuran complex (0.04 mol). The reaction mixture was allowed to stir for 30 minutes. 3-FOX monomer (100 grams, 0.54 mol) was added over 30 minutes. The temperature reached 35° C. after a 5 minute induction period. The temperature reached a maximum of 60° C. The reaction was allowed to stir for 10 hours. Additional methylene chloride was added (172.4 grams), and the solution was then washed with 85 ml 5% sodium bicarbonate and 85 ml water to remove the boron trifluoride tetrahydrofuran complex. The solution was then dried with magnesium sulfate, and the solvent was removed. Poly-3-FOX-THF-Polybutylene Oxide triblock copolymer, DP 13.83 (185 grams) was isolated.

and outlet, temperature probe and reflux condenser was allowed to equilibrate at 25° C. The reactor was charged with 537.8 grams of methylene chloride, 495.68 grams of Terathane polyTHF 2000 (Purchased from Dupont, 0.2421 mol OH), and 13.55 grams of boron trifluoride tetrahydrofuran complex (0.09684 mol). The reaction mixture was allowed to stir for 30 minutes. 3-FOX monomer (535 grams, 2.91 mol) was added over 2 hours 30 minutes. The temperature reached 26.7° C. after a 40 minute induction period. The temperature reached a maximum of 27° C. The reaction was allowed to stir for 3 hours. Additional methylene chloride was added (824.55 grams), and the solution was then washed with 860 ml 5% sodium bicarbonate and 890 ml water to remove the boron trifluoride tetrahydrofuran complex. The solution was then dried with magnesium sulfate, and the solvent was removed. Poly-3-FOX-THF-Polytetrahydrofuran diblock copolymer, DP 11.04 (979.8 grams) was isolated. GPC: Mn=3970, Mw=8090

H. Synthesis of Poly-3-FOX-Polytetrahydrofuran (B-A)

| Compound | Weight G | MW | Moles | Mole Ratio | density | ml |
|---|---|---|---|---|---|---|
| 3-FOX | 535.000 | 184.15 | 2.91 | 30.00 | 1.150 | 465.2 |
| Methylene Chloride | 537.798 | 84.93 | 6.33 | 65.38 | 1.330 | 404.4 |
| Terathane 2000 poly THF | 495.680 | 2047.40 | 0.24 | 2.50 | 1.017 | 487.4 |
| BF₃THF | 13.550 | 139.90 | 0.0969 | 1.00 | 1.268 | 10.7 |
| Methylene Chloride | 824.544 | 84.93 | 9.71 | 100.24 | 1.330 | 620.0 |
| 5% Sodium Bicarbonate | 535.000 | 84.01 | 0.32 | 3.29 | 1.000 | 535.0 |
| Wash (water) | 535.000 | 18.01 | 29.71 | 306.70 | 1.000 | 535.0 |
| Theoretical Yield (g) | 1037.66 | | | | | |
| Expected Yield, Low (g) | 933.90 | | | | | |
| Expected Yield, High (g) | 985.78 | | | | | |
| Solids Loading Reaction, % | 66.01 | | | | | |
| Solids Loading Wash, % | 43.39 | | | | | |
| | ml | | | | | |
| Initial Volume | 1367.66 | | | | | |
| Volume after quench, ml | 2522.62 | | | | | |
| Volume after wash, ml | 1902.66 | | | | | |

A 4 liter 3-necked jacketed reaction flask equipped with a mechanical stirrer, monomer addition pump, nitrogen inlet (polystyrene standards, AO # 14527). Hydroxyl Number determination: OH # 41.93, Mn=2676.

I. Synthesis of Poly-5-FOX-THF(DP 20)-Polyethylene Oxide (B-A)

| Compound | Weight G | MW | Moles | Mole Ratio | Density | ml |
|---|---|---|---|---|---|---|
| 5-FOX | 100.000 | 234.15 | 0.43 | 50.21 | 1.150 | 87.0 |
| Methylene Chloride | 56.959 | 84.93 | 0.67 | 78.84 | 1.330 | 42.8 |
| Carbowax (TM) PEO 350 Monol | 7.470 | 350.00 | 0.02 | 2.51 | 1.017 | 7.3 |
| BF$_3$THF | 1.190 | 139.90 | 0.0085 | 1.00 | 1.268 | 0.9 |
| Methylene Chloride | 85.976 | 84.93 | 1.01 | 119.01 | 1.330 | 64.6 |
| 5% Sodium Bicarbonate | 100.000 | 84.01 | 0.06 | 7.00 | 1.000 | 100.0 |
| Wash (water) | 100.000 | 18.01 | 5.55 | 652.77 | 1.000 | 100.0 |
| Theoretical Yield (g) | 108.08 | | | | | |
| Expected Yield, Low (g) | 97.27 | | | | | |
| Expected Yield, High (g) | 102.68 | | | | | |
| Solids Loading Reaction, % | 65.61 | | | | | |
| Solids Loading Wash, % | 43.19 ml | | | | | |
| Initial Volume | 138.07 | | | | | |
| Volume after quench, ml | 302.71 | | | | | |
| Volume after wash, ml | 302.71 | | | | | |

A 500 milliliter 3-necked reaction flask equipped with a magnetic stirrer, monomer addition funnel, nitrogen inlet and outlet, temperature probe and reflux condenser was allowed to equilibrate at 25° C. The reactor was charged with 56.96 grams of methylene chloride, 7.47 grams of polyethylene glycol monomethyl ether 350 mw (21.35 mmol OH), and 1.19 grams of boron trifluoride tetrahydrofuran complex (8.54 mmol). The reaction mixture was allowed to stir for 30 minutes. 5-FOX monomer (100 grams, 427.08 mmol) was added over 2 hours 35 minutes. The temperature reached 29.4° C. after a 10 minute induction period. A DP of 9.13 was found. An additional 109.99 grams of 5-FOX monomer was added. The temperature reached a maximum of 30.6° C. The reaction was allowed to stir for 10 hours. Additional methylene chloride was added (85.98 grams) and the solution was then washed with 100 ml 5% sodium bicarbonate and 100 ml water to remove the boron trifluoride tetrahydrofuran complex. The solution was then dried with magnesium sulfate, and the solvent was removed. Poly-5-FOX-THF(DP 20)-Polyethylene Oxide diblock copolymer, DP 20.6 (195.5 grams) was isolated.

A 500 milliliter 3-necked reaction flask equipped with a magnetic stirrer, monomer addition funnel, nitrogen inlet and outlet, temperature probe and reflux condenser was allowed to equilibrate at 25° C. The reactor was charged with 66.20 grams of methylene chloride, 24.91 grams of polyethylene glycol monomethyl ether 350 mw (71.18 mmol OH), and 3.98 grams of boron trifluoride tetrahydrofuran complex (28.47 mmol). The reaction mixture was allowed to stir for 30 minutes. 5-FOX monomer (100 grams, 427.08 mmol) was added over 23 minutes. The temperature reached 31° C. after a 10 minute induction period. The temperature reached a maximum of 33° C. The reaction was allowed to stir for 10 hours. Additional methylene chloride was added (99.93 grams) and the solution was then washed with 100 ml 5% sodium bicarbonate and 100 ml water to remove the boron trifluoride tetrahydrofuran complex. The solution was then dried with magnesium sulfate, and the solvent was removed. Poly-5-FOX-THF(DP 6)-Polyethylene Oxide diblock copolymer, DP 5.3 (115.5 grams) was isolated.

J. Synthesis of Poly-5-FOX-THF(DP 6)-Polyethylene Oxide (B-A)

| Compound | Weight G | MW | Moles | Mole Ratio | Density | ml |
|---|---|---|---|---|---|---|
| 5-FOX | 100.000 | 234.15 | 0.43 | 15.01 | 1.150 | 87.0 |
| Methylene Chloride | 66.202 | 84.93 | 0.78 | 27.40 | 1.330 | 49.8 |
| Carbowax (TM) PEO 350 Monol | 24.910 | 350.00 | 0.07 | 2.50 | 1.017 | 24.5 |
| BF$_3$THF | 3.980 | 139.90 | 0.0284 | 1.00 | 1.268 | 3.1 |
| Methylene Chloride | 99.928 | 84.93 | 1.18 | 41.36 | 1.330 | 75.1 |
| 5% Sodium Bicarbonate | 100.000 | 84.01 | 0.06 | 2.09 | 1.000 | 100.0 |
| Wash (water) | 100.000 | 18.01 | 5.55 | 195.17 | 1.000 | 100.0 |
| Theoretical Yield (g) | 126.96 | | | | | |
| Expected Yield, Low (g) | 114.27 | | | | | |
| Expected Yield, High (g) | 120.61 | | | | | |
| Solids Loading Reaction, % | 66.07 | | | | | |
| Solids Loading Wash, % | 43.69 ml | | | | | |
| Initial Volume | 164.37 | | | | | |
| Volume after quench, ml | 339.50 | | | | | |
| Volume after wash, ml | 339.50 | | | | | |

| K. Synthesis of Poly-5-FOX-THF(DP 8)-Polyethylene Oxide (B-A-B) | | | | | | |
|---|---|---|---|---|---|---|
| Compound | Weight G | MW | Moles | Mole Ratio | Density | ml |
| 5-FOX | 1200.000 | 234.15 | 5.12 | 20.00 | 1.150 | 1043.5 |
| Methylene Chloride | 929.999 | 84.93 | 10.95 | 42.73 | 1.330 | 699.2 |
| PEO 400 diol | 256.248 | 400.00 | 0.64 | 2.50 | 1.017 | 252.0 |
| BF$_3$THF | 35.850 | 139.90 | 0.2563 | 1.00 | 1.268 | 28.3 |
| 5% Sodium Bicarbonate | 1200.000 | 84.01 | 0.71 | 2.79 | 1.000 | 1200.0 |
| Wash (water) | 1200.000 | 18.01 | 66.63 | 260.01 | 1.000 | 1200.0 |
| Theoretical Yield (g) | 1474.72 | | | | | |
| Expected Yield, Low (g) | 1327.25 | | | | | |
| Expected Yield, High (g) | 1400.99 | | | | | |
| Solids Loading Reaction, % | 61.60 | | | | | |
| | ml | | | | | |
| Initial Volume | 2022.96 | | | | | |
| Volume after quench, ml | 3222.96 | | | | | |
| Volume after wash, ml | 3222.96 | | | | | |

A 4 liter 3-necked reaction flask equipped with a mechanical stirrer, monomer addition pump, nitrogen inlet and outlet, temperature probe and reflux condenser was allowed to equilibrate at 35° C. The reactor was charged with 930.00 grams of methylene chloride, 256.25 grams of polyethylene glycol 400 mw (purchased from Dow, 640.61 mmol OH), and 35.85 grams of boron trifluoride tetrahydrofuran complex (256.26 mmol). The reaction mixture was allowed to stir for 50 minutes. 5-FOX monomer (1200 grams, 5124 mmol) was added over 1 hour and 25 minutes. The temperature reached 31° C. after a 10 minute induction period. The temperature reached a maximum of 43.8° C. The reaction was allowed to stir for 2 hours. The solution was then washed with 1200 ml 5% sodium bicarbonate and 1200 ml water to remove the boron trifluoride tetrahydrofuran complex. The solution was then dried with magnesium sulfate, and the solvent was removed. Poly-5-FOX-THF(DP 8)-Polyethylene Oxide triblock copolymer, DP 8.23 (1419.1 grams) was isolated.

A 250 milliliter 3-necked reaction flask equipped with a magnetic stirrer, monomer addition funnel, nitrogen inlet and outlet, temperature probe and reflux condenser was allowed to equilibrate at 25° C. The reactor was charged with 46.41 grams of methylene chloride, 12.56 grams of polyethylene glycol monomethyl ether 350 mw (35.90 mmol OH), and 2.01 grams of boron trifluoride tetrahydrofuran complex (14.36 mmol). The reaction mixture was allowed to stir for 30 minutes. 9-FOX monomer (75 grams, 215.39 mmol) was added over 2 hours. The temperature reached 26.1° C. after a 15 minute induction period. The temperature reached a maximum of 29.4° C. The reaction was allowed to stir for 2 hours. Additional methylene chloride was added (75 grams) and the solution was then washed with 75 ml 5% sodium bicarbonate and 75 ml water to remove the boron trifluoride tetrahydrofuran complex. The solution was then dried with magnesium sulfate, and the solvent was removed. Poly-9-FOX-THF (DP 6)-Polyethylene Oxide diblock copolymer, DP 6.14 (66.7 grams) was isolated.

| L. Synthesis of Poly-9-FOX-THF (DP 6)-Polyethylene Oxide (B-A) | | | | | | |
|---|---|---|---|---|---|---|
| Compound | Weight G | MW | Moles | Mole Ratio | Density | ml |
| 9-FOX | 75.000 | 348.21 | 0.22 | 14.99 | 1.150 | 65.2 |
| Methylene Chloride | 46.407 | 84.93 | 0.55 | 38.03 | 1.330 | 34.9 |
| Carbowax (TM) PEO 350 Monol | 12.560 | 350.00 | 0.04 | 2.50 | 1.017 | 12.4 |
| BF$_3$THF | 2.010 | 139.90 | 0.0144 | 1.00 | 1.268 | 1.6 |
| Methylene Chloride | 70.048 | 84.93 | 0.82 | 57.41 | 1.330 | 52.7 |
| 5% Sodium Bicarbonate | 75.000 | 84.01 | 0.04 | 3.11 | 1.000 | 75.0 |
| Wash (water) | 75.000 | 18.01 | 4.16 | 289.85 | 1.000 | 75.0 |
| Theoretical Yield (g) | 88.60 | | | | | |
| Expected Yield, Low (g) | 79.74 | | | | | |
| Expected Yield, High (g) | 84.17 | | | | | |
| Solids Loading Reaction, % | 65.87 | | | | | |
| Solids Loading Wash, % | 43.48 | | | | | |
| | ml | | | | | |
| Initial Volume | 114.04 | | | | | |
| Volume after quench, ml | 241.71 | | | | | |
| Volume after wash, ml | 241.71 | | | | | |

M. Synthesis of Poly-9-FOX-THF (DP 20)-Polyethylene Oxide (B-A)

| Compound | Weight G | MW | Moles | Mole Ratio | Density | ml |
|---|---|---|---|---|---|---|
| 9-FOX | 75.000 | 348.21 | 0.22 | 50.22 | 1.150 | 65.2 |
| Methylene Chloride | 41.748 | 84.93 | 0.49 | 114.62 | 1.330 | 31.4 |
| Carbowax (TM) PEO 350 Monol | 3.770 | 350.00 | 0.01 | 2.51 | 1.017 | 3.7 |
| BF$_3$THF | 0.600 | 139.90 | 0.0043 | 1.00 | 1.268 | 0.5 |
| Methylene Chloride | 63.016 | 84.93 | 0.74 | 173.00 | 1.330 | 47.4 |
| 5% Sodium Bicarbonate | 75.000 | 84.01 | 0.04 | 10.41 | 1.000 | 75.0 |
| Wash (water) | 75.000 | 18.01 | 4.16 | 970.99 | 1.000 | 75.0 |
| Theoretical Yield (g) | 79.08 | | | | | |
| Expected Yield, Low (g) | 71.17 | | | | | |
| Expected Yield, High (g) | 75.13 | | | | | |
| Solids Loading Reaction, % | 65.53 | | | | | |
| Solids Loading Wash, % | 43.10 ml | | | | | |
| Initial Volume | 100.79 | | | | | |
| Volume after quench, ml | 223.17 | | | | | |
| Volume after wash, ml | 223.17 | | | | | |

A 250 milliliter 3-necked reaction flask equipped with a magnetic stirrer, monomer addition funnel, nitrogen inlet and outlet, temperature probe and reflux condenser was allowed to equilibrate at 25° C. The reactor was charged with 41.75 grams of methylene chloride, 3.77 grams of polyethylene glycol monomethyl ether 350 mw (10.77 mmol OH), and 0.60 grams of boron trifluoride tetrahydrofuran complex (4.31 mmol). The reaction mixture was allowed to stir for 30 minutes. 9-FOX monomer (75 grams, 215.39 mmol) was added over 2 hours 35 minutes. The temperature reached 29.4° C. after a 10 minute induction period. A DP of 9.13 was found. An additional 109.99 grams of 5-FOX monomer was added. The temperature reached a maximum of 30.6° C. The reaction was allowed to stir for 10 hours. Additional methylene chloride was added (75 grams) and the solution was then washed with 75 ml 5% sodium bicarbonate and 75 ml water to remove the boron trifluoride tetrahydrofuran complex. The solution was then dried with magnesium sulfate, and the solvent was removed. Poly-9-FOX-THF (DP 20)-Polyethylene Oxide diblock copolymer, DP 19.96 (63.6 grams) was isolated.

N. Synthesis of Poly-Mixed-FOX-THF (DP 6)-Polyethylene Oxide (B-A)

| Compound | Weight (S × Ratio) G | MW | Moles | Mole Ratio | Density | ml |
|---|---|---|---|---|---|---|
| Zox Monomer | 100.000 | 579.00 | 0.17 | 15.01 | 1.150 | 87.0 |
| Heloxy 7, 5 mol % | 1.970 | 228.00 | 0.009 | 0.75 | 0.900 | |
| Benzotrifluoride | 100.000 | 146.11 | 0.68 | 59.47 | 1.185 | 84.4 |
| Carbowax (TM) PEO 350 Monol | 10.070 | 350.00 | 0.03 | 2.50 | 1.017 | 9.9 |
| BF$_3$THF | 1.610 | 139.90 | 0.0115 | 1.00 | 1.268 | 1.3 |
| Methylene chloride, initiator solvent | 23.115 | 84.93 | 0.27 | 23.65 | 1.330 | 17.4 |
| Methylene chloride, wash solvent | 88.056 | 84.93 | 1.04 | 90.09 | 1.330 | 66.2 |
| 5% Sodium Bicarbonate | 100.000 | 84.01 | 0.06 | 5.17 | 1.000 | 100.0 |
| Wash (water) | 100.000 | 18.01 | 5.55 | 482.48 | 1.000 | 100.0 |
| Theoretical Yield (g) | 110.90 | | | | | |
| Expected Yield, Low (g) | 99.81 | | | | | |
| Expected Yield, High (g) | 105.35 | | | | | |
| Solids Loading Reaction, % | 52.76 | | | | | |
| Solids Loading Wash, % | 37.26 ml | | | | | |
| Initial volume | 182.52 | | | | | |
| Volume after quench, ml | 366.10 | | | | | |
| Volume after wash, ml | 366.10 | | | | | |

A 500 milliliter 3-necked reaction flask equipped with a magnetic stirrer, monomer addition funnel, nitrogen inlet and outlet, temperature probe and reflux condenser was allowed to equilibrate at 25° C. The reactor was charged with 23.12 grams of methylene chloride, 10.07 grams of polyethylene glycol monomethyl ether 350 mw (28.79 mmol OH), and 1.61 grams of boron trifluoride tetrahydrofuran complex (11.31 mmol). The reaction mixture was allowed to stir for 30 minutes. A solution containing ZOX monomer mixtures of different fluorinated oxetane monomers, wherein, independently $R_f$ has from 8 to 16 carbon atoms, (100 grams, 172.71 mmol), heloxy 7 (1.97 grams, 8.64 mmol), and 100 ml of benzotrifluoride was added over 30 minutes. The temperature reached 26.6° C. after a 10 minute induction period. The temperature reached a maximum of 30.6° C. The reaction was allowed to stir for 4 hours. Additional methylene chloride was added (88.06 grams) and the solution was then washed with 100 ml 5% sodium bicarbonate and 100 ml water to remove the boron trifluoride tetrahydrofuran complex. The solution was then dried with magnesium sulfate, and the solvent was removed. Poly-Mixed-FOX-THF (DP 6)-Polyethylene Oxide diblock copolymer, DP 5.90 (104.1 grams) was isolated.

Polyfluorooxetane-Urethane Polyether Block Copolymers

Block copolymers are formed by initially reacting a fluorooxetane oligomer, polymer, or copolymer, having either 1 or 2 hydroxyl end groups with generally excess moles of a polyisocyanate to form a urethane linkage having a free isocyanate end group which is subsequently reacted with excess moles of a polyether. Alternatively, the block copolymers can be formed by initially reacting a polyether having either 1 or 2 hydroxyl end groups with generally excess moles of a polyisocyanate to form a urethane linkage having a free isocyanate end group which is subsequently reacted with excess moles of a fluorooxetane oligomer, polymer or copolymer.

A polyfluorooxetane polymer is made in a manner as set forth hereinabove and the same is hereby fully incorporated by reference. As previously noted, the description of the same is also in U.S. Pat. Nos. 5,650,483; 5,668,250; 5,668,

| O. Synthesis of Poly-Mixed-FOX-THF (DP2O)-Polyethylene Oxide (B-A) | | | | | | |
|---|---|---|---|---|---|---|
| Compound | Weight (S × Ratio) G | MW | Moles | Mole Ratio | Density | ml |
| Zox Monomer | 100.000 | 579.00 | 0.17 | 50.34 | 1.150 | 87.0 |
| Heloxy 7, 5 mol % | 1.970 | 228.00 | 0.009 | 2.52 | 0.900 | |
| Benzotrifluoride | 100.000 | 146.11 | 0.68 | 199.48 | 1.185 | 84.4 |
| Carbowax (TM) PEO 350 Monol | 3.020 | 350.00 | 0.01 | 2.51 | 1.017 | 3.0 |
| BF$_3$THF | 0.480 | 139.90 | 0.0034 | 1.00 | 1.268 | 0.4 |
| Methylene chloride, initiator solvent | 21.634 | 84.93 | 0.25 | 74.24 | 1.330 | 16.3 |
| Methylene chloride, wash solvent | 82.416 | 84.93 | 0.97 | 282.83 | 1.330 | 62.0 |
| 5% Sodium Bicarbonate | 100.000 | 84.01 | 0.06 | 17.35 | 1.000 | 100.0 |
| Wash (water) | 100.000 | 18.01 | 5.55 | 1618.31 | 1.000 | 100.0 |
| Theoretical Yield (g) | 103.27 | | | | | |
| Expected Yield, Low (g) | 92.94 | | | | | |
| Expected Yield, High (g) | 98.10 | | | | | |
| Solids Loading Reaction, % | 50.86 | | | | | |
| Solids Loading Wash, % | 36.20 ml | | | | | |
| Initial Volume | 174.69 | | | | | |
| Volume after quench, ml | 352.93 | | | | | |
| Volume after wash, ml | 352.93 | | | | | |

A 500 milliliter 3-necked reaction flask equipped with a magnetic stirrer, monomer addition funnel, nitrogen inlet and outlet, temperature probe and reflux condenser was allowed to equilibrate at 25° C. The reactor was charged with 21.63 grams of methylene chloride, 3.02 grams of polyethylene glycol monomethyl ether 350 mw (8.64 mmol OH), and 0.48 grams of boron trifluoride tetrahydrofuran complex (3.45 mmol). The reaction mixture was allowed to stir for 30 minutes. A solution containing ZOX monomer (100 grams, 172.71 mmol), heloxy 7 (1.97 grams, 8.64 mmol), and 100 ml of benzotrifluoride was added over 30 minutes. The temperature reached 26.6° C. after a 10 minute induction period. The temperature reached a maximum of 30.6° C. The reaction was allowed to stir for 4 hours. Additional methylene chloride was added (82.42 grams) and the solution was then washed with 100 ml 5% sodium bicarbonate and 100 ml water to remove the boron trifluoride tetrahydrofuran complex. The solution was then dried with magnesium sulfate, and the solvent was removed. Poly-Mixed-FOX-THF (DP20)-Polyethylene Oxide diblock copolymer DP 19.55 (77.8 grams) was isolated.

251; or 5,663,289; which are hereby fully incorporated by reference. The polyfluorooxetane if polymerized utilizing a monoalcohol will only have one terminal hydroxyl group (MOX) as in formulas 5A and 5B hereby fully incorporated by reference, whereas if polymerized utilizing a diol or glycol initiator will have two terminal hydroxyl groups (FOX) see formulas 3A and 3B, also as set forth herein and fully incorporated by reference. In either event, the repeat unit of the polymer will have the structure as set forth in formulas 2AA and 2BB as follows:

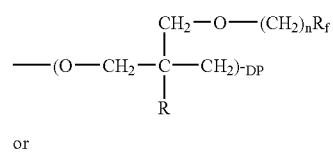

2AA or

-continued

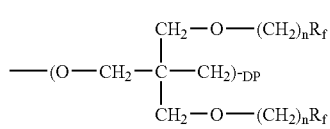
2BB wherein n and R are as set forth therein, wherein each $R_f$ within the polymer can be the same or different and independently is linear or branched, unsaturated or preferably a saturated alkyl group having from 1 to about 20 carbon atoms with from about 1 to about 5, 7 or 9 carbon atoms being preferred with a minimum 25, 50, 75, 80, 85, 90 or 95 percent, or preferably perfluorinated i.e. 100 percent of the H atoms of said $R_f$ being replaced by F, and optionally up to all of the remaining H atoms being replaced by I, Cl or Br. When the polyfluorooxetane is made from a glycol or diol initiator, or a monoalcohol initiator, the DP is generally from about 2 or about 3 to about 50 or about 100, and desirably from about 4 or about 5 to about 20 or about 30. The polymerization of the fluorooxetane monomers, as noted above, is generally carried out in a catalyst such as a boron trifluoride tetrahydrofuran complex in the presence of a halogen solvent. When $BF_3$-THF is utilized, a small amount of the tetrahydrofuran is incorporated into the FOX or MOX oligomer, or polymer such as a copolymer is formed wherein from about 0.1% to about 10% or about 25% by weight and desirably from about 0.1% to about 6% by weight is the tetrahydrofuran. The reaction temperature is generally from about 15° C. or 20° C. to about 70° C. or 80° C. and preferably from about 35° C. to about 45° C.

The polyisocyanate can generally contain from 2 to about 4 isocyanate groups with two groups, that is diisocyanate being highly preferred. The various polyisocyanates have the formula R—(NCO)$_n$ wherein n is 2, 3 or 4 with 2 being preferred and R is an aliphatic having from 4 to about 25 carbon atoms, or an aromatic, or an alkyl substituted aromatic, etc. having a total of 6 to about 30 carbon atoms. Specific examples of suitable diisocyanates include hexamethylene diisocyanate (HDI), isophorone diisocyanate (IPDI) preferred, methylene diphenylisocyanate (MDI), polymeric MDI, toluene diisocyanate (TDI), polymeric HDI, cyclohexylene-1,4-diisocynate, 2,2,4-trimethylhexmethylene diisocyanate, and the like. The equivalent ratio of the total isocyanate groups to the total hydroxyl end group(s) of the polyfluorooxetane is generally about 2.0, that is from about 1.9 to about 2.15 and preferably from about 2.0 to 2.05. The reaction between the diisocyanate and the hydroxyl terminated polyfluorooxetane polymer is generally carried out in the presence of a isocyanate catalyst at a reaction temperature of from about 45° C. to about 85° C. and preferably from about 55° C. to about 75° C. Examples of suitable tin catalysts include dibutyltin dilaurate, stannous octoate, and the like. Due to the essentially 2 to 1 equivalent ratio of diisocyanate to hydroxyl end groups, each terminal hydroxyl end group of the polyFOX or MOX polymer will react with a diisocyanate and form a urethane linkage and thus leave a free isocyanate end group. The reaction is desirably carried out in the absence of any solvent or water.

Various hydroxyl terminated polyethers are then reacted with the isocyanate terminated FOX or MOX polymer at the same reaction conditions as set forth in the preceding paragraph. The various polyethers are added all at once so that a block copolymer is formed rather than to permit the polyether to act as a chain extender. The amount of polyether added is generally an equivalent weight ratio of 2 based upon each free isocyanate end groups so that a great majority of the isocyanate end groups react with a polyether and form a block copolymer having a hydroxyl end group. If the polyfluorooxetane polymer has 2 hydroxyl end groups, an ABA block copolymer will be formed. If the polyfluorooxetane polymer has only 1 hydroxyl end group, then a BA block copolymer will be formed where B is the polyfluorooxetane polymer and A is the polyether polymer. In either event, the blocks will be connected by a diisocyanate group and hence by a urethane linkage.

The hydroxyl terminated polyethers contain repeat units having from 2 to about 6 and desirably from 2 to about 3 carbon atoms such as polyethylene oxide, polypropylene oxide, polybutylene oxide, and the like. The polyether can either have one or two hydroxyl end groups. The number average molecular weight of various polyethers is generally from about 200 to about 5,000 with from about 350 to about 1,000 or 2,000 being preferred.

Alternatively, a polyether block copolymer as set forth above having either 1 or 2 hydroxyl end groups can be reacted with an excess of a polyisocyanate such as a diisocyanate. In other words, the reaction conditions including temperature, the excess amount of the polyisocyanate, and the like are the same as set forth herein immediately above and is hereby fully incorporated by reference. Once the polyisocyanate has been reacted with the polyether thereby forming a urethane linkage and at least one free isocyanate end group, the remaining end group is reacted with a polyfluorooxetane block copolymer which can be an oligomer, a polymer, or a copolymer as noted hereinabove and fully incorporated by reference. The reaction conditions are generally the same as set forth hereinabove and are hereby fully incorporated by reference. In this scenario, if the polyether has two hydroxyl end groups, a BAB block copolymer will be formed. If the polyether block copolymer has only one hydroxyl end group, then an AB block copolymer will be formed. In either event, the blocks will be connected by a polyisocyanate group and hence by a urethane linkage.

The polyfluorooxetane-urethane polyether block copolymers have very low surface tension and serve as useful flow, or leveling, or wetting agents as for use with solutions such as aqueous systems, dispersions, or emulsions, or preferably solvent polymer solutions. Suitable aqueous soluble, dispersible, or emulsifiable polymers include various polyesters, various polyurethanes, various polyethers, various polyesters, various polyacetates, various polyacrylics or polyacrylates, or fluorine containing polymers and the like. Suitable solvent polymers include various polyesters, various polyacrylates, various polyurethanes, various alkyds, various epoxies, or various fluorine containing polymers, and the like. When utilized, the amount of the flow, or leveling, or wetting agent is generally from about 0.001, or about 0.1, to about 1.0, or about 2.0, or about 5.0 parts, and preferably from about 0.25 to about 0.5 parts by weight for every 100 parts by weight of the solvent soluble polymer. With regard to water soluble polymers, the amount of the polyfluorooxetane-polyether block copolymer additive is generally from 0.0005 or from about 0.005 to about 0.1, or about 0.5, or about 1.0, or about 3.0, or about 5.0 parts and desirably from about 0.01 to about 0.025 parts by weight for every 100 parts by weight of the water soluble or water dispersible polymers.

The invention will be better understood by reference to the following examples which serve to illustrate, but not to limit the present invention.

EXAMPLE 1

Synthesis of Poly-5-MOX-Diiso-Polyethylene Oxide Ether

| | | BLOCK COPOLYMER - BA | | | | | |
|---|---|---|---|---|---|---|---|
| Compound | Scale | Ratio | Weight G | Functional equivalent weight | mMoles | δ | ml |
| poly-5-MOX | 850.0 | 1.0 | 850.000 | 1973.32 | 430.75 | 1.200 | 708.3 |
| T12 | | 0.0 | 0.731 | 631.55 | 1.16 | 1.066 | 0.7 |
| Isophorone diisocyanate | | 0.115371 | 98.065 | 111.60 | 878.72 | 1.049 | 93.5 |
| PEO-400 | | 0.210812 | 179.190 | 200.00 | 895.95 | 1.011 | 177.2 |
| T12 | | 0.00068 | 0.578 | 631.55 | 0.92 | 1.066 | 0.5 |
| FOX DP | 8 | | | | | | |
| expected yield grams | 1128.565 | | | | | | |
| expected yield, pounds | 2.483 | | | | | | |
| expected volume, l | 0.980 | | | | | | |
| expected volume, gal | 0.259 | | | | | | |
| theoretical isocyanate titration value, mmol/g | 0.472 | | | | | | |
| actual Isocyanate value | 0.483 | | | | | | |

| | grams | Lbs | 2 incr., lbs | 3 incr., lbs | 4 incr., lbs | 5 incr, lbs |
|---|---|---|---|---|---|---|
| Increment size: | 106.25 | 0.23375 | | | | |
| Charge weight: | 204.32 | 0.449494 | 0.683244 | 0.916993863 | 1.1507439 | 1.384494 |

To a two liter 3-necked roundbottomed flask equipped with a mechanical stirrer, addition funnel, temperature probe and control, and heating mantle, isophorone diisocyanate (98.07 grams, 878.7 mmol isocyanate) was added. Monofunctional poly-5-MOX DP 8 (850 grams, 430.75 mmol OH) and 0.7 grams of T12 catalyst (dibytyl tin dilaurate) was added over 90 minutes maintaining a temperature of 65° C. The reaction was allowed to stir for 1 hour and a sample was removed for isocyanate titration. An isocyanate value of 0.472 mmol of isocyanate per gram of material was predicted based on the charge, and a value of 0.483 mmol of isocyanate per gram was found. PEO-400 was added in one portion (179.19 grams, 895.95 mmol OH). The reaction was allowed to stir for 2 hours, when all the isocyanate had disappeared by IR.

EXAMPLE 2

Synthesis of Poly-5-FOX-Diiso-Polyethylene Oxide Ether

| | | Block Copolymer - ABA | | | | | |
|---|---|---|---|---|---|---|---|
| Compound | Scale | Ratio | Weight G | Functional equivalent weight | mMoles | δ | ml |
| Poly-5-FOX | 75.0 | 1.0 | 75.000 | 1140.92 | 65.74 | 1.200 | 62.5 |
| T12 | | 0.0 | 0.065 | 631.55 | 0.10 | 1.066 | 0.1 |
| Isophorone diisocyanate | | | 14.966 | 111.60 | 134.10 | 1.049 | 14.3 |
| PEO-400 | | 0.364618 | 27.346 | 200.00 | 136.73 | 1.011 | 27.0 |
| T12 | | 0.00068 | 0.051 | 631.55 | 0.08 | 1.066 | 0.0 |
| FOX OP | 9.3 | | | | | | |
| expected yield grams | 117.428 | | | | | | |
| expected yield, pounds | 0.258 | | | | | | |
| expected volume, l | 0.104 | | | | | | |
| expected volume, gal | 0.027 | | | | | | |
| theoretical isocyanate titration value, mmol/g | 0.759 | | | | | | |
| actual Isocyanate value | 0.424 | | | | | | |

| | grams | Lbs | 2 incr., lbs | 3 incr., lbs | 4 incr., lbs | 5 incr., lbs |
|---|---|---|---|---|---|---|
| Increment size: | 9.375 | 0.020625 | | | | |
| Charge weight: | 24.34 | 0.05355 | 0.074175 | 0.094799826 | 0.115425 | 0.13605 |

To a 250 milliliter 3-necked roundbottomed flask equipped with a mechanical stirrer, addition funnel, temperature probe and control, and heating mantle, isophorone diisocyanate (14.97 grams, 134.1 mmol isocyanate) was added. Difunctional poly-5-FOX DP 8 (75 grams, 65.74 mmol OH) and 0.065 grams of T12 catalyst was added over 90 minutes maintaining a temperature of 65° C. The reaction was allowed to stir for 1 hour and a sample was removed for isocyanate titration. An isocyanate value of 0.472 mmol of isocyanate per gram of material was predicted based on the charge, and a value of 0.483 mmol of isocyanate per gram was found. PEO-400 was added in one portion (27.36 grams, 136.73 mmol OH). The reaction was allowed to stir for 2 hours, when all the isocyanate had disappeared by IR.

Comparative coating cratering data was obtained as set forth in Example 3 containing a control, a 3M nonionic fluorosurfactant, a DuPont nonionic fluorosurfactant, and a Poly-5-Fox-diiso-polyethylene oxide ether, i.e. an ABA block copolymer similar to that set forth in Example 1. The coating is a solvent based nitrocellulose which has been applied as a drawdown on Leneta paper.

EXAMPLE 3

| Compound | Coating Comments |
| --- | --- |
| 3M Nonionic fluorosurfactants | |
| FC-430 (1000 ppm) | poor leveling, small bubbles |
| FC-430 (2500 ppm) | defects in coating |
| FC-430 (5000 ppm) | small bubbles |
| FC-430 (7500 ppm) | nice coating |
| DuPont nonionic fluorosurfactant | |
| ZONYL FSO (1000 ppm) | some coating contraction, some dewetting |
| ZONYL FSO (2500 ppm) | some coating contraction, some dewetting |
| ZONYL FSO (5000 ppm) | nice coating |
| ZONYL FSO (7500 ppm) | nice coating, glossy |
| ABA Poly-5-Fox-diiso-polyethylene oxide ether | |
| Poly Fox VYK (1000 ppm) | small bubbles, good flow |
| Poly Fox VYK (2500 ppm) | adequate leveling |
| Poly Fox VYK (5000 ppm) | Excellent Coating |
| Poly Fox VYK (7500 ppm) | Excellent Coating |

As apparent from the above, the block copolymers of the present invention generally achieve better, that is less cratering and better coatings than the 3M material or the DuPont material. The 3M and DuPont fluorosurfactants are state of the art and are commercially available.

Esterified Fluorooxetane Oligomers, Polymers, or Coopolymers

The direct reaction of a saturated or an unsaturated acid with a hydroxyl group of a fluorooxetane oligomer, polymer, or copolymer (as set forth herein and fully incorporated by reference), will yield an ester linking group between the oligomer, polymer, or copolymer, and the acid hydrocarbon chain. Such ester end group containing compounds serve as effective flow, or leveling, or wetting agents, generally for solvent compositions containing various types of polymers therein. The fluorinated oxetane oligomer, polymer, or copolymer, can be a variety of different compounds, such as those which are dihydroxyl, that is contain two hydroxyl end groups as described herein, for example, polyhydroxylfluorooxetanes (FOX), or those which contain only one hydroxyl end group, i.e., monohydroxylfluorooxetanes (MOX). Moreover, such compounds can be copolymers when made from oxetane monomers and various cyclic ether monomers such as tetrahydrofuran.

The various fluorooxetane oligomers, polymers, or copolymers will have the repeat unit as set forth in formulas 2AA and 2BB as set forth herein wherein n, R, $R_f$ are as set forth and fully incorporated by reference. Regardless of whether the oligomer, polymer, or copolymer is FOX or MOX, the repeat unit is the same. However, when the end oligomer, polymer, or copolymer is FOX, it will have the formula as set forth in formulas 3A and 3B hereinabove, wherein n is from 1 to about 6 and: preferably from 1 to about: 3, wherein R is hydrogen or an alkyl having from 1 to 6 carbon atoms and preferably methyl or ethyl and $R_f$ is a linear or branched alkyl group having from 1 to about 110, or about 15, or about 20 carbon atoms and preferably from about 1 to about 4 or about 7 carbon atoms. Such groups may be perfluorinated as set forth herein above or they may contain at least 50% or 75%, desirably 85%, 90% or 95% of the hydrogen atoms replaced by the fluorine atoms. The degree of polymerization (DP) for both FOX and MOX is from 2 or about 3 to about 50 or about 100, desirably from about 4 to about 25 or about 30, and preferably from about 5 or about 8 to about 12, or about 15, or about 20. Regardless of whether the end compound is polyhydroxyl terminated (FOX) or monohydroxyl terminated (MOX) the $R_f$ pendant groups of the oxetane oligomer, polymer, or copolymer, or block copolymer, can generally all be the same or be two or more different groups as described herein. That is, each $R_f$ can be the same such as for example a $C_8F_{17}$ group, or two more different groups within the same entity such as a $C_8F_{17}$ and a $C_{10}F_{21}$ end group, etc., and the like, and generally have a large number of carbon atoms such as from about 6 or about 8 to about 18 or about 20 carbon atoms, and more desirably from 1.0 to about 16 carbon atoms.

While the carboxylic acids can be poly or dicarboxylic acids having from 2 to 10 carbon atoms, monocarboxylic acids are preferred. Saturated carboxylic acids can be utilized which contain from 1 to about 20 carbon atoms with from about 6 to about 10 carbon atoms preferred. Such acids are well known to the art and include butanoic acid, pentanoic acid, hexanoic acid, octanoic acid, decanoic acid, dodecanoic acid, tetradecanoic acid, hexadecanoic acid, octadecanoic acid, and the like. The unsaturated acids are preferred and generally contain from about 2 to about 24 carbon atoms, desirably from about 10 to about 22 carbon atoms, and preferably are the unsaturated fatty acids containing from about 16 to about 20 carbon atoms. Such unsaturated acids generally have from 1 to about 4 and desirably from 1 to about 3 unsaturated groups or double bonds. Examples of such unsaturated acids which contain a total of 18 carbon atoms include oleic acid, linoleic acid, linolenic acid, and eleostearic acid. Arachidonic acid contains a total of 20 carbon atoms and 4 double bonds therein.

Other suitable carboxylic acids include the various lactones, i.e. internal esters, having from 4 to 10 carbon atoms with 6, i.e. caprolactone being preferred.

The reaction between the fluorooxetane oligomer, polymer, or copolymer containing the same or mixed pendant $R_f$ groups and 1 or 2 hydroxyl end groups with the one or more acids such as unsaturated acids is generally carried out at elevated temperatures in the presence of a suitable esterification catalyst known to the art and to the literature such as a weak inorganic acid, for example phosphorous acid. Other esterification catalysts include titanium based tetrabutyl titanates. The reaction temperature is generally from about 100° C. to about 200° C. and preferably from about 125° C. to about 175° C. The amount of the esterification catalyst is generally very low as for example from about 0.01 to about 0.1, or about 0.3, or about 0.5 parts by weight per every 100 parts by weight of the fluorooxetane oligomer, polymer, or copolymer. In order to ensure substantial or complete reaction, the amount of the carboxylic acid or lactone is generally an equivalent excess based upon each hydroxyl end group such as from about 1.0 to about 1.5. The net result is that the carboxylic acid group of the acid reacts with the hydroxyl end group of the fluorooxetane oligomer, polymer, or copolymer and through a condensation reaction forms an ester linkage with the hydrocarbon portion of the acid extending therefrom. In other words, a single carboxylic acid reacts with each hydroxyl end group of the fluorooxetane oligomer, polymer or copolymer. Such compounds serve as flow, wetting, or leveling agents in solutions in as much as they generally reduce the surface tension of compositions, especially solvent based polymer compositions such as various polyacrylates, various polyurethanes, various epoxies, fluorine containing polymers, and various polyesters, and especially alkyd resins. Alkyd resins are desirably used in various solvent based paints as architectural coatings. The solvents for such compositions are generally hydrocarbons such as mineral oil, used in architectural coatings and the like. A preferred end use of the immediately above-described flow, wetting, or leveling agents is for alkyd-based paints, and the like.

The invention will be better understood by reference to the following example which serves to illustrate, but not to limit the present invention.

The reagents were charged to a one liter 3-necked round bottomed flask equipped with a condenser, mechanical stirrer, nitrogen inlet and outlet, temperature probe, and a heating mantle. The reaction mixture was heated to 150° C., and allowed to stir for 100 hours. Conversion was determined to be 70% using NMR analysis. An additional 0.33 g 70% phosphorous acid was added, and the reaction was heated to 150° C., and allowed to stir for 52 hours. Final conversion was determined to be 80% using NMR analysis.

TABLE 2

| Ingredient | Scale | Ratio | MW | Weight, grams | Moles |
|---|---|---|---|---|---|
| | 400 | | | | |
| pamolyn 200 | | 0.897 | 296.82 | 72.39906 | 0.243916 |
| Poly-3-FOX | | 1 | 1471 | 400 | 0.271924 |
| H3PO3, 70% | | 0.0121 | 82 | 0.385433 | 0.00329 |

A 500 ml 3-necked round bottomed flask was equipped with a heating mantle. Temperature probe, mechanical stirrer, dean stark trap, nitrogen inlet and outlet, and reflux condenser. The reactor was charged with 400 grams poly-3-fox DP 15.5 (0.271 moles OH), Pamolyn 200 (72.4 grams, 0.243 moles) and 0.38 grams 70% phosphorous acid. The reaction was degassed with a slow nitrogen purge, then was heated to 150° C. for 96 hours. NMR analysis confirmed 90% conversion of the OH groups. The yield was 426.1 grams.

TABLE 3

| Substance | Scale (g) | Ratio | Quantity (g) | MW | Eq | mmoles | δ | ml |
|---|---|---|---|---|---|---|---|---|
| Fox L Monomer fa-8* | 150 | 1 | 150.00 | 545.22 | 6.0 | 275.12 | 1.5 | 100.0 |
| Trifluoroethanol, solvent | | 0.526805 | 79.02 | 100.04 | 17.23 | 789.89 | 1.185 | 66.7 |
| Trifluoroethanol, intiator | | 0.03058 | 4.59 | 100.04 | 1.00 | 45.85 | 1.19 | 3.9 |
| BF$_3$.THF, catalyst | | 0.017106 | 2.57 | 139.9 | 0.40 | 18.34 | 1.1 | 2.3 |
| Methylene chloride solvent | | 0.2005 | 30.08 | 84.93 | 7.72 | 354.12 | 1.35 | 22.3 |
| Methylene chloride wash solvent | | 0.5 | 75.00 | 84.93 | 19.26 | 8.83E+02 | 1.35 | 55.55556 |
| Quench (5% NaHCO3) | | 0.85 | 127.50 | 18.01 | 154.40 | 7.08E+03 | 1.00 | 127.5 |
| Wash (water) | | 0.85 | 127.50 | 18.01 | 154.40 | 7.08E+03 | 1.00 | 127.5 |
| Theoretical Yield | 155.9094 | | | | | | | |
| Expected yield, Low | 140.3184 | | | | | | | |
| Expected yield, High | 148.1139 | | | | | | | |
| Solids loading, % | 59.02486 | | | | | | | |
| Max wt % BF3THF (incorporated as THF) | 1.645764 | | | | | | | |
| Initial Volume | 195.2 | | | | | | | |
| volume after Quench | 378.2 | | | | | | | |
| volume after Wash | 378.2 | | | | | | | |

*97% $R_f$ = $C_8F_{17}$ and 3% $R_f$ = $C_{10}F_{21}$

TABLE 1

| Ingredient | Ratio | MW | Weight, Grams | Moles |
|---|---|---|---|---|
| Pamolyn 200* | 1 | 296.82 | 69.71533 | 0.234874 |
| Poly(3FOX(90%)-Co-L FOX (10%)) | 1 | 2128.80 | 500. | 0.234814 |
| H$_3$PO$_3$, 70% | 0.121 | 82 | 0.332917 | 0.002842 |

*Pamolyn 200 is a mixture of oleic acid and linoleic acid.
FOX L is a mixture of fluorooxetane monomers wherein $R_f$ is approximately 50% of $C_8F_{17}$, approximately 25% of $C_{10}F_{21}$, and approximately 25% of $C_{12}F_{25}$ and higher compounds.

A 500 ml 3-necked round bottomed flask was equipped with a magnetic stirrer, reflux condenser, temperature probe, and addition funnel. 30.08 grams of methylene chloride was added, followed by trifluoroethanol initiator (4.59 grams, 45.85 mmoles), and BF$_3$THF (2.57 grams, 18.34 mmoles). The reaction mixture was allowed to equilibrate at 25° C. for 30 minutes. A solution of zox monomer (150 grams, 275.12 mmoles) in trifluoroethanol (79.02 grams, 789.89 mmoles) was added over 1 hour. A maximum temperature of 36° C. was observed. After 4 hours, 75 grams of methylene chloride was added, and the reaction was washed with 127.5 ml 5% sodium bicarbonate, and 127.5 ml water. The organic phase was dried, and the solvent was removed under reduced pressure, and the Degree of polymerization was measured by NMR. A DP of 4.8 was observed.

TABLE 4

| Substance | Scale (g) | Quantity (g) | MW | Eq | mmoles | density | ml |
|---|---|---|---|---|---|---|---|
| PolyFOX L fa-8* | 50 | 50 | 2716.04 | 1 | 18.41 | 1.7 | 29.41 |
| tyzor TBT | | 0.025 | 631.56 | | 3.96E−05 | 1.066 | 0.02 |
| Heptane | | 5 | 100.21 | 2.71 | 49.90 | 0.684 | 7.31 |
| Stearic acid | | 5.24 | 284.48 | 1 | 18.41 | 0.845 | 6.20 |

*polymer from Table 3

A 100 mL 3-necked round bottomed flask was equipped with a magnetic stirrer, temperature probe, dean stark trap, and reflux condenser. 50 grams of PolyFOX L c80-56 dp 4.8 was added, then 0.025 grams of Tyzor TBT (dupont), 5 grams of heptane, and 5.24 grams stearic acid. The reaction mixture was allowed to heat to 192° C. over 3 hours and 35 minutes. The reaction was continued for 10 hours, then the temperature was increased to 220° C. for 2 hours, then NMR was performed. NMR confirmed the reaction was complete.

Various types of flow and wetting agents were added to an acrylic modified alkyd resin obtained from Akron Paint and Varnish of Akron, Ohio and the results thereof are set forth in Table 5. The nonionic fluorosurfactant from 3M was FC-430. The ethoxylated nonionic fluorosurfactant from DuPont was Zonyl FSO. The PolyFOX-TJ is essentially that as set forth in Table 2 hereinabove whereas PolyFOX TLJ is essentially that set forth in Table 1 hereinabove.

TABLE 5

| Compound | 85° Gloss | SAG* Resistance | Leveling** | Comments |
|---|---|---|---|---|
| Control | 20 | 7 | 11 | Poor wetting, many bubbles with haze; spotty gloss variations |
| 3M Nonionic Fluorosurfactants | | | | |
| FC-430 (1000 ppm) | 30 | 6 | 5 | Defects; A wide variation in gloss, Haze |
| FC-430 (2500 ppm) | 33 | 5 | 6 | A couple of defects |
| FC-430 (5000 ppm) | 30 | 8 | 6 | Nice coating |
| FC-430 (7500 ppm) | 30 | 10 | 6 | Nice coating |
| DuPont Ethylated Nonionic Fluorosurfactant | | | | |
| ZONYL FSO (1000 ppm | 45 | 11 | 8 | Crystals |
| ZONYL FSO (2500 ppm) | 30 | 11 | 9 | Many large craters |
| ZONYL FSO (5000 ppm) | 23 | 11 | 9 | Some craters |
| ZONYL FSO (7500 ppm) | 12.5 | 11 | 7 | Bernard Cells |
| PolyFOX-TJ | | | | |
| PolyFox TJ (1000 ppm) | 23 | 2 | 6 | |
| PolyFox TJ (2500 ppm) | 25 | 5 | 6 | Nice coating, slightly better than control |
| PolyFox TJ (5000 ppm) | 29 | 7 | 9 | Nice coating, better distinctness of image |
| PolyFox TJ (7500 ppm) | 24 | 7 | 7 | Nice Coating |
| PolyFOX-TLJ | | | | |
| PolyFOX TLJ (1000 ppm) | 23 | 13 | 7 | a few defects from bubbles or incomplete wetting of dust contaminates |
| PolyFOX TLJ (2500 ppm) | 70 | 9 | 6 | Beautiful coating but has couple of bubble defects |
| PolyFOX TLJ (5000 ppm) | 68 | 10 | 6 | Nice coating |
| PolyFOX TLJ (7500 ppm) | 68 | 8 | 6 | nice coating, superior distinctness of image |

*ASTM D 4440
**NYPS leveling test blade method, Gardner Company

As apparent from the above table, the fluorinated polyoxetane unsaturated acid esterficiation products, TLJ and TJ, improved coating appearance. TLJ improved 85 degree gloss in particular, and both TJ and TLJ improved the general appearance of the coating.

TABLE 6

Synthesis of polyfox acrylate from acryloyl chloride

| Compound | Scale | Weight G | Functional equivalent weight | mMoles | density | ml |
|---|---|---|---|---|---|---|
| poly-3-fox | 60.0 | 60.000 | 2575.00 | 23.30 | 1.150 | 52.2 |
| Triethyl Amine | | 3.773 | 101.19 | 37.28 | 0.726 | 5.2 |
| Acryloyl Chloride | | 3.163 | 90.51 | 34.95 | 1.114 | 2.8 |
| Methylene chloride | | 100.00 | 84.93 | 1177.46 | 1.325 | 75.5 |
| 4-methoxy phenol | | 0.06 | 124.14 | 0.50 | 1.131 | 0.1 |
| 10% $H_2SO_4$ Wash | 30 | | | | | |
| 5% $NaHCO_3$ Wash | 30 | | | | | |
| DI water Wash | 30 | | | | | |
| Saturated NaCl Wash | 15 | | | | | |
| expected yield | 167.000 | | | | | |
| expected volume | 154.075 | | | | | |

A 250 mL 3-necked round bottom flask was equipped with a magnetic stirrer, reflux condenser, addition funnel, and temperature probe. Methylene chloride (100 mL), monofunctional poly-3-FOX (2575 hydroxyl equivalent weight, 23.30 mMoles OH), and triethyl amine (3.77 grams, 37.28 mMoles) were added, and the solution was allowed to stir until it was homogeneous. Acryloyl chloride (3.16 grams, 34.95 mMoles) was added dropwise over 10 minutes. A rapid exotherm was observed, and the solution began to reflux. The reaction mixture was allowed to stir at room temperature for 1 hour, then it was heated to reflux for 3 hours. The reaction mixture was allowed to stand overnight. 4-methoxy phenol (0.06 grams) was added, and the reaction mixture was quenched with deionized water, then the organic layer was washed with 30 mL of 10% $H_2SO_4$, 30 mL of 5% sodium bicarbonate, 30 mL of deionized water, and 15 mL saturated sodium chloride. The organic layer was dried, and the solvent was removed. Fox acrylate (48.71) was isolated. Characterization: A14008 NMR: 98% conversion of OH groups, DP FOX 19.3, dp THF 0.7, MW 3763, 13.6% cyclic tetramer. GPC: Mn 1410, Mw 3040, Mw/Mn 2.16.

Anionic Functionalized Polyfluorooxetanes

The polymers such as those made from various cyclic ethers, for example, oxetane, oxirane, or copolymers thereof, with another cyclic ether or with a polyester such as those set forth herein below, often contain a hydroxyl or acid end group. As noted above, such end groups can be covalently bonded to a polar end group such as an anion for example carboxylate, sulfonate, sulfate, phosphate, or nitrate, and an appropriate countercation; or a cation such as ammonium, etc., and an appropriate counteranion; or a nonionic end group, etc. in a manner, e.g. as set forth in any of the different routes noted herein above. For example, sulfuric acid can be added to a hydroxyl end group to convert the same to a sulfate anion. Subsequently, a countercation can be added thereto. The reaction temperature for the anionic reaction is generally from about minus 20° C. to about 50° C. and desirably from about minus 5° C. to about 15° C. whereas the reaction temperature for addition of the counteranion is generally from about 0° C. to abut 60° C. and desirably from about 15° C. to about 40° C.

EXAMPLES A–D

Anionically Functionalized Poly5FOX
Synthesizing Covalently Bonded Anion-Cation Terminated Polyoxetanes The poly diol poly(3-pentafluoropropoxymethyl-3-methyloxetane) (200.0 g, HEW 860.6, 0.2325 mole OH, 1.0 eq) and solvent (tetrahydrofuran) 200.0 g were introduced into a flask at 50 wt % solids and allowed to stir at 0° C. Fuming sulfuric acid (26.9 g, 0.2866 mole, 1.23 eq) was then dripped into flask at a rate to keep the temperature below 15° C. The reaction was followed by end group analysis which was performed by proton NMR and by an ammonium hydroxide titration to a bromothymol blue endpoint. Once the conversion exceeded 80–85%, the acid ends and excess acid were neutralized by 28 wt % aqueous ammonium hydroxide (31.6 g, 0.2524 mole, 1.1 eq) while maintaining a temperature below 20° C. The solution pH was followed by pH paper or pH meter to a pH of 7–8. The solution was allowed to stir at 0° C. for two hours to allow for complete salt formation. Salts were removed by vacuum filtration. The solution was then subjected to rotating evaporation until all of the solvent and water was removed.

EXAMPLES E–H

Anionically Functionalized Poly3FOX
Synthesizing Covalently Bonded Anion-Cation Terminated Polyoxetanes The poly diol poly(trifluoroethoxymethyl-3-methyloxetane) (3524.0 g, HEW 715.02, 4.93 mole OH, 1.0eq) and solvent (tetrahydrofuran) 200.0 g were introduced into a flask at 50 wt % solids and allowed to stir at 0° C. Fuming sulfuric acid (854.73 g, 9.11 mole, 1.85 eq) was then dripped into flask at a rate to keep the temperature below 15° C. The reaction was followed by end group analysis which was performed by proton NMR and by an ammonium hydroxide titration to a bromothymol blue endpoint. Once the conversion exceeds 80%–85% the acid ends and excess acid was neutralized by 25.2 wt % aqueous ammonium hydroxide (708.23 g, 5.09 mole, 1.03 eq) while maintaining a temperature below 20° C. The solution pH was followed by pH paper or pH meter to a pH of 7–8. The solution was allowed to stir at 0° C. for two hours to allow for complete salt formation. Salts were removed by vacuum filtration. The solution was then subjected to rotating evaporation until all of the solvent and water was removed.

The above-noted polymers were then tested with regard to surface tension in a solution of water or a water-methanol mixture and the results are set forth in Table A.

TABLE A

| Sample | | Wt % Sample | Wt % Added Methanol | Surface Tension (mN/m) |
|---|---|---|---|---|
| A | $(Poly\text{-}5\text{-}FOX)_n(OSO_3)_2(NH_4^+)_2$ | 1 | 0 | 26.2 ± 0.2 |
| B | $(Poly\text{-}5\text{-}FOX)_n(OSO_3)_2(NH_4^+)_2$ | 0.1 | 0 | 26.1 ± 0.2 |
| C | $(Poly\text{-}5\text{-}FOX)_n(OSO_3)_2(NH_4^+)_2$ | 1 | 0.3 | 25.3 ± 0.1 |
| D | $(Poly\text{-}5\text{-}FOX)_n(OSO_3)_2(NH_4^+)_2$ | 0.1 | 0.03 | 26.3 ± 0.2 |
| E | $(Poly\text{-}3\text{-}FOX)_{n'}(OSO_3)_2(NH_4^+)_2$ | 1 | 0 | 28.7 ± 0.1 |
| F | $(Poly\text{-}3\text{-}FOX)_{n'}(OSO_3)_2(NH_4^+)_2$ | 0.1 | 0 | 29.2 ± 0.1 |
| G | $(Poly\text{-}3\text{-}FOX)_{n'}(OSO_3)_2(NH_4^+)_2$ | 1 | 0.3 | 27.3 ± 0.1 |
| H | $(Poly\text{-}3\text{-}FOX)_{n'}(OSO_3)_2(NH_4^+)_2$ | 0.1 | 0.03 | 29.1 ± 0.2 |

$n = 7.0$, $M_w/M_n = 1.55\text{--}1.75$.
$n' = 7.2$, $M_w/M_n = 1.44\text{--}1.65$.

As apparent from Table A, the short $R_f$ carbon atom polyoxetanes containing polar end groups had good surface tension values in water. According to the present invention, at a 0.1% by weight concentration in water of the low carbon atom fluorinated $R_f$-polar polyoxetanes, surface tension values can range from about 15, or about 20, or about 25 to about 30, or about 35, or about 40, or about 45 or 70, and preferably from about 15, or about 20, or about 25 to about 30 or 35 millinewtons/meter.

The polymers of the present invention, which contain a short chain fluorinated $R_f$ group as well as one or more polar groups thereon, such as in Table A can be utilized as a wetting, or flow, or leveling agent. Accordingly, Table B relates to comparative data showing the results of coating experiments where fluorocarbon products can be used to eliminate cratering defects. The performance of $(Poly\text{-}5\text{-}FOX)_n(OSO_3)_2(NH_4^+)_2$ wherein n is approximately 5 to 7 is noted with regard to other commercially available fluorocarbon products.

TABLE B

| Sample | | | Crater Comment |
|---|---|---|---|
| A | $(Poly\text{-}5\text{-}FOX)_n(OSO_3)_2(NH_4^+)_2$ | 75 ppm | no craters |
| B | $(Poly\text{-}5\text{-}FOX)_n(OSO_3)_2(NH_4^+)_2$ | 300 ppm | no craters |
| C | Stahl PUD no additive[1] | | some craters |
| D | FC129[2] | 250 ppm | craters |
| E | Zonyl FSO[3] | 125 ppm | craters |
| F | Zonyl FSO[3] | 250 ppm | small craters |
| G | Zonyl FSO[3] | 500 ppm | small craters |

[1] The PUD is a polyurethane dispersion made by Stahl, U.S.A.
[2] FC129 is an anionic fluorosurfactant produced by 3M
[3] Zonyl FSO is a nonionic fluorosurfactant produced by DuPont As apparent from Table B the surfactant of the present invention yielded no craters meaning that good flow, wetting, and leveling properties were obtained.

EXAMPLE 1

Anionic Functionalized Poly-5-FOX DP 2 Monofunctional

Synthesizing covalently bonded anionic-cationic terminated polyoxetane

| Substance | Scale | Ratio | Quantity (g) | Quantity, Pounds | MW | Eq | moles | δ | ml |
|---|---|---|---|---|---|---|---|---|---|
| poly-5-fox monofunctional | 50 | 1 | 50.00 | | 662.02 | 1 | 0.08 | 1.15 | 43.48 |
| Tetrahydrofuran | | 1 | 50.00 | | 72.11 | 9.18 | 0.69 | 0.71 | 70.82 |
| fuming sulfuric acid | | | 40.31 | | 93.34 | 1.50 | 0.11 | 1.90 | 21.22 |
| aqueous ammonia (concentrated, moles/liter), 30% excess | 14.8 | | 68.28 | | 17.04 | 14.87 | 1.12 | 0.9 | 75.87 |
| Water | | | 42.64 | | | | | | |

1. Charge mono-ol and THF to a 500 ml jacketed reactor with paddle stirrer, thermometer and addition funnel.
2. Cool with chiller bath to −5 c.
3. Slowly add fuming sulfuric acid via addition funnel, keeping the temperature range of −5 c. to 15 c.
4. Once all of the acid is in let stir 15 minutes.
5. Check conversion of alcohol to sulfate by NMR, 400 MHz in CDCl3. Continue to add acid until conversion is >98% conversion of the alcohol.
6. Set up a 1 liter jacketed reactor with paddle stirrer, thermometer and addition funnel.
7. Charge ammonium hydroxide to the 1 liter reactor and cool to −5 C.
8. Slowly add the sulfate solution to the ammonium hydroxide keeping the temperature range of −5 c. to 40 c.
9. A white salt ppt will form.
10. Once all of the sulfate solution is in, check the pH of the 1-liter reactor. Range pH = 9–10.
11. Add water to dissolve salts.
12. Phase separate and keep to product in the top organic THF solution and discard the aqueous bottom phase.
13. This product can be stripped of THF later and formulated as needed.

EXAMPLE 2

Anionic Functionalized Poly9FOX

Synthesizing Covalently Bonded Anion-Cation Terminated Polyoxetane

The following ingredients were utilized

| Substance | Quantity (g) | MW | Eq | moles | Density | ml |
|---|---|---|---|---|---|---|
| (Poly-9-FOX) | 1600.00 | 761.87 | 1 | 2.10 | 1.15 | 1391.30 |
| Tetrahydrofuran | 1600.00 | 72.11 | 10.57 | 22.19 | 0.71 | 2266.29 |
| Fuming sulfuric acid | 1120.90 | 93.34 | 1.50 | 3.15 | 1.90 | 589.95 |
| Aqueous ammonia, 14.8 M, 30% excess | 1898.71 | 17.04 | 14.87 | 31.22 | 0.9 | 2109.68 |
| Total acid equivalents | 5.718 | | | | | |
| weight % ammonia used | 25.20% | | | | | |
| Percentage SO3 in oleum | 22.50% | | | | | |
| Theoretical polymer yield | 1803.90 | Moles SO$_3$ | 0.63 | | | |
| Expected yield, High | 1713.7041 | NaHCO$_3$ required to neutralize all SO3 | 52.93 | | | |
| Expected Mn | 1717.91 | | | | | |

| | mL | Gallons |
|---|---|---|
| volume, reaction | 4247.54 | 1.12 |
| volume, ammonia neutralization | 6357.22 | 1.67830 |
| Ammonia concentration, moles/liter | 14.8 | |
| DP of polyol | 4.1 | |

9-fox dp 4.1 (1600 grams, hydroxyl equivalent weight= 761.9 grams per mol OH, 2.1 Mol OH) was dissolved in 1600 g tetrahydrofuran (50% solids). The solution was cooled to −5° C. Fuming sulfuric acid 20% was added over 1 hour (1120.9 grams, average MW=93.35, 3.15 Mol SO$_3$, 1.5 equivalents SO$_3$, 5.7 equivalents acid). The exotherm did not exceed 15° C. Upon completion of addition, the exotherm subsided to a temperature of 6–8° C. an additional 1050 grams of THF was added to keep the product in solution. Proton NMR indicated 99% conversion. The solution was cooled to −6° C., and the acidic solution was added to concentrated aqueous ammonia (1898.71 G, 31.22 Mol Ammonia), and 1200 grams deionized water maintaining a solution temperature below 46° C. Separate and remove the aqueous phase and Transfer THF/fox NM solution to distillation pot. Aqueous 5% NaHCO$_3$ (486.77 grams, 1.5% based on theoretical NM amount) was added to the solution. The THF/water solvent was removed from the product under reduced pressure, keeping the temperature below 47° C. pH was 9–12. The THF distillation was stopped when THF content was less than 0.22 weight percent. Butyl carbitol (1165 grams, 21.55 weight percent), Methanol (1171 grams, 21.66 weight percent) and water (1437 grams, 26.59 weight percent) was added, and the mixture was allowed to stir for 15 minutes.

EXAMPLE 2

Ionic Functionalized Poly-9-MOX

| Synthesizing covalently bonded anion-cation terminated polyoxetane | | | | | | |
|---|---|---|---|---|---|---|
| Substance | Quantity (g) | MW | Eq | moles | Density | ml |
| poly-9-fox monofunctional | 20.00 | 1388.42 | 1 | 0.01 | 1.15 | 17.39 |
| sulfamic acid | 10.20 | 97.07 | 7.29 | 0.11 | 1.90 | 5.37 |
| Pyridine | 8.31 | 79.10 | 7.29 | 0.11 | 0.978 | 8.49 |
| Tetrahydrofuran | 20.00 | 72.11 | 19.25 | 0.28 | 0.71 | 28.33 |
| aqueous ammonia (concentrated) | 25.55 | 17.04 | 29.17 | 0.42 | 0.9 | 28.39 |

| | mL |
|---|---|
| volume, reaction | 51.09 |
| Ammonia concentration, moles/liter | 14.8 |

A 125 ml jacketed 3-necked flask was equipped with a reflux condenser, mechanical stirrer, and temperature probe. Poly-9-FOX polyol (20 g, 14.4 mMoles OH), and sulfamic acid (10.2 grams, 105.1 mMoles) were added, and the reaction was allowed to heat up to 90° C. Pyridine was added (8.30 grams, 0.1051 mMoles). The reaction mixture was allowed to stir for 4 hours at 90° C. The reaction was cooled to 25° C., and 20 grams of THF was added. Concentrated aqueous ammonia was added (25.55 grams, 0.42 moles), and the solution was filtered. The solvent was removed and 24.4 grams of Poly-9-FOX ammonium sulfate was isolated.

Cationic Functionalized Polyfluorooxetanes

In a manner similar to that set forth herein above, various cations can be directly covalently bonded to fluorooxetane oligomers, polymers, or copolymers (mono or polyhydroxyl terminated); or bonded to block copolymers (mono or poly hydroxyl terminated) derived from polymerizing fluorooxetane monomers onto an alkylene oxide initiator oligomer, polymer or copolymer, or from polymerizing alkylene oxide monomers onto a fluorooxetane oligomer, polymer, or copolymer. The manner of preparation of such fluorooxetane oligomers, polymers, copolymers (e.g. made with a cyclic ether monomer such as tetrahydrofuran), or block copolymers, is described elsewhere within this specification and is hereby fully incorporated. Thus, repeat units of the fluorooxetane monohydroxyl or polyhydroxyl terminated oligomers, polymers, or copolymers, or block copolymers of the same with a polyether, will have the following repeat units

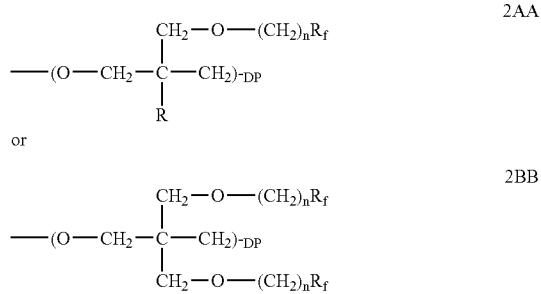

wherein n is from 1 to about 6 and preferably 1 to about 3, wherein R is hydrogen or an alkyl having from 1 to about 6 carbon atoms and preferably is methyl or ethyl, wherein DP is from 2 to about 50 or about 100 and desirably from about 4 to about 15, about 20, or about 30 and $R_f$ is a linear or branched alkyl group having from 1 to about 10, or about 15, or about 20 carbon atoms and preferably from about 1 to about 4 or about 7 carbon atoms. The $R_f$ groups can be perfluorinated as set forth herein above or they can contain at least 50% or 75%, desirably at least about 90% or 95% of the hydrogen atoms replaced by the fluorine atoms. The $R_f$ pendant groups of the oxetane oligomer, polymer, or copolymer, or block copolymer, can generally all be the same or be two or more different groups as described herein. That is, each $R_f$ can be the same such as for example a $C_8F_{17}$ group, or two more different groups within the same entity such as a $C_8F_{17}$ and a $C_{10}F_2$, end group, etc., and the like. When the fluorooxetane oligomer, polymer, or copolymer, or block copolymer contains a mixture of different pendant $R_f$ groups, they generally have a large number of carbon atoms such as from about 6 or about 8 to about 18 or about 20 carbon atoms, and more desirably from 10 to about 16 carbon atoms.

In order to form a cationic group covalently bonded to the hydroxyl end group of a fluorooxetane oligomer, polymer, or copolymer, or block copolymer, etc., initially the hydroxyl group is reacted with a fluorinated hydrocarbyl (e.g. alkyl, aromatic, etc.) sulfonic anhydride. The oligomer, polymer, copolymer, or block copolymer containing a fluorinated hydrocarbyl sulfonic end group thereon is subsequently reacted with a very nucleophilic compound such as a tertiary amine. The end result is a cationic end group covalently bonded through an oxygen atom (of the prior hydroxyl group) to the fluorooxetane oligomer, polymer or copolymer, or block copolymer. Naturally, an anion counter ion is generally associated therewith in an aqueous solution.

The fluorinated hydrocarbyl sulfonic anhydride can generally be represented by the formula

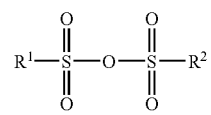

wherein $R^1$ and $R^2$ can be the same or different and are a hydrocarbyl group such as a linear or branched alkyl having from 1 to about 15 carbon atoms and preferably from about 1 to about 5 carbon atoms, or an aromatic, or an alkyl aromatic, etc. have a total of from 6 to about 15 carbon atoms, with a minimum of 50%, desirably at least 75%, and preferably at least 90% or about 95% of the hydrogen atoms replaced with a fluorine atom and preferably is perfluorinated. A preferred fluorinated alkyl sulfonic anhydride is trifluoromethane sulfonic anhydride.

Another compound which can add sulfonyl groups to the hydroxyl terminated oligomer, polymer, copolymer or block copolymer are the various hydrocarbyl sulfonyl halide compounds where in the hydrocarbyl group is an alkyl having from 1 to about 15 carbon atoms or an aromatic, or an alkyl aromatic, etc. having from 6 to about 15 total carbon atoms. A preferred aromatic sulfonyl halide is paratoluene sulfonyl halide.

The reaction temperature of the hydrocarbyl sulfonyl halide or the fluorinated hydrocarbyl sulfonic anhydride such as fluorinated alkyl sulfonic anhydride is generally carried out at a very low temperature, such as from about 0° C. or about minus 15° C. to about minus 30° C. or about minus 40° C. Generally a tertiary amine catalyst can be utilized such as tertiary amines wherein the alkyl group can be the same or different and is from about 1 to about 5 carbon atoms such as trimethyl amine, triethyl amine, and the like. The mole amount of catalyst utilized is generally from about 1.0 to about 2.0 and desirably from about 1.2 to about 1.7 per mole of hydroxyl end group of the oligomer, polymer, copolymer, or block copolymer. The mole ratio of the sulfur containing compound such as the fluorinated alkyl sulfonic anhydride or paratoluene sulfonyl chloride to the hydroxyl groups of the fluorinated oxetane oligomer, polymer, or copolymer is generally from about 1.20 to about 2.0, and desirably from about 1.40 to about 1.60, so that complete reaction of all hydroxyl end group occurs.

After completion of the reaction, the amine catalyst is neutralized with an acid such as hydrochloric acid and the organic layer is separated. The organic layer is then washed with water and brine to extract excess reaction products and byproducts with the sulfur fluorooxetane oligomer, polymer, or copolymer, or block copolymer being subsequently dried and filtered.

A nucleophilic amine such as a tertiary amine is then added to the above product and reacted therewith at temperatures of from about 0° C. to the reflux temperature of the solvent, desirably from about 0° C. to about 150° C., and preferably from about 20° C. to about 50° C. The reaction product is then filtered to remove any salts, and the solvent is removed such as under reduced pressure. The end product is generally then dissolved in water. Suitable tertiary amines include cyclic amines such as N-methylpiperazine, N-methylpyrrolidone, diazabicyclo(2,2,2)octane (DABCO) and the like. Also, various branched tertiary amines can be utilized containing an alkyl group having from 1 to 4 carbon atoms wherein the various alkyl groups can be the same or different. Examples of such tertiary amines include trimethyl amine, triethyl amine, tripropyl amine, and the like.

The end result is a fluorooxetane oligomer, polymer, or copolymer, or block copolymer having an $NR^{4+}$ group covalently bonded to the oxygen atom of the previous existing hydroxyl end group. $R^4$ is a hydrogen, alkyl, aromatic, or combinations thereof having a total of from 1 to 12 carbon atoms with an alkyl including cyclic alkyl compounds having from 1 to 6 carbon atoms being preferred. In a similar manner other cations can be added to the fluorinated oxetane compound be it ammonium, phosphonium, and the like. The preferred compound containing a cation end group is the above noted block copolymer of a fluorooxetane oligomer, polymer, or copolymer having at least one polyether block copolymer bonded thereto, or to the above noted polyether block copolymer having at least one fluorooxetane oligomer, polymer or copolymer block bonded thereto. Such compounds serve as flow, wetting, or leveling agents for polymers in various aqueous solutions. Examples of suitable water dispersible, emulsifiable, or water soluble polymers are known to the literature as well as to the art and include polyacetates, various polyacrylates, various polyacrylic acids, various polyesters, various polyethers, various polyurethanes, and the like. The amount of the polyfluorooxetane-polyether block copolymer additive is generally from about 0.0005 or about 0.005 to about 0.5 or about 1.0 or about 3.0 or about 5.0 parts and desirably from about 0.01 to about 0.025 parts by weight for every 100 parts by weight of the water soluble, dispersible, emulsifiable, polymers.

The addition of a cation covalently bonded to a fluorooxetane oligomer, polymer or copolymer, or block copolymer (mono or polyhydroxyl terminated) will be better understood by reference to the following examples which serve to illustrate, but not to limit, the present invention. A Poly-Fox-THF-polyethylene oxide (B-A-B) diol was used as obtained in a manner similar to above-noted Example K.

EXAMPLE 1

| Ingredient | Scale | Weight g | MW | Moles | Mole Ratio | Density | Volume, mL |
|---|---|---|---|---|---|---|---|
| Poly-5-Fox-THF-Polyethylene Polyethylene Oxide (B-A-B) Diol | 86.37 | 86.37 | 1198.98 | 0.07 | 1.00 | 1.02 | 84.35 |
| Triethyl Amine (catalysts) | | 10.93 | 101.19 | 0.11 | 1.50 | 0.73 | 15.06 |
| Methylene chloride | | 68.27 | 84.93 | 0.80 | 11.42 | 1.33 | 51.33 |
| Trifluoromethane sulfonic anhydride | | 30.49 | 282.13 | 0.11 | 1.50 | 1.677 | 18.18 |
| 10% HCL wash | | 345.48 | 36.46 | 0.20 | 2.83 | 1 | 345.48 |
| Ice water wash | | 345.48 | 18.01 | 19.18 | 266.29 | 1 | 345.48 |
| Saturated Sodium chloride wash, if necessary | | 345.48 | 18.01 | | | | |
| DABCO | | 7.29 | 101.19 | 0.07 | 1.00 | 0.728 | 10.01 |
| Volume, reaction | 168.89 | | | | | | |
| Dp of polyol | 6.00 | | | | | | |
| MW of initiator | 993.00 | | | | | | |

The polymer solution from stage I was placed into a 500 mL 3-necked round bottom flask, and triethyl amine (10.93 grams, 0.11 moles) was added. The reaction temperature was cooled to minus 30° C., and slow dropwise addition of trifluoromethane sulfonic anhydride. A maximum temperature of minus 15° C. was observed, along with very high viscosity. After 30 minutes, 20 grams additional methylene chloride was added, and NMR analysis was performed. NMR analysis indicated the reaction was complete. The reaction was quenched with 345 grams of 10% HCL, and the organic layer was separated and washed with 345 grams of water, and 345 grams of saturated sodium chloride. The organic layer was dried, and filtered, and crystalline DABCO was added (Air Products, 12.16 grams, 0.108 moles, 1.5 equivalents). The reaction was heated to reflux overnight. After 54 hours, the reaction was filtered to remove salts, and the solvent was removed under reduced pressure to give a viscous yellow oil. 15 grams of the cationic sample (0.3 weight fraction) was formulated with 17 grams of butyl carbitol (0.34 weight fraction), and 19.75 grams of water (0.395 weight fraction) to give a clear solution. The product formed a cloudy solution when dissolved in water and contained a cation end groups.

EXAMPLE 2

| Ingredient | Scale | Weight g | MW | Moles | Mole Ratio | Density | Volume, mL |
|---|---|---|---|---|---|---|---|
| Poly-5-fox diol | 50 | 50.00 | 1453.00 | 0.03 | 1.00 | 1.02 | 48.83 |
| Triethyl Amine | | 5.22 | 101.19 | 0.05 | 1.50 | 0.73 | 7.19 |

-continued

| Ingredient | Scale | Weight g | MW | Moles | Mole Ratio | Density | Volume, mL |
|---|---|---|---|---|---|---|---|
| tetramethylhexanediamine | | 0.59 | 172.32 | 0.00 | 0.10 | 1.00 | 0.59 |
| methylene chloride | | 102.29 | 84.93 | 1.20 | 35.00 | 1.33 | 76.9 |
| p-toluenesulfonyl chloride | | 14.56 | 282.13 | 0.05 | 1.50 | 1.677 | 8.68 |
| 10% HCL wash | | 200.00 | 36.46 | 0.20 | 5.93 | 1 | 200.00 |
| ice water wash | | 200.00 | 18.01 | 11.10 | 322.71 | 1 | 200.00 |
| Saturated Sodium chloride wash, if necessary | | 200.00 | 18.01 | | | | |
| Dabco | | 5.91 | 112.18 | 0.05 | 1.50 | 0.728 | 5.30 |
| Volume, reaction | 100.68 | | | | | | |
| Dp of polyol | 6 | | | | | | |
| Yield tsofox, theoretical | 55.34 | | | | | | |

A 250 mL 3-necked round bottomed flask was equipped with a mechanical stirrer, reflux condenser, temperature probe, and addition funnel. Polyfox 5 diol (50 g, 34.41 mMol), triethyl amine (5.22 g, 51.6 mmol), tetramethyl hexanediamine (0.59 grams, 3.42 mMol) and 52.29 grams of methylene chloride were added, and the solution was cooled to 1.1° C. p-toluenesulfonyl chloride (14.56 g, 51.6 mMol) in 50 g methylene chloride was added dropwise over 20 minutes. The reaction mixture was allowed to warm to room temperature overnight. NMR analysis of the product was performed, and 100% conversion of the OH to the tosylate was observed. The reaction was extracted in a seperatory funnel with 10% HCL, then water.

The methylene chloride polymer solution was dried with magnesium sulfate crystalline DABCO was added (air products, 5.91 g, 52.6 mmol), and the reaction was allowed to stir at 35° C. for 24 hours, then at room temperature for 72 hours. The product contained quaternare ammonium end groups.

Silicone Containing Polyfox Copolymers

Grafted copolymers are made by reacting a polysiloxane, containing at least one hydrogen atom bonded to a silicone atom, with a monohydric (MOX) and/or a polyhydric (FOX) fluorooxetane oligomer, polymer or copolymer. The fluorooxetane will be grafted to the polysiloxane at the hydrogen atom site thus forming a copolymer having a polysiloxane backbone with pendant MOX and/or FOX oligomers, polymers or copolymers. These grafted copolymers can be utilized as flow, wetting, or leveling agents, or can be used to prepare a crosslinked silicone coating having improved oil resistance.

The polysiloxanes of the present invention will have the following repeat unit

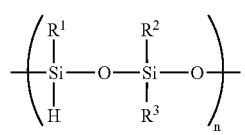

Formula S1 wherein $R^1$, $R^2$ and $R^3$ are, independently, a hydrogen or desirably an alkyl having from 1 to about 20 carbon atoms, desirably from 1 to about 10 carbon atoms with one or two carbon atoms, that is a methyl or ethyl group, being preferred with the proviso that at least one of said $R^1$, $R^2$, or $R^3$ groups is an alkyl. Preferably, $R^1$, $R^2$, and $R^3$ are all alkyl groups. The number of repeat groups, that is n, of any polymer is from about 4 to about 1,000, desirably from about 4 to about 100, and preferably from about 4 to about 20.

Such polysiloxanes are well known to the literature and to the art and are commercially available from Dow Corning and Gelest.

The monohydric or polyhydric fluorooxetane oligomers, polymers, or copolymers which can be utilized are set forth herein above and generally have the repeat unit set forth in Formulas 2AA or 2BB as follows.

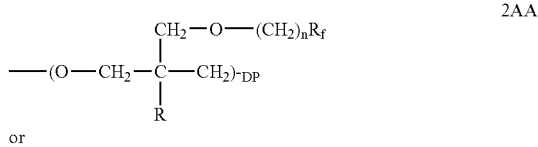

2AA or

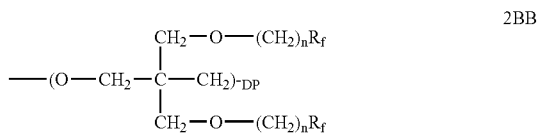

2BB wherein n, R, $R_f$, and DP are set forth herein above. That is, generally n, independently, is from 1 to about 6 and preferably from 1 to about 3. R is hydrogen or an alkyl having from 1 to 6 carbon atoms and preferably is ethyl or methyl. When the oligomer, polymer, or copolymer is monohydric or polyhydric, DP is from about 2 to about 50 or about 100, and desirably from about 3 or about 4 to about 15, or about 20, or about 30. $R_f$ is a linear branched alkyl group having from 1 to about 10, or about 15, or about 20 carbon atoms and preferably is from 1 to about 5, or about 7 carbon atoms. The $R_f$ groups can be perfluorinated as set forth herein above or they can contain at least 50% or 75%, desirably at least 80% or at least 90% or at least 95% of the hydrogen atoms being replaced by fluorine atoms. The $R_f$ pendant groups of the oxetane oligomer, polymer, or copolymer can contain two or more different groups as described herein. That is, each $R_f$ can be the same such as for example a $C_8F_{17}$ group, or two or more different groups within the same entity such as $C_8F_{17}$ and $C_{10}F_{21}$ end group, etc., and the like. When the fluorooxetane oligomer, polymer, or copolymer contains a mixture of different $R_f$ groups, they generally have a large number of carbon atoms such as from about 6 or about 8 to about 18 or about 20 carbon atoms, and desirably from about 10 to about 16 carbon atoms.

A copolymer containing the above repeat units can be made of various other monomers as set forth herein such as various cyclic compounds containing from 2 to about 4 or 5 carbon atoms with tetrahydrofuran being preferred.

The fluorooxetane oligomers, polymers, or copolymers if a polyhydric will have a structure as set forth in Formulas 3A and 3B, or if a monohydric will have a structure as set forth in Formulas 5A and 5B as set forth herein. $R^1$ and $R^2$ are the residual hydrocarbon groups derived from the polyol or monol initiator. In order for such oligomers, polymers, or copolymers to be reacted with the above noted polysiloxane, it is an important aspect of the present invention that the initiator groups contain an ethylenically unsaturated group therein. Accordingly, suitable alcohol initiators include an unsaturated monol or diol having a total of from 3 to about 10 carbon atoms with specific examples including allylic alcohol, Monohydric (MOX) fluorooxetane oligomers, polymers, or copolymers are preferred. Other than for the initiators, the fluorooxetane oligomers, polymers, or copolymers of Formulas 3A, 3B, 5A, and 5B can be made in a manner as set forth in U.S. Pat. Nos. 5,650,483; 5,668,250; 5,668,251; and 5,663,289, hereby fully incorporated by reference.

The reaction between the polysiloxane and the monohydric or polyhydric fluorooxetane oligomers, polymers, or copolymers generally takes place at temperatures from about 10° C. to about 100° C. and preferably from about 30° C. or about 40° C. or about 50° C. or about 60° C. Higher temperatures are generally preferred and the limit thereof is dependent upon the type of solvent utilized. Catalysts are generally desired with a platinum catalyst being preferred. The mole ratio of the fluorooxetane oligomer, polymer, or copolymer to each hydrogen atom bonded to the silicone atom of the polysiloxane is generally about 1.0 with a slight excess being preferred. The grafting efficiencies are generally high such as at least about 80% and preferably at least 90%. Accordingly, grafted copolymers are formed wherein the unsaturated initiator of the fluorooxetane oligomer, polymer, or copolymer is covalently bonded to the silicone atom at the prior site of the hydrogen atom. The formula of the grafted polysiloxane-g-FOX or MOX copolymer is thus

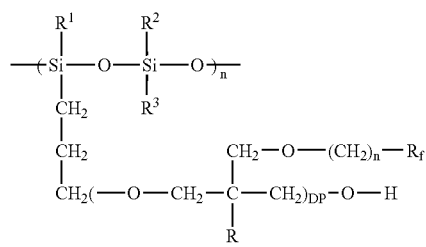

which relates to a reacted MOX polymer having an allylic alcohol initiator.

The polysiloxane-g-fluorooxetane oligomers, polymers, or copolymers of the present invention serve as effective flow, wetting, or leveling agents in various solutions and thus can be utilized in various dispersions, emulsions, or aqueous polymer solutions as well as in various solvent based polymer systems. Examples of suitable polymers which are generally soluble in solvents are known to the literature as well as to the art and generally include various polyesters, various polyacrylates, various polyurethanes, various epoxies, various alkyds, or various fluorine containing polymers, and the like. The amount of such flow, leveling, or wetting agents is generally from about 0.001 to about 2 or about 3 and desirably from about 0.01 to about 1.0 parts by weight for every 100 parts by weight of the solvent soluble polymers.

The invention will be better understood by reference to the following examples which serve to illustrate, but not to limit the present invention.

| Compounds | Quantity |
|---|---|
| allyl-poly-3-FOX | 10.92 g |
| THF | 25 mL |

| Compounds | Quantity |
|---|---|
| Me2MeH p-siloxane | 49.5 g |
| PCO85* | 1 drop dissolved in 10 mL of THF |

*platinum divinyldisiloxane complex from United Chemical Technologies

Procedure

The allyl functionalized poly-3-FOX was synthesized and stored over molecular sieves. 10.92 g of this material was added to a 125 mL jacketed flask that had been dried at 125° C. for two weeks that contained 25 mL of anhydrous THF that had been syringed into the flask. Prior to addition of the THF, molecular sieves were added along with a stir bar. 49.5 g of a dimethyl, methylhydrogen siloxane containing 30 to 35 mole percent Si—H was then added and the mixture stirred under $N_2$ blanket for 60 minutes. 5 mL of a solution containing 1 drop of platinum catalyst in 10 mL of anhydrous THF was then added and the mixture "cooked' at 50° C. for 130 minutes. $^1$H-NMR showed a slow hydroxylation was occurring so the remaining 5 mL of Pt/THF was added: The temperature increased to 55° C. Progress of the run was monitored by proton NMR spectroscopy as a function of the disappearance of the allyl olefin is proton resonance total reaction time.

Polar Group Terminated, Short Chain $R_f$ Containing Polymers

Any of the above described polymers such as the fluorinated oxirane, the fluorinated polyacrylate, the fluorinated FOX-lactone, can contain one or more polar groups thereon. The following examples relate to a polyoxetane having a polar group theron.

EXAMPLE J

The following is a preparation of a polyoxetane copolymer utilizing a tosyl group to add an amphoteric polar end group thereto.

PREPARATION OF 3-METHYL-3-OXETANEMETHANOL

Trimethylolethane was used as receive from GEO Specialty Chemicals, Trimet Products Group, 2409 N. Cedar Crest Blvd, Allentown, Pa. 18104-9733. Diethyl carbonate was used as received from Bayer Industrial Products Division, 100 Bayer Road, Pittsburgh, Pa. Dimethyl carbonate was used as received from SNPE North America, New Jersey. p-Toluenesulfonyl chloride was used as received from Biddle Sawyer Corporation. Potassium hydroxide and ethanol were used as received.

Into a 250 mL round bottomed flask fitted with a magnetic stirrer, thermometer, condenser, distillation head, and receiver were placed 240.30 g trimethylol ethane (2.0 mol), 180.16 g dimethyl carbonate (2.0 mol), and 0.20 g potassium hydroxide dissolved in 8 mL methanol. The mixture was refluxed until the pot temperature fell below 70° C., and then the methanol was removed by distillation while keeping the head temperature at 64° C.–66° C. (136.22 g isolated). Distillation was continued until the pot temperature rose to 145° C. The pressure was gradually reduced to 27 in Hg while maintaining a pot temperature of 140° C.–150° C. Rapid distillation of the product began, and 101.5 g of 3-methyl-3-oxetanemethanol distilled at 115° C.–120° C. (~49%).

Requirements: Reactor equipped with a reflux condenser and short path distillation setup. Requires a sophisticated short path setup with ability to fractionate the oxetane from the cyclic carbonate formed in the condensation process (with pot and head temperature readouts).

PREPARATION OF 3-METHYL-3-TOSYLMETHYLOXETANE 3-methyl-3-oxetanemethanol (100 g, 0.98 mol) was dissolved in 250 mL methylene chloride, and a 35% solution of sodium hydroxide (143.60 g, 1.08 mol) was added, and the reaction was cooled to 0° C. A solution of p-toluenesulfonyl chloride was added (186.67 g, 0.98 mol) in 375 mL methylene chloride was added over 1 hour. A white precipitate formed immediately. The reaction was stirred for 10 additional hours. 1000 mL of water was added. The dichloromethane solution layer was then removed, and dried with sodium sulfate, and the solvent was removed. Yield: 217.77 grams of 3-methyl-3-tosylmethyloxetane as white crystals, 87%. From: Col. Czech. Chem. Commun. V52, p. 2057 addition, allow exotherm to subside to a temperature of 6–8° C., then stir for 1 hour at 25° C.
3. Continue heating until a conversion of 85%+ is obtained.
4. Neutralize the acid with concentrated aqueous ammonia, maintaining a solution temperature below 20° C., (13.78 g, 0.23 mol ammonia). Follow the solution pH with pH paper or a pH meter, and add additional ammonia as necessary until a solution pH of 7–8 is obtained, again do not allow exotherm to exceed 20° C.
5. After two hours at 0° C., vacuum filter to remove salts.
6. Remove the THF/water solvent from the product under reduced pressure.

Utility

The various noted fluorinated polar polymers of the present invention unexpectedly functioned as wetting agents, or flow agents, or as leveling agents in a variety of

| PREPARATION OF POLY-3-FOX-CO-3-TOSYLMETHYL-3-METHYL OXETANE | | | | | | | |
|---|---|---|---|---|---|---|---|
| Compound | Scale | Ratio | MW | Moles | Mole Ratio | d (g/mL) | mL |
| 3-FOX | 50.0 | 1.0 | 184.15 | 0.27 | 11.31 | 1.150 | 43.5 |
| 3-p-toluensufonyl-3-methyloxetane | | 0.5 | 256.08 | 0.09 | 3.75 | 1.200 | |
| Methylene Chloride | | 0.53 | 84.93 | 0.46 | 18.99 | 1.330 | 29.1 |
| Neopentyl Glycol | | 0.12498 | 104.15 | 0.06 | 2.50 | 1.017 | 6.1 |
| $BF_3THF$ | | 0.06715 | 139.90 | 0.02 | 1.00 | 1.268 | 2.6 |
| Methylene Chloride | | 0.8 | 84.93 | 0.47 | 19.62 | 1.330 | 30.1 |
| 7.5% sodium bicarbonate | | 0.8 | 84.01 | 0.04 | 1.49 | 1.000 | 40.0 |
| Water | | 0.85 | 18.01 | 2.36 | 98.33 | 1.000 | 42.5 |
| Theoretical Yield (g) | 57.98 | | | | | | |
| Expected Yield, Low (g) | 52.18 | | | | | | |
| Expected Yield, High (g) | 55.08 | | | | | | |
| Solids Loading reaction, % | 69.22 | | | | | | |
| solids Loading wash, % | 47.27 mL | | | | | | |
| Initial Volume | 72.20 | | | | | | |
| Volume after quench, mL | 142.27 | | | | | | |
| Volume after wash, mL | 144.77 | | | | | | |

To a 250 mL 3-necked round bottomed flask was added neopentyl glycol (6.25 grams, 0.06 moles), 29 mL methylene chloride, and $BF_3THF$ (3.36 g, 0.02 moles). 3-FOX monomer (50 g, 0.27 moles), and 3-p-toluenesulfonylmethyl-3-methyloxetane (23.05 g 0.09 mol) were added dropwise over 40 minutes. After two hours, proton-NMR analysis indicated polymerization of the oxetane monomer was complete with a degree of polymerization of 6.80 grams of methylene chloride was then added, and the polymer solution was washed with water until a neutral pH was obtained. Final yield was 57.98 grams, the oxetane degree of polymerization was 6, and the hydroxyl equivalent weight was 608.8.

Sulfate Functionalization of poly-3-FOX-co-3-tosylmethyl-3-methyl Oxetane with Fuming Sulfuric Acid and Ampho-teric Polymer Preparation The copolymer was reacted in the following manner to form an amphoteric end group with the nonFOX polymer containing an —$NH_3^+$ group therein.

1. Dissolve 50 grams of difunctional poly-3-FOX-co-3-p-toluenesulfonylmethyl oxetane DP 6 (hydroxyl equivalent weight=608.8 grams per mol OH, 0.08 Mol OH) in 50 g tetrahydrofuran (50% solids). Cool the solution to 0° C.
2. Add 18.34 grams of 20% fuming sulfuric acid (average MW=93.58, 0.20 Mol acid, 2.38 equivalents). Do not allow exotherm to exceed 15° C. Upon completion of aqueous and non-aqueous coatings. Examples of aqueous coatings include latex paints and floor polishes that are applied to glass, wood, metal, ceramic and polymeric substrates. Examples of non-aqueous or solvent-based coatings include enamels and varnishes that are applied typically to the same aforementioned substrates. Furthermore, the various noted fluorinated, polar polymers are effective as wetting, flow or leveling agents in variety of powder and radiation-curable coatings The noted fluorinated polar polymers function by lowering the surface tension of the coating below that of the substrate onto which they are applied.

The various fluorinated polar polymers also can be utilized as an additive for various consumer products, for example cleaners, shampoos, cosmetics, etc., and also as cleaners for furniture, glass, car polish, and the like.

Moreover, fluorinated polar polymers of the present invention can be utilized in coatings on various substrates to form a laminate.

Still other end uses can be categorized as follows.

For paints and coatings for improved wetting, improved leveling and gloss, as a flow rheology modifier, for improved anti-soiling, and as a Teflon wetting aid.

As waxes and polishes for improved leveling and gloss, for improved wetting, and as a Teflon wetting aid.

For aqueous adhesives for improved wetting and leveling, with a semi-release additive, as well as nonaqueous adhesives.

For various graphic art applications for improved leveling, decreased ink wicking, for photo emulsion wetting, and for improved cylinder life.

For various polymer technology applications such as a mold release spray, emulsion polymerization, for anti-fog, as an external lubricant, as an internal lubricant, as a coupling agent, as a Teflon wetting aid, as wetting agents for olefins and acrylics, and for $CaSO_4$ scale removal.

For electronic applications such as zinc battery scale inhibitor, and a plating bath aid.

For caulks to give improved leveling and anti-soiling.

For metal technology applications such as anti-corrosion, etch bath wetting, for cleaning and scale removal, and for degreasing.

For various cleaning applications such as hair conditioning and rinses, for alkaline cleaners, for glass cleaner and defogging, for shampoos, and for solvent degreasing.

Further uses include floor polish emulsions; electrolytic conversion coatings; photographic processes; fluoropolymer emulsions; specialty inks; water based coatings; solvent based coatings; electronic etch baths; corrosion inhibitors; soldering systems; alkaline systems; and plastic preplate etchants.

End Use Applications and Data

A desired end use for the fluorinate containing polymers of the present invention is used as an additive in a floor polish composition or formulation.

Floor polish formulations are aqueous emulsions and comprised typically of polyolefin wax emulsions, alkali soluble resins typically of the styrene-acrylic copolymer type, short chain acrylic polymers or copolymers, plasticizers, biocides, water, variety of coalescing solvents typically of the glycol ether type and defoamers typically of the silicone surfactant type. Floor polish formulations are typically in the pH range of 8–10. A wetting, flow, or leveling agent, typically of a fluorosurfactant type, is added to impart a high gloss finish to the dried coating.

Floor Polish Composition Preparation (Bench Scale)

Floor polish samples for bench scale testing were mixed in 100 g quantities in glass jars with 120 g capacity. A magnetic stir bar is placed into the glass jar and the jar is placed on a balance. De-ionized water is added in a range of 30–50 g. A permanent plasticizer is added in a range of 1 g–4 g. Tributoxy ethyl phosphate is a common plasticizer used in floor finish. A glycol ether or mixture of glycol ethers are added in a range of 1 g–7 g. The sample is then placed on a stir plate and allowed to stir for 15 minutes. The jar is then placed on to a balance. Styrene-Acrylic copolymer or similar polymer blends are added in a range of 20 g–50 g. The sample is then returned to the stir plate and allowed to mix for 30 minutes. The mixture is placed on to a balance. Polyethylene and/or polypropylene wax emulsions, alkali soluble resins, short chain acrylic copolymers, and/or blends of these substances are added in a range of 0 g–15 g. At this time 150 ppm active Polymer 6A or Polymer 6B are added to the mixture. The mixture is allowed to stir for at least 2 hours. The sample is then allowed to equilibrate for 24 hours at room temperature.

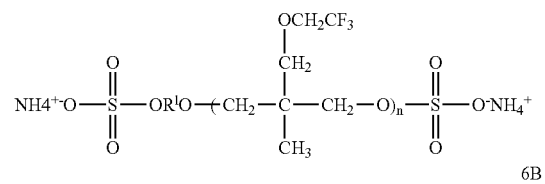

6A

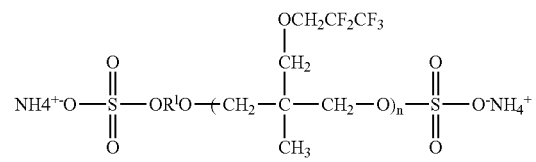

6B where n=6–8, and where $R^1$ is the diol initiator.

Floor Polish Composition Preparation (Commerical Scale)

Commercial scale production of floor polish containing the following composition is accomplished typically in 3000 gallon batches. 11,017 lbs of deionized water is added to a 3,000 gallon vessel. A plasticizer, such as tributoxyethyl phosphate, is added at 750 lbs along with a coalescing solvent, such as diethylene glycol monoethyl ether, at 750 lbs, a bacteriostat, such as Proxel GXL (from Imperial Chemical Industries) at 25 lbs, and an antifoam, such as SAG 1010 (from Union Carbide Corp.) at 5 lbs. This mixture is allowed to stir for several hours at room temperature. At this time, the polymeric ingredients are added to the vessel. Typically, this would consist of the addition of 11,250 lbs of a styrene-acrylic copolymer and 1250 lbs of a polyethylene emulsion. The wetting, flow, or leveling agent of Polymer 6A or 6B is then added (12.5 lbs @ 30 wt % active ingredient). The final mixture is allowed to stir for several hours and then allowed to equilibrate for 24 hours at room temperature.

Figure 1:
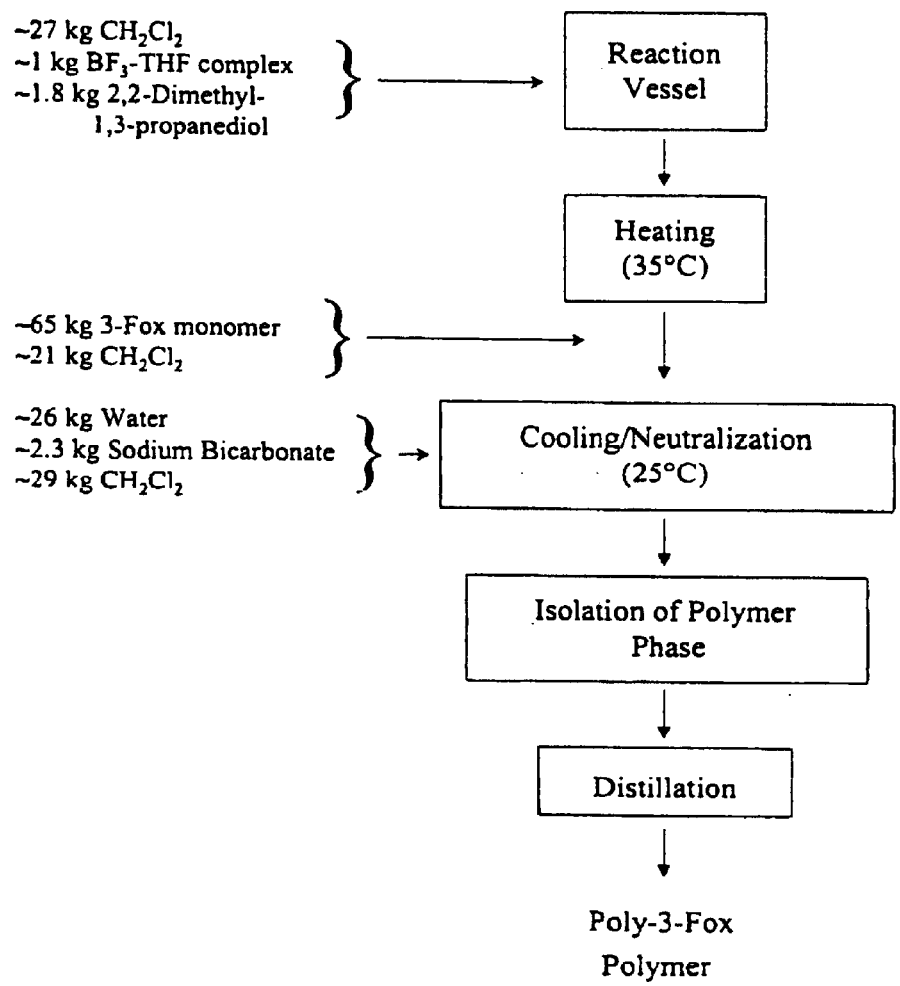
FIGS. 1 and 2 provide a description of preparation of the compounds of the present invention on a commercial scale with regard to Poly-3-FOX polymer containing polar end groups of ammonium sulfate.
Figure 2:
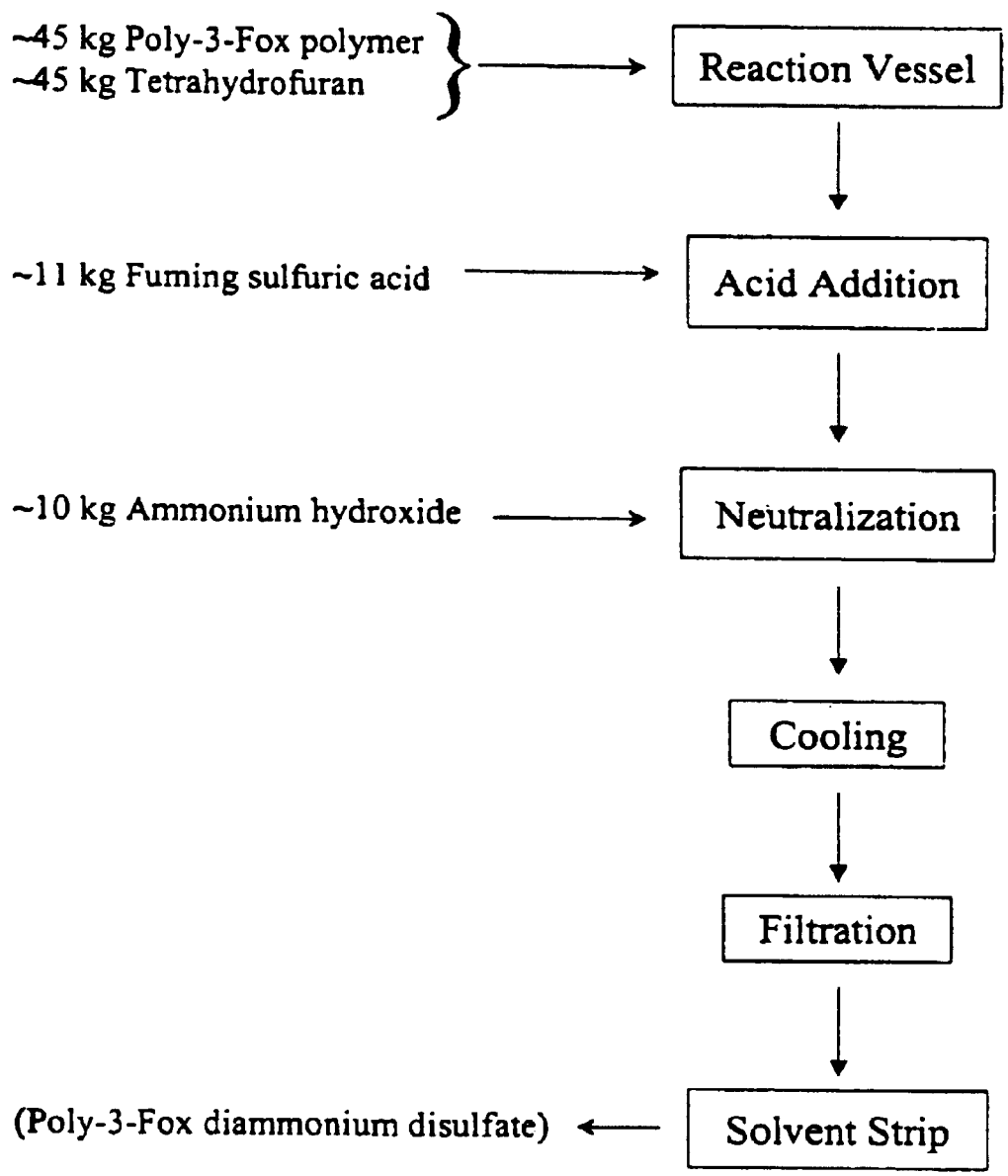

Commercial Scale Manufacture of Poly-3-FOX Polymer and Diammonium Disulfate

Poly-3-Fox Polymer Synthesis

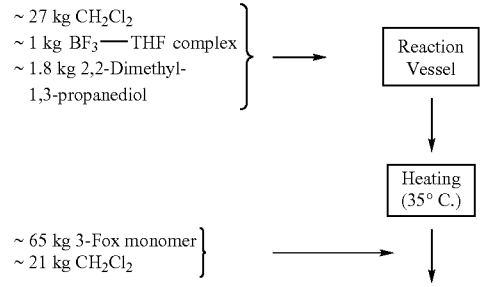

-continued

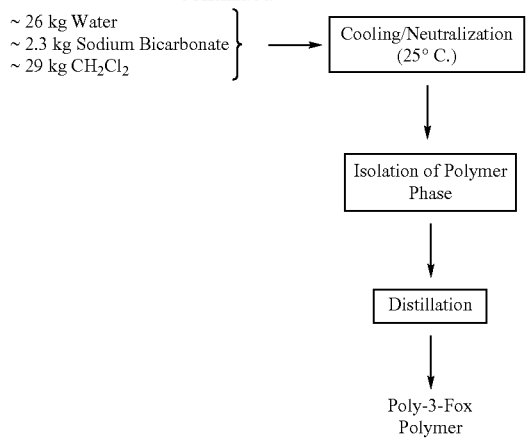

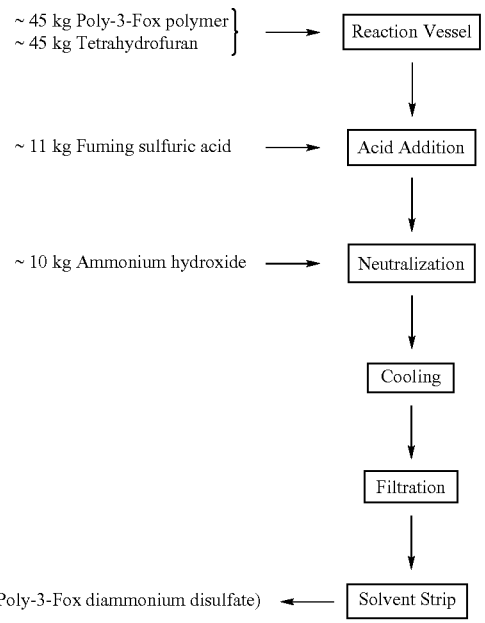

(Poly-3-Fox diammonium disulfate)

EXAMPLE

Laboratory Testing of Floor Polish

Laboratory testing of floor finish applications were preformed using the above described bench scale composition in accordance with ASTM D-1436. The polish is applied to a gauze pad with an automated pipette for a coverage rate equivalent to 2000 sq. feet/gallon of floor finish. In addition to room temperature, the floor finish is applied under different temperatures and humidities. The finish is applied at a humidity range of 20% RH to 80% RH. The finish is applied at temperature ranges of 55° F.-95° F. The finish is then reapplied with four additional coats. After drying, the finish is observed to be free of surface defects and dries to a high gloss. Very little or no foam was observed when the composition of polymers 6A and 6B were tested.

Following ASTM D-2047, floor finish made with Polymers 6A and 6B do not have a significant difference with respect to static coefficient of friction to a 95% confidence interval.

The application of a coating or paint or in this specific example, floor polish requires a shearing action. This shearing action can introduce foam to the coating, paint or polish. If the foam is persistent, (i.e., does not dissipate before the coating dries) undesirable optical effects are seen such as a very rough surface that reduces the desired high gloss imparted by the coating. In addition to fluorosurfactants, other surface active agents, such as sodium lauryl sulfate, are often introduced, for example, to stabilize the polymer emulsion comprising the coating. Due to inherent properties of many surface active agents added to the coating (such as very low surface tension and/or interfacial rheology), persistent foams are often produced. To circumvent this problem, defoamers are added to the composition. However, the fluorinated polymers such as Polymers 6A or 6B and those described in the present embodiment, produce little or no foam under shear with persistence times less than the drying time of the coating. In other words, the compositions are foaming resistant in that they have low or nil foam, any foam is of short duration, and the foam breaks or collapses before any film, layer, coating, etc. dries.

EXAMPLE

Field Sample Preparation and Testing of Floor Polish

Field samples are prepared in a plastic 2 or 5 gallon container depending on batch size. The bucket is placed on a bench scale +/−<1%. The bucket and mixer are placed under a small horse power electric lab mixer. Deionized water is added in a range of 30%–50%. The mixer is turned on low speed. The remaining chemicals are added in the same percentages and ranges of aforementioned bench samples. Mixing times are the same as with smaller samples. Items that are not easily measured within the tolerance of the scale are weighed on a bench top balance and added to the mixture.

An area is stripped using common industrial floor finish stripper diluted 4:1, agitated with a 3M black floor pad, and a low speed machine (175 RPM). The floor is rinsed twice with a cotton mop and allowed to dry. The bench polish composition described above is poured into a lined mop bucket. The polish is applied with a synthetic fiber string mop provided to us under the trade name Great White which is a registered trademark of the ETC of the Henderson Company. The mops used have been previously soaked in water overnight and wrung thoroughly before attaching to a mop handle and placed into the floor finish in the bucket. The mop is wrung until it is just dripping. The finish is applied to the floor covering a section with a continuous coat. Sections are coated sequentially until the entire area is coated. Once the finish is completely dry, additional coats are applied until a desired gloss is obtained.

It is important to note that the aforementioned examples of floor polish formulations containing the embodiment of this patent did not contain the silicone surfactant defoamer found typically in most floor polish formulations.

Powder Coatings

The various flow or leveling agents, are wetting agents of the present invention, that is the low carbon atom fluorinated $R_f$ group of a polyoxetane polymer or the other polymers as noted herein having either a hydroxyl end group or another polar end group as noted herein above, for example ammonium sulfate, can be formed into powder coating compositions. The advantage of a powder coating composition is that it is dry and can be used in various applications without the need to evaporate solvents which are undesirable or to even evaporate water. Such powder coating compositions generally contain resin, such as a polyester, an epoxy, and the like, a crosslinker, pigments, extenders, flow aids, specific processing aids and/or a degassing compound. Components are mixed by high speed blending and then melt mixed by extrusion. The extrudate is ground to reduce particle size and then classified according to size. Powder coatings based on thermoforming resins do not use a crosslinker. The composition of powder coatings are known to the literature and to the art.

The powder coating composition of Table V were made in the following manner.

EXAMPLE PC

Primid XL 552, a hydroxyl alkyl amide curative for acid functional polyester resins, is gaining wide acceptance as a replacement for triglycidylisocyanurate (TGIC), especially in Europe. Primid XL 552 cures by an esterification reaction with the elimination of water. It is a low molecular weight material with a crystalline structure. This makes it difficult to dispers in amorphous resins having a much higher melt viscosity, Whether because of the water generated during curing or the lack of complete mixing/dispersion in the resin matrix, Primid XL 552 cured powders are characterized by surface defects, described variously as micro pinholes or micro craters, resulting in a surface "haze", resulting in a low gloss finish and reduction in distinctness of image (DOI). The addition of the claims of this invention result in the production of powder coatings with much more desirable optical properties.

A series of eight powder coatings were prepared using conventional techniques: weighing/mixing, extrusion, grinding and classifying. Powders were extruded on a 50 mm twin screw extruder under the following conditions: rear zone heat @ 100° F.; front zone heat @ 150° F., screw speed=400 rpm; torque=70–80%. After compounding, powders were sifted through a 140 mesh (105 micron) screen and electrostatically sprayed on test panels. A 4×12 inch standard Q-Panel™ (0.032 inch, ground one side stainless steel primed substrate) was coated with each powder, spraying thin at the top and thicker at the bottom so the effect of thickness on appearance could be more readily discerned. All coatings were cured for 10 minutes at 4000F. Gloss (using a BYK Micro-Gloss meter), surface roughness ($R_a$) and plate flow (recommended Procedure Number 7 for Inclined Plate Flow published by the Powder Coating Institute) were measured on the final, cured coatings.

The ingredients of the compositions are as set forth in Table V.

TABLE V (composition values are parts per hundred of resin)

| Panel | 1 | 2 | 3 | 4 | 5 | 6 | 7 | 8 |
|---|---|---|---|---|---|---|---|---|
| Crylcoat ™ 7617[a] | 95 | 95 | 95 | 95 | 95 | 95 | 95 | 95 |
| Primid ™ XL 552[b] | 5 | 5 | 5 | 5 | 5 | 5 | 5 | 5 |
| Resiflow ™ P-67[c,d] | 1.2 | 1.2 | 1.2 | 1.2 | 1.2 | 1.2 | 1.2 | — |
| TiO$_2$ | 50 | 50 | 50 | 50 | 50 | 50 | 50 | 50 |
| Benzoin | 0.6 | — | — | 0.6 | 0.6 | 0.6 | 0.6 | 0.6 |
| Fluorinated Polymer[e,f] | — | 0.2 | 0.4 | 0.2 | 0.4 | — | — | 0.4 |
| FC-430[e,g] | — | — | — | — | — | 0.4 | — | — |
| FC-171[e,g] | — | — | — | — | — | — | 0.4 | — |
| Plate flow (mm) | 94 | 87 | 88 | 96 | 87 | 85 | 90 | 82 |
| Gloss (20°) | 75.7 | 80 | 82 | 86.8 | 87.8 | 86 | 87.2 | 84.5 |

TABLE V-continued (composition values are parts per hundred of resin)

| Panel | 1 | 2 | 3 | 4 | 5 | 6 | 7 | 8 |
|---|---|---|---|---|---|---|---|---|
| Gloss (60°) | 92.8 | 93.8 | 94.5 | 94.5 | 94.5 | 94 | 94.5 | 93.8 |
| $R_a$ (μm) | 0.24 | 0.12 | 0.18 | 0.12 | 0.12 | 0.18 | 0.22 | 0.19 |

[a]A hydroxyalkylamide crosslinker from UCB Chemicals Corporation.
[b]An acid functional polyester resin from DSM.
[c]67 wt % active on silica carrier
[d]A modified polyacrylate flow control agent from Estron Chemicals, Inc.
[e]50 wt % active on silica carrier.
[f]Fluorinated polymer (Formula 7).
[g]Fluorosurfactants from 3M.
FC-430 is a fluoroaliphatic polymeric, nonionic ester.
FC-171 is a perfluoroalkylsulfonate ethoxylated of the formula $F(CF_2)_8SO_2N(C_2H_5)(CH_2CH_2O)_{-8}CH_3$.

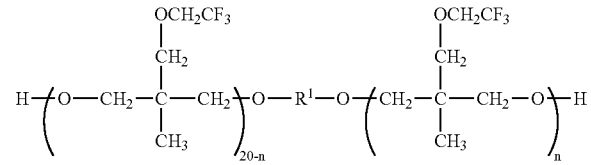

wherein n is from about 1 to about 20 with from about 5 to about 15 being preferred.

As apparent from Table V, the hydroxyl terminated flow and wetting agent of the present invention when added to the above noted powdered coating composition resulted in an improved gloss, see Examples 2 through 5, in comparison with the Control, Example 1. Moreover, the powder coatings of present invention generally achieve gloss values comparable to that of commercially available fluorsurfactants from 3M, i.e. Examples 6 and 7.

Alkoxyoxetane Monomers, and Oligomers, Polymers, and Copolymers Thereof

An alkoxyoxetane monomer is made by reacting a starting compound such as an alkyl halide-alkyloxetane with either an alkyl alcohol or an alkoxy alkyl alcohol. The alkyl halide-alkyloxetane has the following formula:

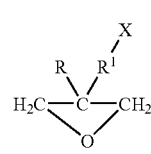

A1A or

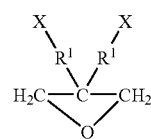

A1B where R is a hydrogen or an alkyl having from 1 to 6 carbon atoms and preferably from 1 to 3 carbon atoms, each $R^1$, independently, is an alkyl having from 1 to 6 carbon atoms with from 1 to 3 carbons being preferred, and each X, independently, is a halide such as a chlorine, or bromine or an iodine atom. The compound of Formula A1A and A1B is reacted with an alkyl alcohol such as an alkoxy alkyl alcohol, e.g. $HO—(R^2—O—)_nR^3$ wherein $R^2$, independently, is an alkyl having from 1 to about 6 carbon atoms and preferably from 1 to about 3 carbon atoms, wherein $R^3$ is hydrogen, or a hydrocarbyl such as an alkyl, either linear or branched, or an aromatic, or an arylalkyl, or an alkyalkyl, etc., having 1 to about 20 carbon atoms with from 1 to about 18 carbon atoms being preferred, and wherein n is 0, 1 or from 2 to about 100, and preferably from about 0 to about 20. The resulting monomer has the formula

A2A

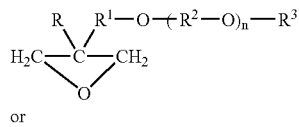

or

A2B

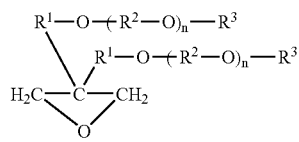

where R, $R^1$, $R^2$, $R^3$, and n are as set forth above.

Approximately equal molar amounts of the alkyl halide-alkyloxetane, are reacted with HO—$(R^2$—O—$)_n R^3$ in the presence of a phase transfer cataylst such as an alkyl ammonium halide e.g. tetrabutyl ammonium bromide, in the presence of water at reaction temperatures of about 65° C. to about 105° C. and preferably from about 75° C. to about 85° C. A base such as potassium hydroxide is also added to the solution. The reaction is exothermic at high conversions, generally in excess of 75% and 85% conversion are obtained. Further addition of a base such as potassium hydroxide is added optionally along with additional alcohol or alkoxy alcohol. The reaction is quenched with water and the organic phase separated and distilled to yield the alkoxyoxetane (A2A and A2B) monomer.

Polymerization of the alkoxyoxetanes generally occurs under essentially the same conditions and in essentially the same manner as polymerization of the above noted polyhydroxyl fluorooxetane monomers or monohydric fluorooxetane monomers. Accordingly, such reaction conditions are hereby fully incorporated by reference. Such reaction conditions are also set forth in U.S. Pat. Nos. 5,650,483; 5,668,250; 5,668,251; and 5,663,289, all of which are fully incorporated by reference. By way of brief summary, polymerization of the one or more same or different alkoxyoxetane (A2A and A2B) monomers is initiated by either a diol to produce a polyhydric or by a monol to produce a monohydroxyl oligomer, polymer, or copolymer. Polymerization is generally carried out in suitable solvents which are generally polar and/or halogenated hydrocarbons having a total of from 1 to about 7 carbon atoms such as methylene chloride, carbon tetrachloride, chloroform, trichloroethylene, chlorobenzene, ethyl bromide, dichloroethane, and the like with methylene chloride being preferred. The amount of such solvents is generally from about 50 to about 100 parts by weight for every, 100 parts by weight of the alkoxyoxetane monomer and the diol or monol initiator.

The one or more alkoxyoxetane monomers which are polymerized with either a monol or diol initiator readily polymerize in the presence of the Lewis acid catalyst (i.e. compounds capable of accepting a pair of electrons). Such suitable Lewis acids include complexes of boron trifluoride, for example $BF_3$ etherate, $BF_3$-THF, antimony pentafluoride, zinc chloride, aluminum bromide, and the like with $BF_3$-THF being preferred. When $BF_3$-THF was utilized, the THF will be polymerized and hence a alkoxyoxetane-THF copolymer will be produced. Generally the amount of THF within the copolymer is from about 0.05 to about 10 or about 12 or about 30 or about 50 percent by weight and desirably from about 0.1 to about 5 percent by weight based upon the total weight of the copolymer.

Polymerization is carried out at temperatures of from about 0° C. to about 70° C. and preferably from about 30° C. to about 50° C. Polymerization times can vary with regard to the temperature and other factors and generally range from about 1 to about 4 hours. Once the various alkoxyoxetane monomers have been polymerized, the end product which is a copolymer solution can be washed with water to remove the catalyst.

The polyhydric or monohydric alkoxyoxetane oligomers, polymers, or copolymers (ROX) will have the following repeat units

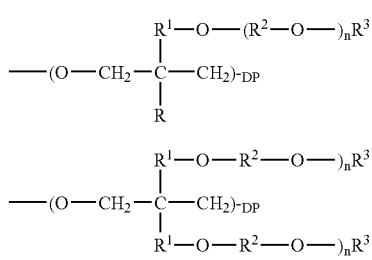

where R, $R^1$, $R^2$, $R^3$, and n are set forth above. The degree of polymerization (DP) is generally from about 2 to about 50 or about 100, and desirably from about 3 or about 4 to about 10, or about 15, or about 20, or about 30. When polymerized with other additional monomers such as various cyclic ethers, having a total of from 2 to about 5 carbon atoms as set forth hereinabove and fully incorporated by reference with regard to all aspects thereof with tetrahydrofuran being preferred, a copolymer will be produced.

Another embodiment of the present invention relates to polymerizing alkoxyoxetane monomers, i.e. A2A or A2B, along with fluorooxetane monomers such as set forth in Formulas 2AA and 2BB in the presence of the above noted diol initiators or monol initiators to yield copolymers such as statistical or block. The mole amount of the alkoxyoxetane monomers can range from about 1 to about 99 moles, desirably from about 20 to about 60 moles, and preferably from about 25 to about 50 moles for every 100 total moles of said alkoxyoxetane monomers as set forth in Formulas A2A and/or A2B and said fluorooxetane monomers set forth in Formulas 2AA and/or 2BB. Depending upon whether a diol initiator or a monol initiator is utilized, respectively, either a polyhydroxyl terminated or a monohydroxyl terminated oligomer, polymer, or copolymer will be produced. The degree of polymerization of from about 2 to about 50 or about 100, and desirably from about 3 or about 4 to about 10, or about 15, or about 20, or about 30.

The alkoxyoxetane oligomers, polymers, or copolymers, either alone or as copolymers with fluorooxetane oligomers, polymers, or copolymers, serve as effective flow, wetting, or leveling agents in various solutions and thus can be utilized in various dispersions, emulsions, or aqueous polymer solutions as well as in various solvent based polymer systems. Examples of suitable water soluble, dispersible, or emulsifiable, polymers are known to the literature as well as to the art and include various polyacetates, various polyacrylates, various polyacrylic acids, various polyesters, various polyethers, various polyurethanes, various fluorine containing polymers, and the like. Examples of suitable polymers which are generally soluble in solvents are known to the literature as well as to the art and generally include various polyacrylate, various polyesters, various polyurethane, various epoxies, various alkyds, or various fluorine containing polymers, and the like. The amount of such flow, leveling, or wetting agents is generally from about 0.001 to about 1.0 or about 3.0 and from about 0.01 to about 0.5 parts by weight for every 100 parts by weight of the water soluble, dispersible, or emulsifiable polymers; and generally from about 0.001 to about 1.0 or about 3.0 and desirably from about 0.01 to about 0.5 parts by weight for every 100 parts by weight of the solvent soluble polymers.

Generally, the same FOX, MOX, and/or FOX L reactions as set forth in this specification including formation of various copolymers, block copolymers, addition of anionic end groups or cationic end groups or nonionic end groups, etc., as well as reactions with polyethers, carboxylic acids, and polysiloxanes can be carried out in essentially the same manner and reaction conditions as set forth herein with respect to ROX. Such reactions involve ROX oligomers, polymers, or copolymers (as well as monomers which form the same) with FOX or MOX, either as statistical copolymers, or as block copolymers, for example (FOX)-(ROX), or (ROX)-(FOX), or (ROX)-(FOX)-(ROX), or (FOX)-(ROX)-(FOX). Accordingly, it can be seen that a great number and variety of different fluorine containing compounds, or surface active compounds, or flow, wetting, or leveling agents can be created.

The invention will be better understood by reference to the following examples which serve to illustrate, but not to limit the present invention.

EXAMPLE 1

EXAMPLE 2

A 1 liter jacketed 3-necked roundbottomed flask was equipped with a temperature probe, magnetic stirrer, reflux condenser and addition funnel. 2-methoxyethanol (200.00 g, 2.63 moles), BrMMO (455.38 g, 2.76 moles), tetrabutyl ammonium bromide (21.18 g), and 115.4 g water were added. The reaction mixture was heated to 85° C. A 45% solution of potassium hydroxide (364.03 grams, 2.92 moles) was added over 1 hour and 10 minutes. An exothermic reaction was observed. After 4 hours, 78% conversion was observed. Additional 2-methoxyethanol (44.39 g, 0.58 moles) was added, followed by 80 grams of 45% potassium hydroxide. The reaction was heated to 102° C. The reaction was quenched with water, and the organic phase was separated and distilled. 3-(2'-methoxyethoxy)-3-methyloxetane was isolated (247.76 grams, 58%).

| Synthesis of 3(2'-methoxyethoxy-3-methyloxetane | | | | | | | |
|---|---|---|---|---|---|---|---|
| Material | Scale | Weight g | MW | Moles | Mole Ratio | Density | ml |
| 2-Methoxyethanol | 200 | 200.00 | 76.10 | 2.63 | 1.00 | 1.373 | 145.7 |
| 3-bromomethyl-3-methyloxetane | | 455.38 | 165.02 | 2.76 | 1.05 | 1.435 | 317.3 |
| tetrabutyl ammonium bromide | | 21.18 | 322.37 | 0.07 | 0.025 | 1 | 21.2 |
| Water | | 115.40 | 18.01 | 6.41 | 2.44 | 1.000 | 115.4 |
| 45% aqueous KOH | | 364.03 | 56.10 | 2.92 | 1.11 | 1.456 | 250.0 |
| Water | | 184.60 | 18.01 | 10.25 | 3.90 | 1.000 | 184.6 |
| 45% aqueous KOH | | 8.00 | 56.10 | 0.06 | 0.024 | 1.456 | 5.5 |
| Water | | 176.60 | 18.01 | 9.81 | 3.73 | 1.000 | 176.6 |
| Theoretical Yield, (g) | 421.1 | | | | | | |
| Expected Yield, low (g) | 315.8 | | | | | | |
| Expected Yield, high (g) | 400.0 | | | | | | |
| Solids Loading, % | 36.4 | | | | | | |
| KBR Concentration, Mol/l | 5.3 | | | | | | |
| KBR Concentration, wt % | 41.0 | | | | | | |
| | ml | | | | | | |
| Volume after KOH addn. | 849.6 | | | | | | |
| Volume after quench | 1034.2 | | | | | | |
| Volume after phase split | 463.0 | | | | | | |
| Volume after wash | 645.1 | | | | | | |

| Synthesis of 3-methyl-3-methoxymethyloxetane | | | | | | | |
|---|---|---|---|---|---|---|---|
| Material | Scale | Weight G | MW | Moles | Mole Ratio | Density | ml |
| Methanol | 100 | 100.00 | 32.04 | 3.12 | 1.00 | 0.791 | 126.4 |
| 3-bromomethyl-3-methyloxetane | | 540.80 | 165.02 | 3.28 | 1.05 | 1.435 | 376.9 |
| tetrabutyl ammonium bromide | | 25.15 | 322.37 | 0.08 | 0.025 | 1 | 25.2 |
| Water | | 57.70 | 18.01 | 3.20 | 1.03 | 1.000 | 57.7 |
| 45% aqueous KOH | | 428.08 | 56.10 | 3.43 | 1.10 | 1.456 | 294.0 |
| Water-quench | | 92.30 | 18.01 | 5.12 | 1.64 | 1.000 | 92.3 |
| Hexane | | 100.00 | 86.17 | 1.16 | 0.37 | 0.655 | 152.7 |
| Theoretical Yield, (g) | 356.4 | | | | | | |
| Expected Yield, low (g) | 267.3 | | | | | | |
| Expected Yield, high (g) | 338.6 | | | | | | |

Synthesis of 3-methyl-3-methoxymethyloxetane -continued

| Material | Scale | Weight G | MW | Moles | Mole Ratio | Density | ml |
|---|---|---|---|---|---|---|---|
| Solids Loading, % | 30.9 | | | | | | |
| KBR Concentration, Mol/l | 7.7 | | | | | | |
| KBR Concentration, wt % | 51.5 | | | | | | |
| | ml | | | | | | |
| Volume after KOH addn. | 880.2 | | | | | | |
| Volume after quench | 972.5 | | | | | | |
| Volume after phase split | 503.3 | | | | | | |

A 1 liter jacketed 3-necked roundbottomed flask was equipped with a temperature probe, magnetic stirrer, reflux condenser and addition funnel methanol (100.00 g, 3.12 moles), BrMMO (540.80 g, 3.28 moles), tetrabutyl ammonium bromide (25.15 g), and 57.7 g water were added. The reaction mixture was heated to 85° C. A 45% solution of potassium hydroxide (428.08 grams, 3.43 moles) was added over 1 hour and 10 minutes. An exothermic reaction was observed. After 10 hours, 86% conversion was observed. The water phase was removed, and 61.15 grams of 45% potassium hydroxide was added, followed by 100 ml hexane with a dean stark trap. The solution was refluxed until water no longer came off. The reaction was quenched with water, and the organic phase was separated and distilled. 3-methyl-3-methoxymethyloxetane was isolated.

EXAMPLE 3

23.1 grams of methylene chloride, trifluoroethanol initiator (11.32 grams, 113.13 mmoles), and $BF_3THF$ (6.33 grams, 45.25 mmoles). A solution consisting of 3-fox monomer (100 grams, 543.04 mmoles), methoxymethyl methyl oxetane (15.49 grams, 133.35 mmoles), and trifluoroethanol solvent (65.83 grams, 658.03 mmoles) was prepared, and added over 1 hour and ten minutes. A rapid exotherm was observed, with a maximum temperature of 35° C. The reaction mixture was allowed to stir for 16 hours at 25° C., then 100 mL 5% sodium bicarbonate solution was added to quench the reaction. The reaction was washed a second time with 100 ml deionized water. The solution was dried,

Synthesis of copolymers of alkoxyoxetane-fluorooxetane polymers

| Substance | Scale (g) | Quantity (g) | MW | Eq | mmoles | δ | ml |
|---|---|---|---|---|---|---|---|
| 3-fox Monomer | 100 | 100.00 | 184.15 | 4.8 | 543.04 | 1.15 | 86.96 |
| Methoxymethyl methyl oxetane | | 15.49 | 116.16 | 1.19 | 133.35 | 0.8 | 19.36 |
| Trifluoroethanol, solvent | | 65.83 | 100.04 | 5.82 | 658.03 | 1.185 | 55.55 |
| Trifluoroethanol, intiator | | 11.32 | 100.04 | 1.00 | 113.13 | 1.19 | 9.55 |
| $BF_3$.THF, catalyst | | 6.33 | 139.9 | 0.40 | 45.25 | 1.268 | 4.99 |
| methylene chloride, reaction solvent | | 23.1 | 84.93 | 2.40 | 271.99 | 1.35 | 17.36 |
| Methylene chloride wash solvent | | 57.75 | 84.93 | 6.01 | 679.97 | 1.35 | 43.42 |
| Quench (5% NaHCO3) | | 100.00 | 84.01 | 0.52 | 59.51 | 1.00 | 100.00 |
| Wash (water) | | 100.00 | 18.01 | 49.08 | 5,552.47 | 1.00 | 100.00 |

A 500 ml jacketed 3-necked roundbottomed flask was equipped with a temperature probe, magnetic stirrer, reflux condenser and addition funnel. The reactor was charged with and the solvent was removed to give 118.8 grams of polymer, dp 6.9.

EXAMPLE 4

Synthesis of Copolymers of Alkoxyoxetane-Fluorooxetane Polymers

| Substance | Scale (g) | Quantity (g) | MW | Eq | mmoles | δ | ml |
|---|---|---|---|---|---|---|---|
| 5-fox Monomer | 100 | 100.00 | 234.15 | 4.8 | 427.08 | 1.15 | 86.96 |
| Methoxymethyl methyloxetane | | 12.18 | 116.16 | 1.18 | 104.86 | 0.8 | 15.21 |
| Trifluoroethanol, solvent | | 63.94 | 100.04 | 7.18 | 639.18 | 1.185 | 55.55 |
| Trifluoroethanol, intiator | | 8.9 | 100.04 | 1.00 | 88.97 | 1.19 | 7.51 |
| $BF_3$.THF, catalyst | | 4.98 | 139.9 | 0.40 | 35.59 | 1.268 | 3.92 |
| methylene chloride, reaction solvent | | 22.44 | 84.93 | 2.97 | 264.22 | 1.35 | 16.87 |
| Methylene chloride wash solvent | | 56.09 | 84.93 | 7.42 | 660.43 | 1.35 | 41.55 |
| Quench (5% NaHCO3) | | 100.00 | 84.01 | 0.52 | 59.51 | 1.00 | 100.00 |
| Wash (water) | | 100.00 | 18.01 | 49.08 | 5,552.47 | 1.00 | 100.00 |

A 500 ml jacketed 3-necked roundbottomed flask was equipped with a temperature probe, magnetic stirrer, reflux condenser and addition funnel. The reactor was charged with 22.4 grams of methylene chloride, trifluoroethanol initiator (8.9 grams, 88.97 mmoles), and $BF_3 \cdot THF$ (4.98 grams, 35.59 mmoles). A solution consisting of 5-fox monomer (100 grams, 427.08 mmoles), methoxymethyl methyl oxetane (12.18 grams, 106.77 mmoles), and trifluoroethanol solvent (63.94 grams, 639.18 mmoles) was prepared, and added over 1 hour and ten minutes. A rapid exotherm was observed, with a maximum temperature of 35° C. The reaction mixture was allowed to stir for 16 hours at 25° C., then 100 mL 5% sodium bicarbonate solution was added to quench the reaction. The reaction was washed a second time with 100 ml deionized water. The solution was dried, and the solvent was removed to give 107 grams of polymer, dp 6.

EXAMPLE 5

Synthesis of Polyethylene oxide oxetane monomer

| Material | Scale | Weight g | MW | Moles | Mole Ratio | Density | ml |
|---|---|---|---|---|---|---|---|
| Carbowax 350 | 200 | 200.00 | 350.00 | 0.57 | 1.00 | 1.373 | 145.7 |
| 3-bromomethyl-3-methyloxetane | | 99.01 | 165.02 | 0.60 | 1.05 | 1.435 | 69.0 |
| tetrabutyl ammonium bromide | | 4.61 | 322.37 | 0.01 | 0.025 | 1 | 4.6 |
| Water | | 115.40 | 18.01 | 6.41 | 11.21 | 1.000 | 115.4 |
| 45% aqueous KOH | | 78.36 | 56.10 | 0.63 | 1.10 | 1.456 | 53.8 |
| Water | | 184.60 | 18.01 | 10.25 | 17.94 | 1.000 | 184.6 |
| Theoretical Yield, (g) | 91.5 | | | | | | |
| Expected Yield, low (g) | 68.7 | | | | | | |
| Expected Yield, high (g) | 87.0 | | | | | | |
| Solids Loading, % | 18.4 | | | | | | |
| KBR Concentration, Mol/l | 1.8 | | | | | | |
| KBR Concentration, wt % | 17.9 | | | | | | |
| | ml | | | | | | |
| Volume after KOH addn. | 388.5 | | | | | | |
| Volume after quench | 573.1 | | | | | | |
| Volume after phase split | 214.7 | | | | | | |

A 500 milliliter jacketed 3-necked roundbottomed flask was equipped with a temperature probe, magnetic stirrer, reflux condenser and addition funnel. Carbowax 350 (200.00 g, 0.57 moles OH, 350 g/mol MW), BrMMO (99.01 g, 0.60 moles), Tetrabutyl ammonium bromide (4.61 g), and 115.4 g water were added. The reaction mixture was heated to 85° C. A 45% solution of potassium hydroxide (78.36 grams, 0.63 moles) was added over 1 hour and 10 minutes. An exothermic reaction was observed. After 4 hours, 90%+ conversion of the BrMMo was observed. The Reaction was allowed to cool to room temperature. Methylene chloride (200 grams) was added the reaction was quenched with 100 grams of water, and the organic phase was separated and the solvent was removed. 3-methyl-3-(methoxypolyethylene glycol)oxetane was isolated (177.8 grams).

While in accordance with the patent statutes, the best mode and preferred embodiment have been set forth, the scope of the invention is not limited thereto, but rather by the scope of the attached claims.

What is claimed is:

1. A grafted polysiloxane composition, comprising:

a polysiloxane having a repeat unit of the formula

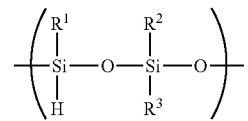

wherein $R^1$, $R^2$, and $R^3$, independently, is a hydrogen or an alkyl having from 1 to about 20 carbon atoms with the proviso that at least one of said $R^1$, $R^2$, and $R^3$, groups is an alkyl, said polysiloxane repeat unit having a pendant fluorooxetane oligomer, polymer, or copolymer containing a repeat group of the formula

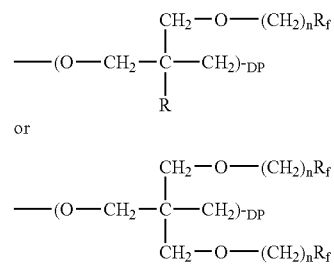

wherein n is from 1 to about 6, wherein R is hydrogen or an alkyl having from 1 to about 6 carbon atoms, wherein DP is from 2 to about 100, and wherein each $R_f$, independently, is a linear or branched alkyl having from 1 to about 20 carbons with at least 50% of the hydrogen atoms being replaced by a fluorine atom.

2. A grafted polysiloxane composition according to claim 1, wherein said siloxane $R^1$, $R^2$, and $R^3$, independently, is an alkyl having from 1 to 10 carbon atoms, and wherein said Rf has at least 75% of said hydrogen atoms replaced by F.

3. A grafted polysiloxane composition according to claim 2, wherein said fluorooxetane repeat unit n is from 1 to about 3, R is an alkyl having from 1 to 3 carbon atoms, wherein $R_f$ has at least 90% of said hydrogen atoms replaced by F, and wherein said $R_f$ contains from 1 to about 10 carbon atoms.

4. A grafted polysiloxane composition according to claim 3, wherein said siloxane $R^1$, $R^2$, and $R^3$, independently, is methyl or ethyl, and wherein in said fluorooxetane repeat unit $R_f$ has from 1 to 7 carbon atoms.

5. A grafted polysiloxane composition according to claim 4, wherein in said fluorooxetane repeat unit $R_f$ is perfluorinated and contains from 1 to 5 carbon atoms, and wherein DP is from 2 to about 4.

6. A flow, or wetting, or leveling agent, comprising the composition of claim 1.

7. A flow, or wetting, or leveling agent, comprising the composition of claim 3.

8. A flow, or wetting, or leveling agent, comprising the composition of claim 5.

9. A solution comprising a flow, or leveling, or wetting agent, comprising the composition of claim 1.

10. A polymeric solution containing a flow, or leveling, or wetting agent, comprising the composition of claim 1, and wherein said polymer is an aqueous soluble dispersible, or emulsifiable polymer.

11. A polymeric solution containing flow, or leveling, or wetting agent comprising the composition of claim 3, wherein seid polymer is an aqueous soluble, dispersible or emulsifiable polymer.

12. A polymeric solution containing a flow, or leveling, or wetting agent, comprising the composition of claim 3, wherein said polymer is an aqueous soluble, dispersible, or emulsifiable polymer, and wherein said polymer is a polyacetate, a polyacrylate, a polyacrylic acid, a polyester, a polyether, or a polyurethane, or a fluorine containing polymer, or combinations thereof.

13. A polymeric solution containing a flow, or leveling, or wetting agent, comprising the composition of claim 3, wherein said polymer is a solvent soluble polymer.

14. A polymeric composition containing a flow, or leveling, or wetting agent, comprising the composition of claim 4, wherein said polymer is a solvent soluble polymer, and wherein said polymer is a polyacrylate, a polyester, a polyurethane, an epoxy, an alkyd, or a fluorine containing polymer, or combinations thereof.

* * * * *